United States Patent
Hicks, III et al.

(10) Patent No.: US 10,529,204 B2
(45) Date of Patent: *Jan. 7, 2020

(54) METHODS, SYSTEMS, AND PRODUCTS FOR SECURITY SYSTEMS

(71) Applicant: AT&T Intellectual Property I, L.P., Atlanta, GA (US)

(72) Inventors: John Alson Hicks, III, Roswell, GA (US); Nicholas S. Huslak, Johns Creek, GA (US); James Aromando, Yorktown, NY (US); Michael D. Cercena, Hockessin, DE (US); Francis John Connell, Somerset, NJ (US); Mark W. Mueller, Holmdel, NJ (US); Deva-Datta Sharma, San Ramon, CA (US); J. Kirk Shrewsbury, Atlanta, GA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 537 days.

This patent is subject to a terminal disclaimer.

(21) Appl. No.: 14/561,468

(22) Filed: Dec. 5, 2014

(65) Prior Publication Data

US 2015/0085130 A1    Mar. 26, 2015

Related U.S. Application Data

(63) Continuation of application No. 12/579,436, filed on Oct. 15, 2009, now Pat. No. 8,937,658.

(51) Int. Cl.
*G08B 13/196* (2006.01)
*G08B 19/00* (2006.01)
(Continued)

(52) U.S. Cl.
CPC . *G08B 13/19656* (2013.01); *G08B 13/19658* (2013.01); *G08B 19/005* (2013.01);
(Continued)

(58) Field of Classification Search
CPC .......... H04L 61/2007; H04L 29/12216; G08B 13/19656; G08B 13/19658;
(Continued)

(56) References Cited

U.S. PATENT DOCUMENTS 4,259,548 A    3/1981    Fahey et al.
6,038,289 A    3/2000    Sands
(Continued)

FOREIGN PATENT DOCUMENTS

JP    2014216663 A    11/2014
KR    20070105430 A    10/2007

OTHER PUBLICATIONS

Unpublished U.S. Appl. No. 14/854,294, Hicks, III, John Alson.
(Continued)

*Primary Examiner* — Nathnael Aynalem
(74) *Attorney, Agent, or Firm* — Scott P. Zimmerman, PLLC

(57) ABSTRACT

Remote notification of alarms improves security. When an alarm is detected by a security system, a notification message is sent to notify a user or emergency responder. If video data is requested, only certain locations are permitted access to outputs from cameras.

19 Claims, 51 Drawing Sheets

(51) Int. Cl.
*H04N 7/18* (2006.01)
*G08B 25/00* (2006.01)
*H04L 29/06* (2006.01)

(52) U.S. Cl.
CPC ....... *H04N 7/181* (2013.01); *G08B 13/19682* (2013.01); *G08B 25/001* (2013.01); *G08B 25/004* (2013.01); *G08B 25/005* (2013.01); *H04L 65/1016* (2013.01); *H04L 65/4084* (2013.01)

(58) Field of Classification Search
CPC ............ G08B 13/19682; G08B 19/005; G08B 25/08; H04N 7/181; H04N 2201/3205; H04N 2201/3207; H04N 2201/3209; H04M 11/04
See application file for complete search history.

(56) References Cited

U.S. PATENT DOCUMENTS

| | | | |
|---|---|---|---|
| 6,067,346 A | 5/2000 | Akhteruzzaman et al. | |
| 6,271,752 B1 | 8/2001 | Vaios | |
| 6,356,058 B1 | 3/2002 | Maio | |
| 6,400,265 B1 | 6/2002 | Saylor et al. | |
| 6,504,479 B1 * | 1/2003 | Lemons | G07C 9/00087 340/430 |
| 6,636,489 B1 | 10/2003 | Fingerhut | |
| 6,658,091 B1 | 12/2003 | Naidoo et al. | |
| 6,693,530 B1 | 2/2004 | Dowens et al. | |
| 6,741,171 B2 | 5/2004 | Palka et al. | |
| 6,778,085 B2 * | 8/2004 | Faulkner | G08B 13/19656 340/541 |
| 6,829,478 B1 | 12/2004 | Layton et al. | |
| 6,884,826 B2 | 4/2005 | Le-Khac et al. | |
| 6,914,896 B1 | 7/2005 | Tomalewicz | |
| 6,970,183 B1 | 11/2005 | Monroe | |
| 6,975,220 B1 | 12/2005 | Foodman et al. | |
| 6,977,585 B2 | 12/2005 | Falk et al. | |
| 7,015,806 B2 | 3/2006 | Naidoo et al. | |
| 7,020,796 B1 | 3/2006 | Ennis et al. | |
| 7,035,650 B1 | 4/2006 | Moskowitz et al. | |
| 7,113,090 B1 | 9/2006 | Saylor et al. | |
| 7,239,689 B2 | 7/2007 | Diomelli | |
| 7,248,161 B2 | 7/2007 | Spoltore et al. | |
| 7,249,370 B2 * | 7/2007 | Kodama | H04L 12/4604 348/E7.06 |
| 7,295,119 B2 | 11/2007 | Rappaport et al. | |
| 7,323,980 B2 | 1/2008 | Faulkner et al. | |
| 7,409,045 B2 * | 8/2008 | Naidoo | G08B 13/19669 379/37 |
| 7,492,253 B2 | 2/2009 | Ollis et al. | |
| 7,515,041 B2 | 4/2009 | Eisold et al. | |
| 7,633,385 B2 | 12/2009 | Cohn et al. | |
| 7,679,507 B2 | 3/2010 | Babich et al. | |
| 7,688,203 B2 | 3/2010 | Rockefeller et al. | |
| 7,724,131 B2 | 5/2010 | Chen | |
| 7,768,414 B2 | 8/2010 | Abel et al. | |
| 7,772,971 B1 | 8/2010 | Hillenburg et al. | |
| 7,779,141 B2 | 8/2010 | Hashimoto et al. | |
| 7,853,261 B1 | 12/2010 | Lewis et al. | |
| 7,855,635 B2 | 12/2010 | Cohn et al. | |
| 7,920,580 B2 | 4/2011 | Bedingfield, Sr. | |
| 7,920,843 B2 | 4/2011 | Martin et al. | |
| 7,952,609 B2 | 5/2011 | Simerly et al. | |
| 8,265,938 B1 | 9/2012 | Verna | |
| 8,284,254 B2 | 10/2012 | Romanowich et al. | |
| 8,373,538 B1 | 2/2013 | Hildner et al. | |
| 8,391,826 B2 | 3/2013 | McKenna | |
| 8,401,514 B2 | 3/2013 | Ebdon et al. | |
| 8,405,499 B2 | 3/2013 | Hicks, III | |
| 8,471,910 B2 | 6/2013 | Cleary et al. | |
| 8,520,068 B2 | 8/2013 | Naidoo et al. | |
| 8,581,991 B1 | 11/2013 | Clemente | |
| 8,626,210 B2 | 1/2014 | Hicks, III | |
| 8,649,758 B2 | 2/2014 | Sennett et al. | |
| 8,674,823 B1 | 3/2014 | Contario et al. | |
| 8,692,665 B2 | 4/2014 | Hicks, III | |
| 8,780,199 B2 | 7/2014 | Mimar | |
| 8,831,970 B2 | 9/2014 | Weik et al. | |
| 8,847,749 B2 | 9/2014 | Hicks, III | |
| 8,884,772 B1 | 11/2014 | Zhang | |
| 8,902,740 B2 | 12/2014 | Hicks, III | |
| 8,937,658 B2 | 1/2015 | Hicks, III | |
| 8,970,365 B2 | 3/2015 | Wedig et al. | |
| 9,060,116 B2 | 6/2015 | Kim | |
| 9,135,806 B2 | 9/2015 | Hicks | |
| 9,246,740 B2 | 1/2016 | Hicks | |
| 9,318,005 B2 | 4/2016 | Hicks | |
| 2002/0175995 A1 | 11/2002 | Sleeckx | |
| 2002/0193107 A1 | 12/2002 | Nascimento | |
| 2003/0025599 A1 | 2/2003 | Monroe | |
| 2003/0062997 A1 | 4/2003 | Naidoo | |
| 2003/0179712 A1 | 9/2003 | Kobayashi et al. | |
| 2003/0227220 A1 | 12/2003 | Biskup et al. | |
| 2004/0028391 A1 | 2/2004 | Black et al. | |
| 2004/0086088 A1 | 5/2004 | Naidoo et al. | |
| 2004/0086091 A1 | 5/2004 | Naidoo et al. | |
| 2004/0086093 A1 | 5/2004 | Schranz | |
| 2004/0113770 A1 | 6/2004 | Falk | |
| 2004/0137959 A1 | 7/2004 | Salzhauer | |
| 2004/0177136 A1 | 9/2004 | Chen et al. | |
| 2004/0196833 A1 | 10/2004 | Dahan et al. | |
| 2004/0233983 A1 | 11/2004 | Crawford et al. | |
| 2005/0066033 A1 | 3/2005 | Cheston et al. | |
| 2005/0068175 A1 | 3/2005 | Faulkner et al. | |
| 2005/0174229 A1 * | 8/2005 | Feldkamp | G08B 13/19656 340/506 |
| 2006/0002721 A1 | 1/2006 | Sasaki | |
| 2006/0028488 A1 | 2/2006 | Gabay et al. | |
| 2006/0055529 A1 | 3/2006 | Ratiu et al. | |
| 2006/0064505 A1 | 3/2006 | Lee et al. | |
| 2006/0067484 A1 | 3/2006 | Elliot et al. | |
| 2006/0154642 A1 | 7/2006 | Scannell, Jr. | |
| 2006/0170778 A1 * | 8/2006 | Ely | G11B 27/031 348/207.99 |
| 2006/0239250 A1 | 10/2006 | Elliot et al. | |
| 2006/0271695 A1 * | 11/2006 | Lavian | G06F 21/552 709/229 |
| 2007/0049259 A1 | 3/2007 | Onishi et al. | |
| 2007/0104218 A1 | 5/2007 | Hassan et al. | |
| 2007/0115930 A1 | 5/2007 | Reynolds et al. | |
| 2007/0124782 A1 | 5/2007 | Hirai et al. | |
| 2007/0139192 A1 * | 6/2007 | Wimberly | G08B 13/19656 340/539.22 |
| 2007/0226344 A1 | 9/2007 | Sparrell et al. | |
| 2007/0247187 A1 | 10/2007 | Webber et al. | |
| 2007/0279214 A1 | 12/2007 | Buehler | |
| 2007/0290830 A1 | 12/2007 | Gurley | |
| 2008/0055423 A1 | 3/2008 | Ying | |
| 2008/0061923 A1 | 3/2008 | Simon et al. | |
| 2008/0090546 A1 | 4/2008 | Dickenson et al. | |
| 2008/0167068 A1 | 7/2008 | Mosleh et al. | |
| 2008/0191857 A1 | 8/2008 | Mojaver | |
| 2008/0225120 A1 | 9/2008 | Stuecker | |
| 2008/0261515 A1 | 10/2008 | Cohn et al. | |
| 2008/0279345 A1 | 11/2008 | Zellner et al. | |
| 2008/0311878 A1 | 12/2008 | Martin et al. | |
| 2008/0311879 A1 | 12/2008 | Martin et al. | |
| 2009/0006525 A1 | 1/2009 | Moore | |
| 2009/0010493 A1 | 1/2009 | Gornick | |
| 2009/0017751 A1 | 1/2009 | Blum | |
| 2009/0047016 A1 | 2/2009 | Bernard et al. | |
| 2009/0058630 A1 | 3/2009 | Friar et al. | |
| 2009/0060530 A1 | 3/2009 | Biegert et al. | |
| 2009/0109898 A1 | 4/2009 | Adams et al. | |
| 2009/0191858 A1 | 7/2009 | Calisti et al. | |
| 2009/0267754 A1 | 10/2009 | Nguyen et al. | |
| 2009/0274104 A1 | 11/2009 | Addy | |
| 2009/0276713 A1 | 11/2009 | Eddy | |
| 2009/0285369 A1 | 11/2009 | Kandala | |
| 2009/0315699 A1 | 12/2009 | Satish et al. | |
| 2009/0323904 A1 | 12/2009 | Shapiro et al. | |
| 2010/0071024 A1 | 3/2010 | Eyada | |

(56) References Cited

U.S. PATENT DOCUMENTS

| | | |
|---|---|---|
| 2010/0073856 A1 | 3/2010 | Huang et al. |
| 2010/0145161 A1 | 6/2010 | Niyato et al. |
| 2010/0279664 A1 | 11/2010 | Chalk |
| 2010/0281312 A1 | 11/2010 | Cohn et al. |
| 2010/0302025 A1 | 12/2010 | Script |
| 2010/0302938 A1 | 12/2010 | So |
| 2011/0003577 A1 | 1/2011 | Rogalski et al. |
| 2011/0032109 A1 | 2/2011 | Fox |
| 2011/0044210 A1 | 2/2011 | Yokota |
| 2011/0058034 A1* | 3/2011 | Grass ............... G08B 13/19656 348/143 |
| 2011/0090334 A1 | 4/2011 | Hicks, III |
| 2011/0113142 A1 | 5/2011 | Rangegowda et al. |
| 2011/0183643 A1 | 7/2011 | Martin et al. |
| 2011/0197246 A1 | 8/2011 | Stancato et al. |
| 2011/0211440 A1 | 9/2011 | Arsenault et al. |
| 2011/0244854 A1 | 10/2011 | Hansson et al. |
| 2011/0254681 A1 | 10/2011 | Perkinson |
| 2011/0317622 A1 | 12/2011 | Arsenault |
| 2012/0084857 A1 | 4/2012 | Hubner |
| 2012/0099253 A1 | 4/2012 | Tang |
| 2012/0099256 A1 | 4/2012 | Fawcett |
| 2012/0163380 A1 | 6/2012 | Kolbe et al. |
| 2012/0190386 A1 | 7/2012 | Anderson |
| 2012/0278453 A1 | 11/2012 | Baum |
| 2012/0314597 A1 | 12/2012 | Singh et al. |
| 2013/0027561 A1 | 1/2013 | Lee |
| 2013/0099919 A1 | 4/2013 | Cai et al. |
| 2013/0103309 A1 | 4/2013 | Cai et al. |
| 2013/0120132 A1 | 5/2013 | Hicks, III |
| 2013/0120138 A1 | 5/2013 | Hicks, III |
| 2013/0121239 A1 | 5/2013 | Hicks, III |
| 2013/0135993 A1 | 5/2013 | Morrill et al. |
| 2013/0155245 A1 | 6/2013 | Slamka |
| 2013/0170489 A1 | 7/2013 | Hicks, III |
| 2013/0214925 A1 | 8/2013 | Weiss |
| 2013/0235209 A1 | 9/2013 | Lee et al. |
| 2013/0273875 A1 | 10/2013 | Martin et al. |
| 2014/0095164 A1 | 4/2014 | Sone et al. |
| 2014/0167969 A1 | 6/2014 | Wedig |
| 2014/0253326 A1 | 9/2014 | Cho et al. |
| 2015/0054645 A1 | 2/2015 | Hicks, III |
| 2015/0056946 A1 | 2/2015 | Leggett et al. |
| 2015/0085130 A1 | 3/2015 | Hicks, III |
| 2015/0097683 A1 | 4/2015 | Sloo et al. |
| 2015/0137967 A1 | 5/2015 | Wedig et al. |
| 2015/0364029 A1 | 12/2015 | Hicks, III |
| 2016/0196734 A1 | 7/2016 | Hicks, III |
| 2016/0225239 A1 | 8/2016 | Hicks, III |
| 2016/0284205 A1 | 9/2016 | Hicks, III |
| 2017/0076562 A1 | 3/2017 | Hicks, III |
| 2017/0132890 A1 | 5/2017 | Hicks, III |
| 2017/0140620 A1 | 5/2017 | Hicks, III |

OTHER PUBLICATIONS

Unpublished U.S. Appl. No. 14/939,212, Hicks, III, John Alson.
Unpublished U.S. Appl. No. 14/833,098, Hicks, III, John Alson.
Aedo, Ignacio, et al., "Personalized Alert Notifications and Evacuation Routes in Indoor Environments," *Sensors* 12.6 (2012): 7804-7827, 24 pages.

\* cited by examiner

FIG. 41

| Flow | Mediation | Purpose | Involved Elements |
|---|---|---|---|
| Voice | IMS Core | • Customer alert<br>• Customer alert<br>• IVR Access | • Monitoring Center → Remote User<br>• Monitoring Center → Home<br>• Remote Customer → Media Center |
| | IMS Core (triggered by event or user control) | • View by agent<br>• View by customer<br>• Record and store | • Home → Monitoring Center<br>• Home → Remote Customer<br>• Home → Media Center |
| Video | IMS Core &/or Web Services | • Recorded video | • Media Center → Home<br>• Media Center → Remote Customer<br>• Media Center → Monitoring Center |
| | Home Network | • Distribute video in home | • Between elements in Home Network (MAG, Cameras, PCs, ...) |
| Telemetry | Web Services | • Heartbeat, HVAC status, irrigation status, ... | • Home → SP Complex → Monitoring Center (Note: SP Complex = Security App in Service Provider Complex) |
| Control | Web Services | • Request video or HVAC control, etc. | • Remote User → Portal → SP Complex → Home<br>• Monitoring Center → SP Complex → Home |

METHODS, SYSTEMS, AND PRODUCTS FOR SECURITY SYSTEMS

CROSS-REFERENCE TO RELATED APPLICATIONS

This application is a continuation of U.S. application Ser. No. 12/579,436 filed Oct. 15, 2009 and since issued as U.S. Pat. No. 8,937,658, and incorporated herein by reference in its entirety.

BACKGROUND

Exemplary embodiments generally relate to communications and, more particularly, to alarm systems with video monitoring.

Security systems are common. When an alarm is detected, most security systems seize a phone line to call a central monitoring station. That is, a public-switched telephone network ("PSTN") call is made, and alarm codes are communicated, to alert the central monitoring station of the alarm. This PSTN-based security system is very reliable, but the telephone call may require more than thirty (30) seconds to set-up the call and to communicate the alarm codes. Moreover, once the phone line is seized, and while the call is in progress, a customer is unable to make or receive calls to other numbers—such as "911." These conventional security systems may also lack an ability to remotely request video associated with the alarm.

SUMMARY

Exemplary embodiments notify of alarms detected by security systems. Exemplary embodiments, though, utilize packet data communications, both wireline (e.g., ADSL, VDSL and cable modem) and wireless (GPRS, Edge, 3G, and LTE), to replace circuit switched communications over the Public Switched Telephone Network (PSTN) when reporting alarms to a central monitoring station. Exemplary embodiments, in other words, exchange data with the central monitoring station over a packet data network, instead of using the conventional public-switched telephone network ("PSTN"). Once an alarm is received by the central monitoring station, an agent at the central monitoring station may attempt to contact the customer to verify that a legitimate alarm condition exists before the agent summons police, fire, or other emergency services. If video cameras are available at the alarm site, then the agent may also access live and/or archived video data (and even audio data) from the alarm site to further help determine if the alarm is legitimate. Because the packet data network is used for communications, the agent may attempt to establish a 3GPP IP Multimedia Subsystem ("IMS") SIP session with the customer. This IMS session enables a multimedia voice and data session between the agent and the customer. The IMS session enables the agent and customer to have a voice conversation using Voice over Internet Protocol ("VoIP") technology and simultaneously share video/audio data. The video/audio sharing enables the agent to jointly access live and stored video/audio from cameras in the customer's home. A law enforcement officer or other party may be added to the video/audio sharing session. If the agent desires, the agent may additionally or alternatively contact the customer by placing a Voice-over Internet Protocol call over the packet data network. If IMS or VoIP is not available, the agent may place a voice call to the customer.

Exemplary embodiments include many features. When an alarm notification is received at the central monitoring station, the alarm notification may indicate which sensor, or zone of sensors, in the customer's home was triggered (such as an entry door, backdoor, living room, dining room, kitchen, master bedroom or basement). If a customer has video cameras installed in their home, an agent at the central monitoring agent may access video data from some, or all, of the cameras. Some customers, for example, may only permit access to output from selected cameras, such as cameras providing surveillance of exterior doors and windows (due to privacy concerns). Other customers, however, may permit access to all of the cameras in their home, including interior bedroom cameras. The cameras may even include motion sensors, thus dual-functioning to also detect intrusions into the home. Cameras may include tilt, pan, and zoom capabilities, thus allowing video and audio surveillance of multiple zones of sensors (such as window and door sensors). A home network may include a mass storage device to automatically store streaming video and audio data from the cameras in the home. Under an alarm condition, the agent may be permitted to access live video and audio data, and archived audio and video data that was recorded prior to the alarm being detected and recorded after the alarm was detected. Archived video and audio (recorded prior to the alarm) may help the agent determine what events triggered the alarm. The mass storage device may additionally or alternatively be located in the service provider's network.

Exemplary embodiments include a method for notifying of an alarm detected by a security system. When the alarm is detected, the security system associates an alarm code to a zone and/or to a camera. Video data from the camera is retrieved, and an Internet Protocol ("IP") alarm notification address is also retrieved. The video data is sent over a packet data network to the IP alarm notification address associated with the central monitoring station. The video data usually routes to an IP address associated with a professional security service (such as BRINKS HOME SECURITY® or ADT® home security). Streaming video data (and even audio data) helps an agent at the central monitoring station verify that the alarm is legitimate and not a "false alarm." The agent may further verify the alarm by establishing an IMS SIP session with the customer. The IMS SIP session enables the agent and the customer to simultaneously access video/audio from one or more cameras in the customer's home. The agent may also add a third party (such as police, fire or medical personnel) to the IMS SIP session, thus allowing the third party to simultaneously view the video/audio from the customer's home. Exemplary embodiments thus permit the agent to verify that the alarm is real and not a "false" alarm prior to contacting police, fire and/or medical authorities.

Broadband and wireless services may be used. Under most circumstances the alarm is communicated to the central monitoring station via any broadband wireline packet data service, such as ADSL, VDSL or cable modem. When the broadband wireline packet data service is not available, the alarm may be communicated via any wireless packet data service (such as GPRS, Edge, 3G and LTE). When the alarm is received in the central monitoring station via a wireless packet data service, then the agent may utilize the wireless packet data service to access live and archived video and audio data from cameras in the customer's home.

The PSTN may also be used. When the alarm is detected and neither the wireline broadband packet data service or the wireless packet data service is available between the central monitoring station and the customer's home, then a PSTN call may be utilized to communicate the alarm from the security system to the central monitoring system.

Other systems, methods, and/or computer program products according to the exemplary embodiments will be or become apparent to one with ordinary skill in the art upon review of the following drawings and detailed description. It is intended that all such additional systems, methods, and/or computer program products be included within this description, be within the scope of the claims, and be protected by the accompanying claims.

BRIEF DESCRIPTION OF THE SEVERAL VIEWS OF THE DRAWINGS

These and other features, aspects, and advantages of the exemplary embodiments are better understood when the following Detailed Description is read with reference to the accompanying drawings, wherein:

FIGS. 40-47 are schematics illustrating a combined data network architecture comprising an IMS Core and Web Services applied to home security, according to exemplary embodiments;

DETAILED DESCRIPTION

The exemplary embodiments will now be described more fully hereinafter with reference to the accompanying drawings. The exemplary embodiments may, however, be embodied in many different forms and should not be construed as limited to the embodiments set forth herein. These embodiments are provided so that this disclosure will be thorough and complete and will fully convey the exemplary embodiments to those of ordinary skill in the art. Moreover, all statements herein reciting embodiments, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating the exemplary embodiments. The functions of the various elements shown in the figures may be provided through the use of dedicated hardware as well as hardware capable of executing associated software. Those of ordinary skill in the art further understand that the exemplary hardware, software, processes, methods, and/or operating systems described herein are for illustrative purposes and, thus, are not intended to be limited to any particular named manufacturer.

As used herein, the singular forms "a," "an," and "the" are intended to include the plural forms as well, unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

It will also be understood that, although the terms first, second, etc. may be used herein to describe various elements, these elements should not be limited by these terms. These terms are only used to distinguish one element from another. For example, a first device could be termed a second device, and, similarly, a second device could be termed a first device without departing from the teachings of the disclosure.

Figure 1:
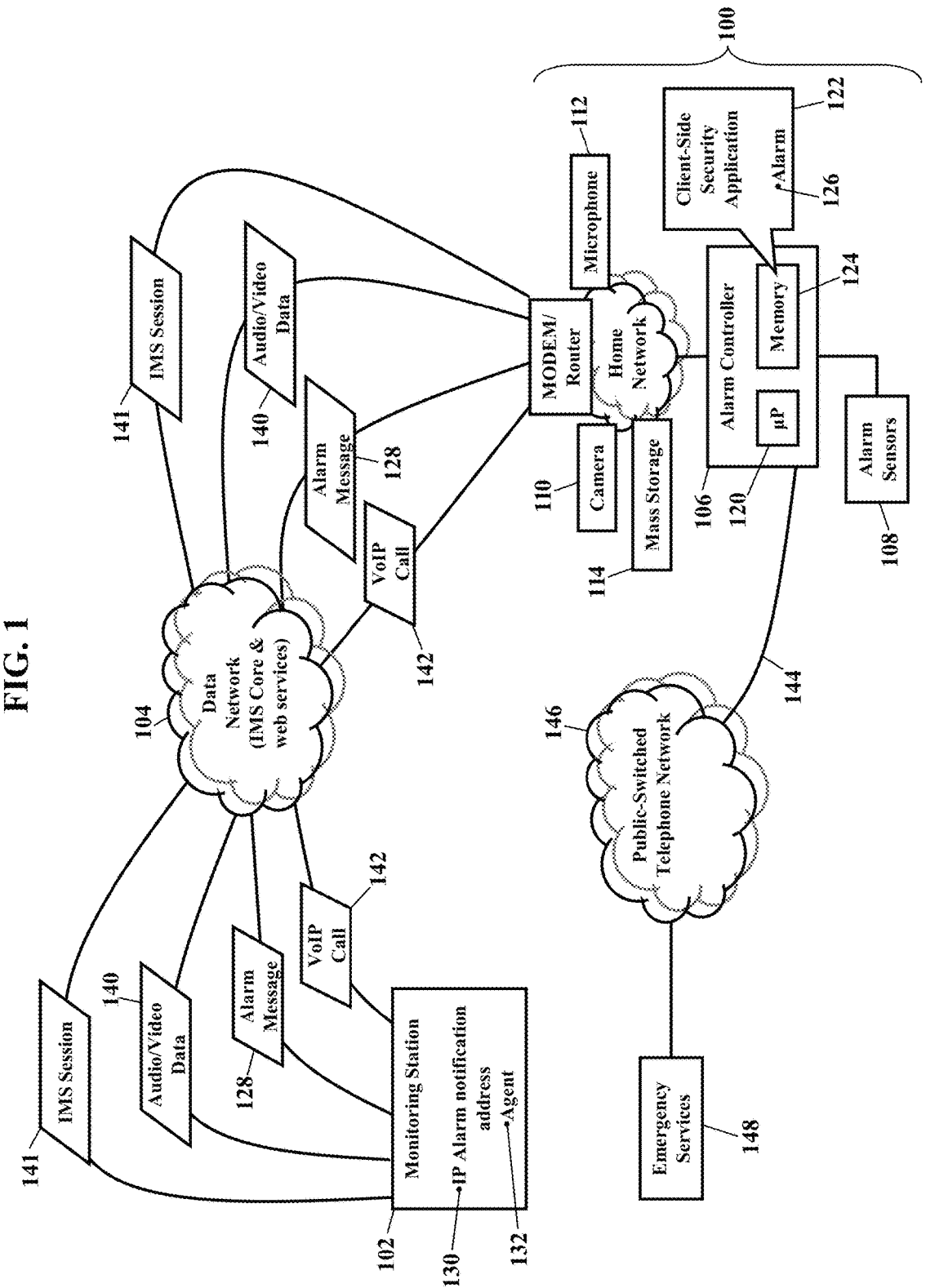
FIG. 1 is a simplified schematic illustrating an environment in which exemplary embodiments may be implemented.

FIG. 1 is a simplified schematic illustrating an environment in which exemplary embodiments may be implemented. A security system 100 communicates with a central monitoring station 102 via a packet data network 104. The packet data network 104 may include a 3GPP IP Multimedia Subsystem (IMS) Core and Web Services. The security system 100 has an alarm controller 106 that receives inputs from one or more alarm sensors 108. As those of ordinary skill in the art understand, the alarm sensors 108 monitor for heat, smoke, motion, sound, or any other physical or logical parameter that may indicate a security event. The alarm controller 106 may also interface with one or more cameras 110 that capture video data and microphones 112 that capture audio data. Audio and/or video data may be stored in a mass storage device 114, as later paragraphs will explain. The cameras 110 may, or may not, include any motion detection technology. The cameras 110 and microphones 112 may be constantly capturing video and audio that is automatically stored in a local mass storage device (as will be later explained). Depending upon the implementation, the cameras 110 may, or may not, have a physical connection to the alarm controller 106.

The security system 100 may be processor-controlled. As FIG. 1 illustrates, the security system 100 may include a processor 120 (e.g., "µP"), application specific integrated circuit (ASIC), or other component that executes a client-side security application 122 stored in a memory 124. The client-side security application 122 monitors the inputs, status, or state of the alarm sensors 108, the cameras 110, and/or the microphone 112. The client-side security application 122 may also instruct any of the microphones 112 and/or cameras 110 to capture audio and/or video data. When an alarm 126 is detected, the client-side security application 122 has software code or instructions that cause the processor 120 to send an alarm message 128 to the central monitoring station 102. The alarm message 128 routes into and through the packet data network 104 to an IP alarm notification address 130 associated with the central monitoring station 102. When the central monitoring station 102 receives the alarm message 128, the central monitoring station 102 assigns a computerized or human agent 132. The agent 132 may then verify that the alarm 126 is legitimate. A high percentage of alarms are "false," such as when an owner of a home opens a door and accidentally triggers the alarm. If the agent immediately summons emergency services, and the alarm 126 turns out to be false, then local police and fire departments have wasted time and resources. Some municipalities may even charge fees for the unnecessary dispatch.

Exemplary embodiments, therefore, allow the agent 132 to first verify the alarm 126. Before summoning emergency services, the agent 132 may gain access to live, real-time audio/video data 140 from the cameras 110 and/or the microphones 112. (The agent 132 may even access archived audio/video data of events preceding the alarm 126, as later paragraphs will explain.) The agent 132 may then view the live audio/video data 140 to help determine whether the alarm 126 represents a true emergency condition. Exemplary embodiments also allow the agent 132 to establish an IMS session 141 and/or initiate a Voice-over Internet Protocol ("VoIP") call 142 over the packet data network 104 to further help verify that the alarm 126 is legitimate. The homeowner may be contacted at any location, so the homeowner need not be physically located in the home. If the alarm is a legitimate security concern, then the agent may summon emergency help.

No seizure of a telephone is thus needed. The packet data network 104 is used to notify the central monitoring station 102, to send the live audio/video data 140, to establish the IMS session 141, and to route the packetized Voice-over Internet Protocol call 142. The security system 100 has thus not seized a telephone line 144 to a Public-Switched Telephone Network 146. That is, a customer's traditional, plain-old telephone system line 144 is unused and remains available to dial "911" to obtain emergency help. Exemplary embodiments thus allow the customer to converse with the agent 132 at the central monitoring station 102 (using the IMS session 141 and/or the Voice-over Internet Protocol call 142) while simultaneously using the conventional telephone line 144 to call police, fire, or other emergency services 148.

The IMS session 141 allows sharing of multi-media. The IP Multimedia Subsystem (IMS) is an architectural framework for delivering Internet Protocol (IP) multimedia services. IMS was originally designed by the wireless standards body "3rd Generation Partnership Project" (or "3GPP") as an evolution of mobile networks. IMS uses IETF protocols, such as Session Initiation Protocol (SIP). Because 3GPP IP Multimedia Subsystem (IMS) Core and Web Services are known to those of ordinary skill in the art, no detailed explanation is needed.

Figure 2:
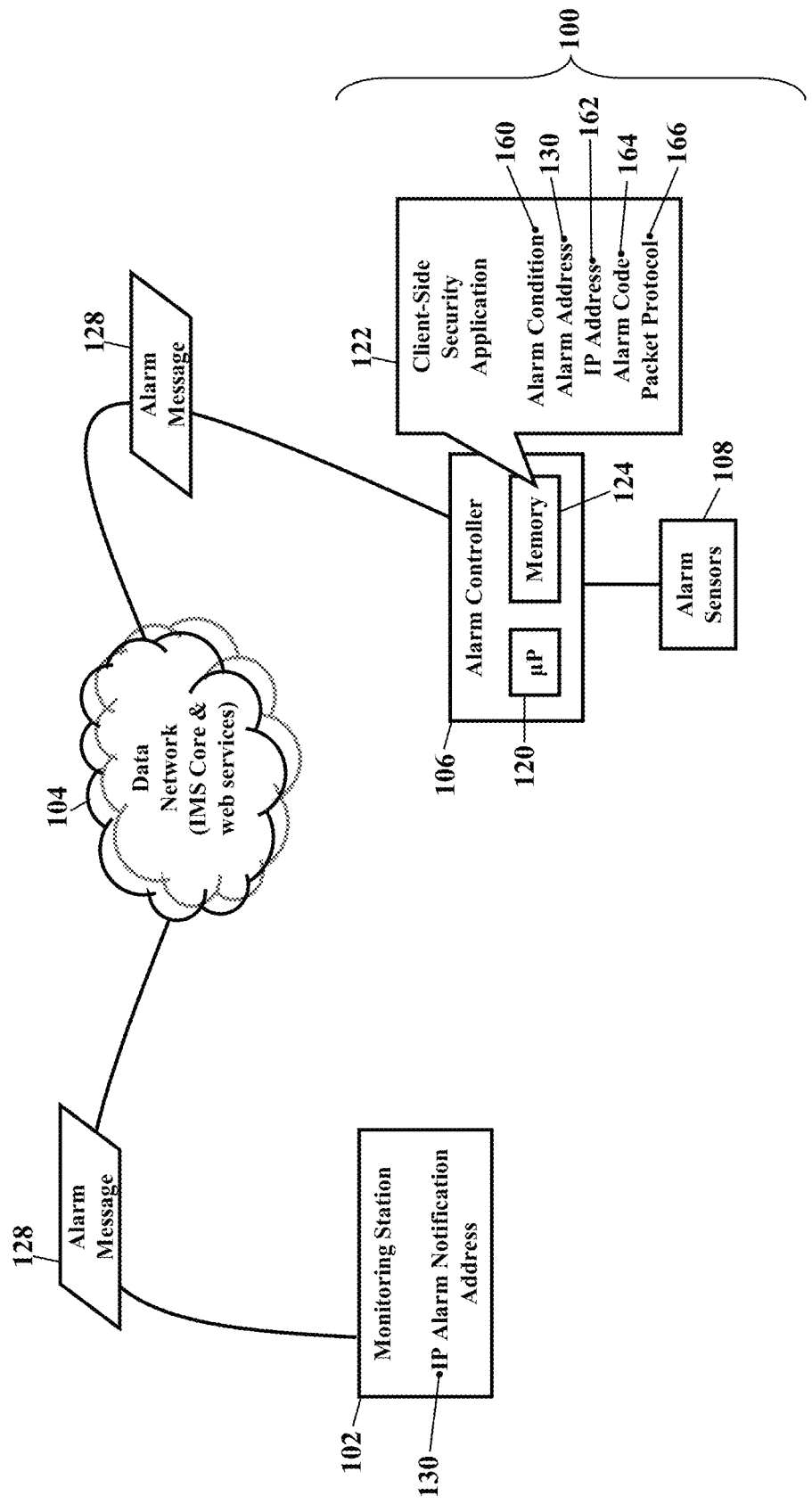
FIGS. 2-4 are more detailed schematics illustrating the exemplary embodiments.
Figure 3:
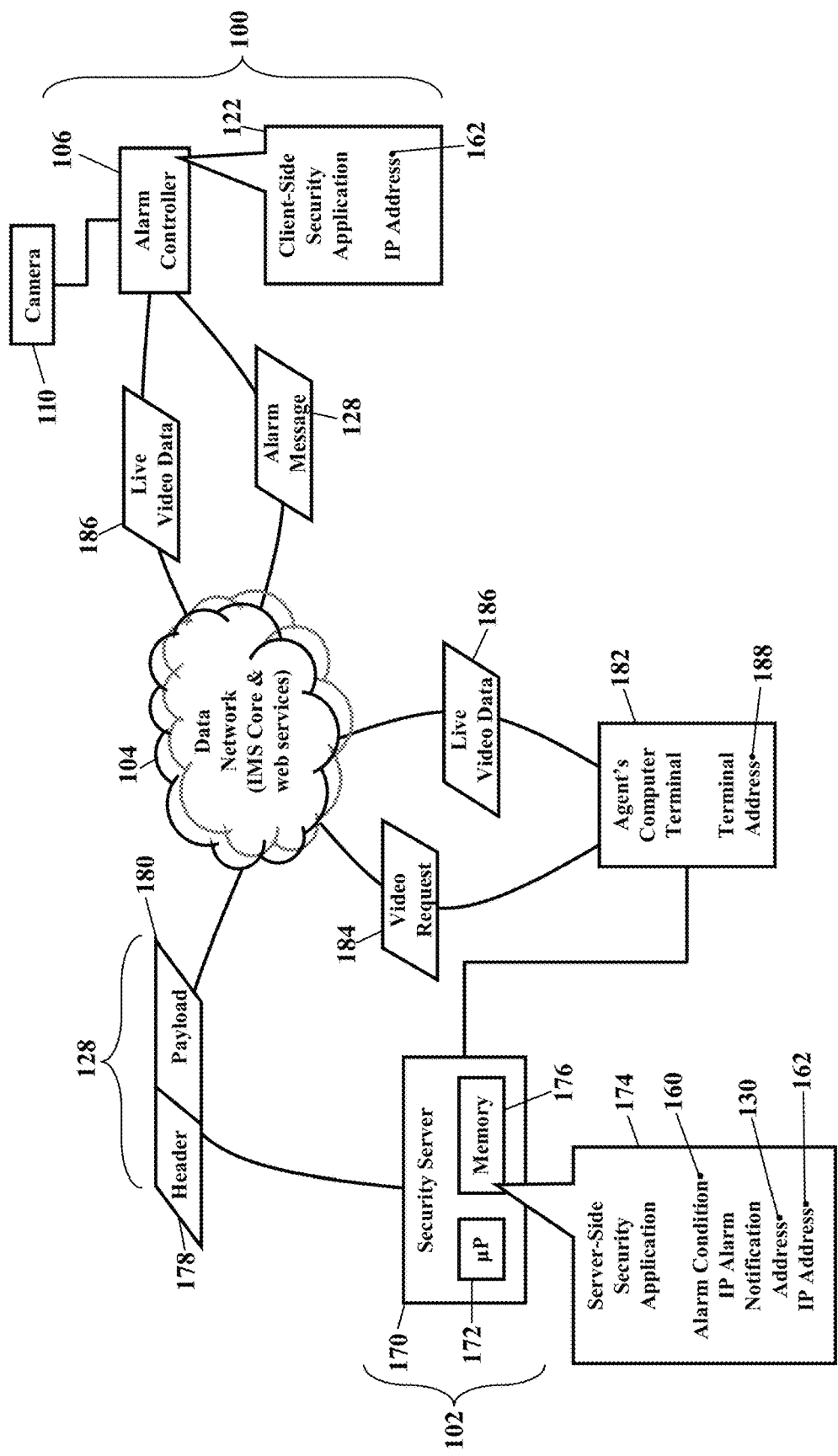
Figure 4:
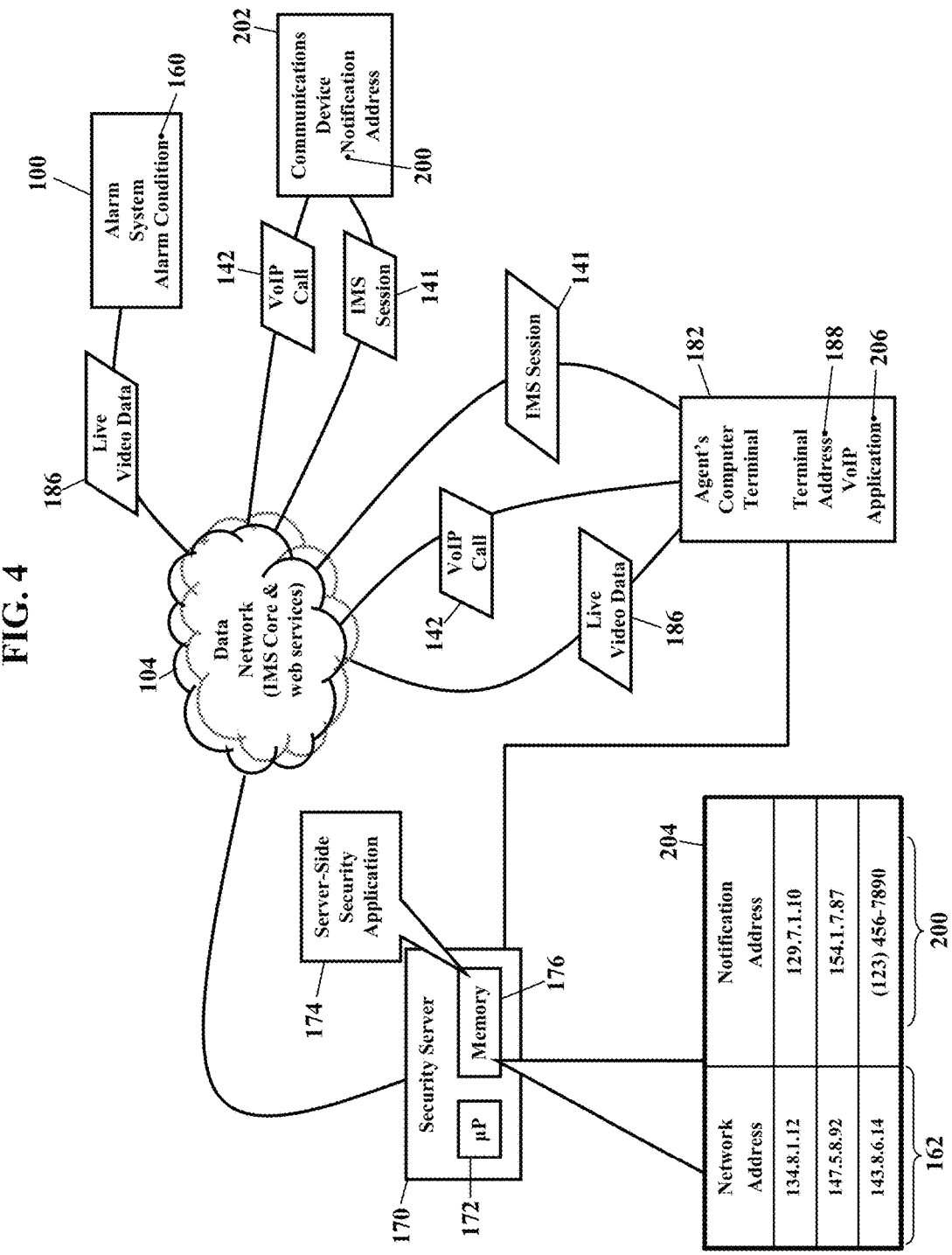

FIGS. 2-4 are more detailed schematics illustrating the exemplary embodiments. When the client-side security application 122 detects an alarm condition 160 from one of the sensors 108, the client-side security application 122 instructs the processor 120 to retrieve the IP alarm notification address 130 from the memory 124. The IP alarm notification address 130 is an IP address at which the central monitoring station 102 receives alarm messages from customers/subscribers of an alarm monitoring service. The IP alarm notification address 130 may be preloaded into the memory 124, and the IP alarm notification address 130 may be changed after a software update to the client-side security application 122. The client-side security application 122 then generates the alarm message 128. The alarm message 128 may include data that uniquely identifies the customer's account and/or a network IP address 162 associated with the security system 100 and/or the alarm controller 106. The alarm message 128 may also include data that describes the alarm condition 160, such as an alarm code 164 associated with the sensor 108. The alarm message 128 may also include information describing the customer and/or the customer's physical street address. Whatever data is included in the alarm message 128, the data is packetized according to a packet protocol 166. Once the alarm message 128 is formatted and ready, the processor 120 sends the alarm message 128 to the IP alarm notification address 130 associated with the central monitoring station 102.

Any packet protocol 166 is suitable. As those of ordinary skill in the art understand, sometimes information is packetized (or "framed") for use in packet data networks. The information is grouped into packets according to the packet protocol 166. As those of ordinary skill in the art also understand, there are many packet protocols. Some of the more well-known packet protocols include TCP/IP, IPX/SPX, AppleTalk, and SNA. Some standards organizations, such as the I.E.E.E., issue standards for packetizing data. Some networks are "mixed." That is, the network receives and handles packets of differing protocols, and a "translator" determines the particular packet protocol and the appropriate destination for each packet. Because the basics of packetizing and packet protocols are well-known, this disclosure will not further explain the packetizing of the alarm message 128.

FIG. 3 is a detailed schematic illustrating receipt of the alarm message 128. The alarm message 128 routes from the alarm controller 106, through the packet data network 104, and to a security server 170 at the central monitoring station 102. The security server 170 has a processor 172 (e.g., "µP"), application specific integrated circuit (ASIC), or other component that executes a server-side security application 174 stored in a memory 176. The server-side security application 174 and the client-side security application 122 cooperate in a client-server environment to notify of alarms from the security system 100.

When the security server 170 receives the alarm message 128, the server-side security application 174 obtains any data associated with the alarm message 128. The server-side security application 174, for example, retrieves the network IP address 162 associated with the security system 100 and/or the alarm controller 106. The network IP address 162, for example, may be extracted from one or more header portions 178 and/or from a payload portion 180 of the packetized alarm message 128. Regardless, the server-side security application 174 may then assign the human or computerized agent (illustrated as reference numeral 132 in FIG. 1) to the alarm condition 160. The server-side security application 174 may call or invoke a software module or subroutine that selects the available agent 132 from a pool of agents. However the agent 132 is chosen, the agent 132 may then have authority to contact police, fire, and other emergency services. Before the agent summons emergency help, though, the agent 132 may first want to verify that the alarm condition 160 is legitimate and not a "false" alarm.

The cameras 110 may help. Even though the alarm message 128 has been received, the agent 132 may first want to view live or archived video data before summoning emergency services. The agent 132, then, may instruct his or her computer terminal 182 to send a video request 184 to the alarm controller 106. The video request 184 routes over the packet data network 104 to the network IP address 162 associated with the alarm controller 106. When the client-side security application 122 receives the video request 184, the client-side security application 122 retrieves live video data 186 from at least one of the cameras 110. The client-side security application 122 instructs the alarm controller 106 to send the live video data 186 to a terminal IP address 188 associated with the agent's computer terminal 182. The agent's computer terminal 182 has a video processor that displays the live video data 186 on a display device (the video processor and the display device are not shown for simplicity). The agent 132 may view the live video data 186 to help determine whether the alarm condition 160 is legitimate. If the live video data 186 indicates a fire, attack, or other legitimate security concern, then the agent 132 may immediately summon police, fire, and/or other emergency services.

Permissions may need to be established. If multiple cameras are present in the customer's home, the customer may not want the agent to have access to all cameras. That is, there may be some camera outputs that are "off limits" and not accessible. A bedroom security camera, for example, may be configured as "private," not shared, and perhaps not archived. The homeowner/customer may thus establish a policy to manage which camera outputs are available to the central monitoring station during an alarm condition. The client-side security application 122 may be configured to permit, or deny, remote access to any output of any camera 110 according to user and/or the user's location. If a user has acceptable authentication credentials (e.g., username and password), but an unacceptable location (such as GPS coordinates), then the client-side security application 122 may deny access to video and any other feature. Some camera output may be associated with public permissions, while other camera output may be associated with specific authentication credentials.

FIG. 4 illustrates the IMS session 141. The IMS session 141 is established between the agent's computer terminal 182 and the customer 142. Even though the agent (illustrated as reference numeral 132 in FIG. 1) may view the live video data 186, the agent 132 may still want further verification. The agent 132 may thus establish the IMS session 141 over the packet data network 104 to the owner or occupant to further help verify that the alarm condition 160 is legitimate. The agent may establish an IMS SIP session with the customer by placing a call to the customer's ten digit home phone number, cell phone number, or other communications device 202. If the customer has an IMS SIP capable device, then the IMS SIP session 141 is established between the agent and the customer. The IMS SIP session 141 enables the agent and the customer to talk and to simultaneously access the live video data 186 from one or more cameras in the customer's home (later paragraphs will explain how stored, archived video may also be retrieved). Under this scenario the IMS SIP session 141 may be carried end-to-end over the packet data network 104. If the customer does not have an IMS SIP capable device, then the call may pass through a Media Gateway in the network 104 and may be converted to a circuit switched voice call, thus allowing the customer to answer the call on a PSTN telephone. In many situations, however, VoIP technology may be used. The agent may use a VoIP soft phone client on their work station to place a voice call to the customer. The security system 100 in the customer's home may have VoIP phone capability which is integrated with a two-way intercom system. This capability will allow the customer to answer the incoming VoIP call 142 through the intercom system using VoIP technology. The server-side security application 174 may place or arrange the VoIP call to the customer (such as the customer's communications device 202). If the customer has VoIP service, then the customer will answer the VoIP call 142 with a VoIP phone. Under this scenario the voice communication between the agent and the customer may again be carried over the packet data network 104. The IMS SIP session 141 allows the agent 132 to ask questions and to further evaluate the alarm condition 160. If the IMS SIP session 141 confirms that a legitimate security concern exists, then the agent 132 may immediately summon police, fire, and/or other emergency services. The agent may also choose to add a police, fire or medical person to the IMS SIP session, so that the agent, customer and police, fire or medical person can simultaneously talk and access video/audio from the customer's home.

The IMS session 141 and/or the VoIP call 142 may route to the customer's communications device 202. The server-side security application 174 may associate the network IP address 162 to the customer's notification address 200. The customer's notification address 200 may be a telephone number and/or IP address to which the agent's computer terminal 182 calls to verify the alarm condition 160. The customer's notification address 200 may be associated with a cell phone, PSTN phone, computer, or any other communications device 202. The server-side security application 174, for example, queries a data table 204 that is stored in the memory 176 of the security server 170. The data table 204 maps, relates, or otherwise associates the network IP address 162 to the notification address 200. The server-side security application 174 retrieves the notification address 200 that is associated with the network IP address 162. The notification address 200 may be any hexadecimal address and/or a more common telephone number. The notification address 200 may be formatted, for example, according to the IPv4 or IPv6 specification. Once the notification address 200 is retrieved, the agent's computer terminal 182 establishes a call or session with the notification address 200. The agent's computer terminal 182 may call or invoke a Voice-over Internet Protocol ("VoIP") application 206. The VoIP application 206 is a software module or routine that establishes the Voice-over Internet Protocol call 142 to the notification address 200. The Voice-over Internet Protocol call 142 routes as packets of data over the packet data network 104 to the notification address 200 associated with the communications device 202. The notification address 200 may even be associated with the alarm controller 106, thus allowing the agent (illustrated as reference numeral 132 in FIG. 1) to call the alarm controller 106 itself. Regardless, the agent 132 may then further ascertain the alarm condition 160 detected by the security system 100. The Voice-over Internet Protocol call 142 allows the agent 132 to ask questions and to further evaluate the alarm condition 160. If the Voice-over Internet Protocol call 142 confirms that a legitimate security concern exists, then the agent 132 may immediately summon police, fire, and/or other emergency services.

Figure 5:
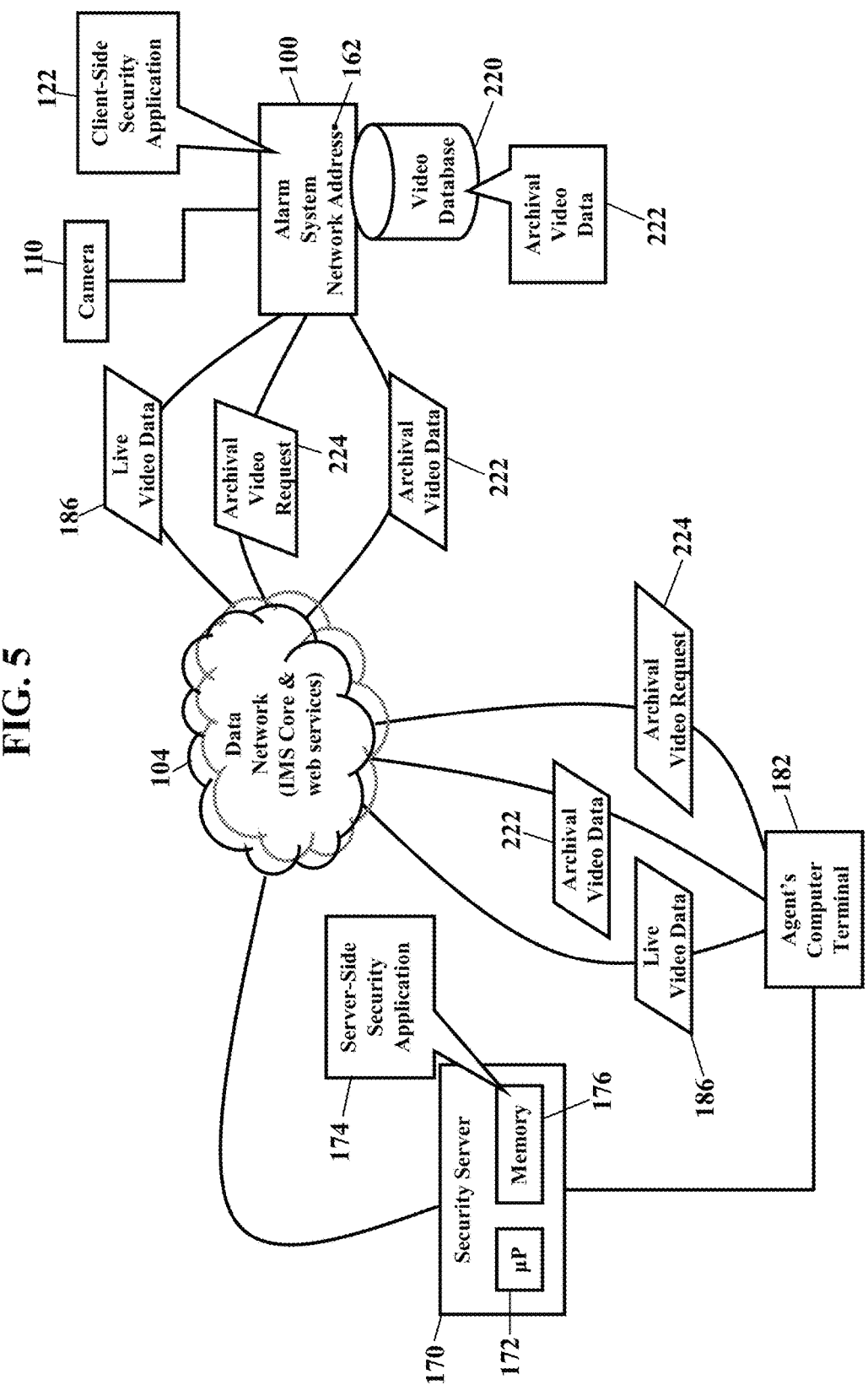
FIG. 5 is a schematic illustrating archival video data, according to exemplary embodiments.

FIG. 5 is a schematic illustrating archival video data, according to exemplary embodiments. Even though the agent (illustrated as reference numeral 132 in FIG. 1) may view the live video data 186, the agent 132 may also request and receive older, archived video data. FIG. 5, for example, illustrates a video database 220. As the one or more cameras 110 capture the live video data 186, the client-side security application 122 may instruct the alarm controller 106 to store the live video data 186 in the video database 220. The video database 220 thus builds up, over time, archival video data 222. The video database 220 may thus be used to reveal important archival video data 222 of events that preceded a fire, burglary, or other emergency situation.

FIG. 5 illustrates a local architecture for the video database 220, according to exemplary embodiments. The video database 220 is locally maintained in a local or home network that is shared with the alarm controller 106. That is, any video data captured by the cameras 110 is stored in a home or business network that communicates with the alarm controller 106. Because the video data is locally captured and stored, the video data need not be sent to a remote storage location via the Internet. Upstream bandwidth consumption is thus reduced or not needed. The video database 220, however, may be remotely located from the alarm controller 106, but excessive bandwidth may be needed to upload video data. Regardless, the video database 220 may store the video data on a FIFO ("first in, first out") basis, with each camera 110 having a dedicated memory space or partition. An alternate storage scheme may used, though, such as a "last in, first out" (or "LIFO") basis to speed recovery of the most recent footage. The video database 220 may also store data as a loop that is overwritten after a predetermined time (such as multiple days or weeks, although a two or three day time period may be adequate for most customers). The video database 220 may also date and time stamp the video data to help indexing and retrieval efforts.

However the video database 220 is configured, the agent's computer terminal 182 may request archival footage. The agent 132 instructs his or her computer terminal 182 to send an archival video request 224 to the alarm controller 106. The archival video request 224 routes over the packet data network 104 to the network IP address 162 associated with the alarm controller 106. When the client-side security application 122 receives the archival video request 224, the client-side security application 122 instructs the video database 220 to retrieve the older archival video data 222 and to send the older archival video data 222 to the terminal address (illustrated as reference numeral 188 in FIG. 3) associated with the agent's computer terminal 182. The agent's computer terminal 182 displays the older archival video data 222, thus allowing the agent (illustrated as reference numeral 132 in FIG. 1) to see what events transpired prior to the alarm condition 160. The older archival video data 222 may reveal the cause of a fire, the face of an intruder, or other information that legitimates the alarm condition 160.

Figure 6:
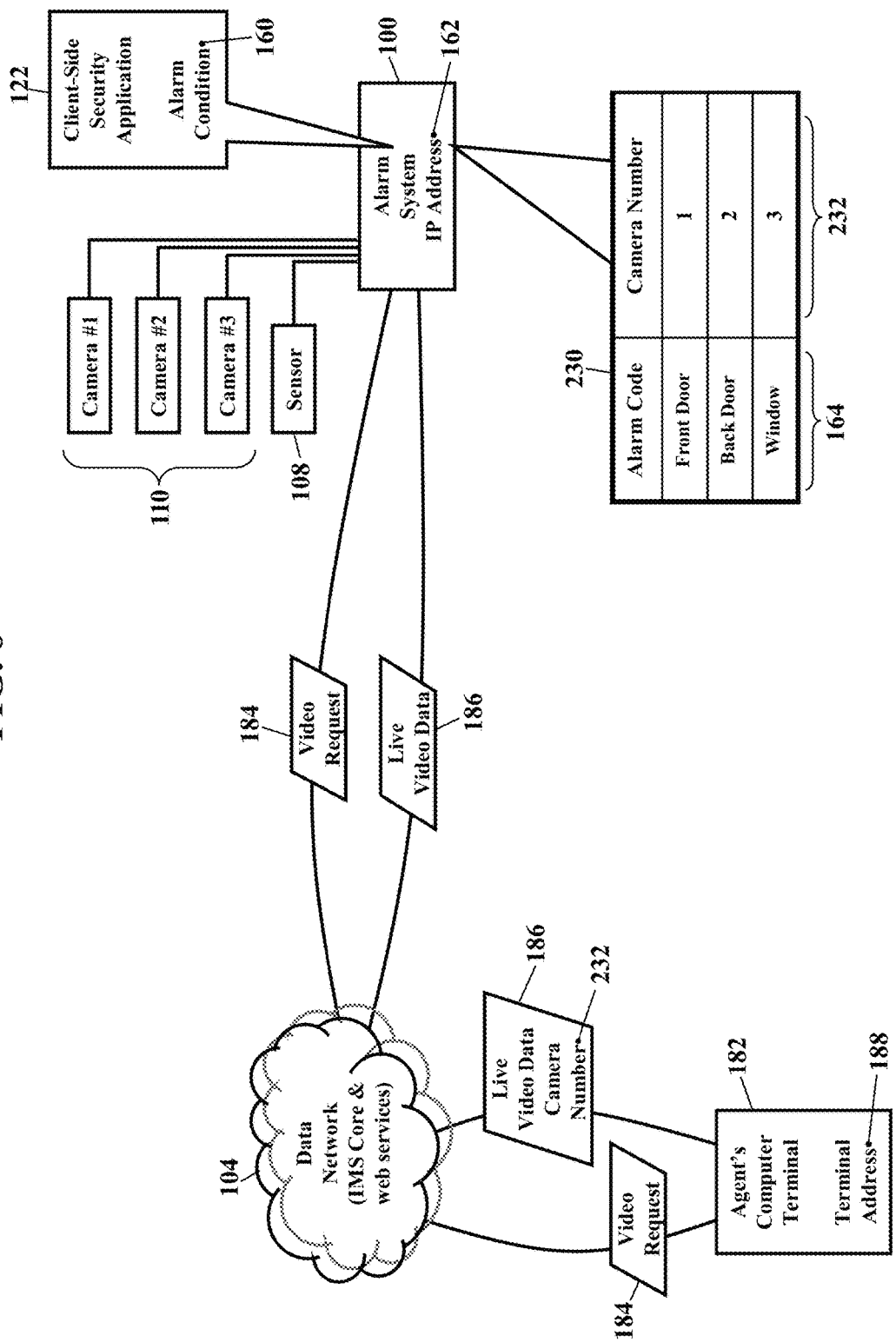
FIG. 6 is a schematic illustrating camera zones, according to exemplary embodiments.

FIG. 6 is a schematic illustrating camera zones, according to exemplary embodiments. Because there may be multiple cameras 110 in a home or business, the live video data 186 may consume too much bandwidth in the packet data network 104. If the client-side security application 122 attempts to send live video data 186 from three (3) different cameras 110, for example, the live video data 186 may likely create or encounter congestion in the packet data network 104. Delivery to the agent's computer terminal 186 may be delayed, or delivery may even fail. Delay or failure may be unacceptable.

Exemplary embodiments, then, may reduce bandwidth consumption. When the alarm condition 160 is detected, the alarm condition 160 may identify the alarm code 164 associated with the sensor 108 that triggered the alarm condition 160. Suppose the alarm code 164 is associated with a front door sensor. Video data of the front door is thus most relevant. Video data of a back door may be less helpful. Bandwidth may thus be reduced by only sending the live video data 186 from a camera aimed at the front door. Video data of the back door may contribute to congestion and delay delivery of the more-important front door video data.

The client-side security application 122 may then associate the alarm code 164 to a particular one (or more) of the cameras 110. When the client-side security application 122 receives the alarm code 164 associated with the sensor 108 that triggered the alarm condition 160, the client-side security application 122 may select only the most relevant video data. The client-side security application 122, for example, may query a camera table 230 that is stored in the memory (illustrated as reference numeral 124 in FIGS. 1 & 2) of the alarm controller 106. The camera table 230 maps, relates, or otherwise associates the alarm code 164 to a camera number 232. Each of the cameras 110 is uniquely identified with the camera number 232. Each camera number 232 may be any alpha-numeric identifier. The client-side security application 122 retrieves the camera number 232 that is associated with the alarm code 164. When the client-side security application 122 receives the video request 184, the client-side security application 122 may then retrieve only the live video data 186 associated with the retrieved camera number 232. The client-side security application 122 instructs the alarm controller 106 to send only the live video data 186 associated with the camera number 232 to the agent's computer terminal 182. Because only the relevant video data is sent, less bandwidth is needed.

Any video data, from any camera 110, is also available. Even though the client-side security application 122 may initially send only live video data 186 associated with the camera number 232, the agent (illustrated as reference numeral 132 in FIG. 1) may request video data from any camera 110. After the agent 132 views the live video data 186 from the camera number 232 associated with the alarm code 164, the agent 132 may want video data from other cameras. When agent's computer terminal 182 sends a subsequent video request 184, the agent may specify output from a particular camera number 232. The client-side security application 122 retrieves the live video data 186 associated with the requested camera number 232 and sends the requested live video data 186 to the terminal IP address 188 associated with the agent's computer terminal 182.

Zones may also be used. When the alarm condition 160 is detected, the alarm condition 160 may identify the alarm code 164 associated with the sensor 108 that triggered the alarm condition 160. The client-side security application 122 may then query the camera table 230 for the zone and for the associated camera number 232. The client-side security application 122 may then retrieve only the live video data 186 associated with the retrieved camera number 232. Exemplary embodiments may thus enable communication of the specific sensor that triggered the alarm.

Figure 7:
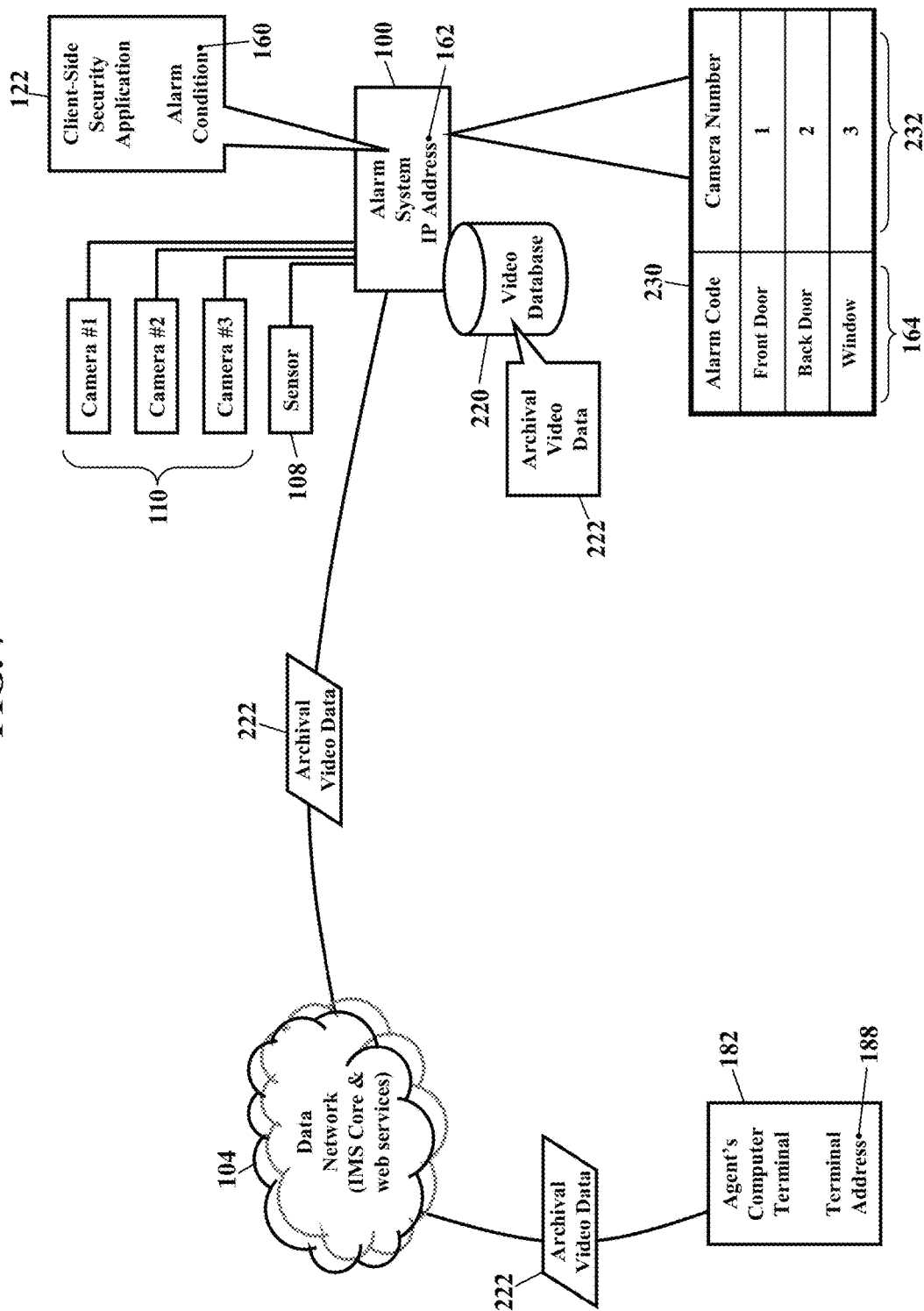
FIG. 7 is a schematic illustrating archival camera zones, according to exemplary embodiments.

FIG. 7 is a schematic illustrating archival camera zones, according to exemplary embodiments. Here the camera table 230 may also be used to retrieve the archival video data 222 associated with a particular camera number 232. Once the alarm code 164 is known, the client-side security application 122 queries the camera table 230 for the camera number 232 associated with the alarm code 164. The client-side security application 122 retrieves the camera number 232 and instructs the video database 220 to retrieve the archival video data 222 associated with the camera number 232. The video database 220 may then send the archival video data 222 to the terminal IP address 188 associated with the agent's computer terminal 182. The agent's computer terminal 182 displays the older archival video data 222, thus allowing the agent 132 to see what events preceded the alarm condition 160.

Figure 8:
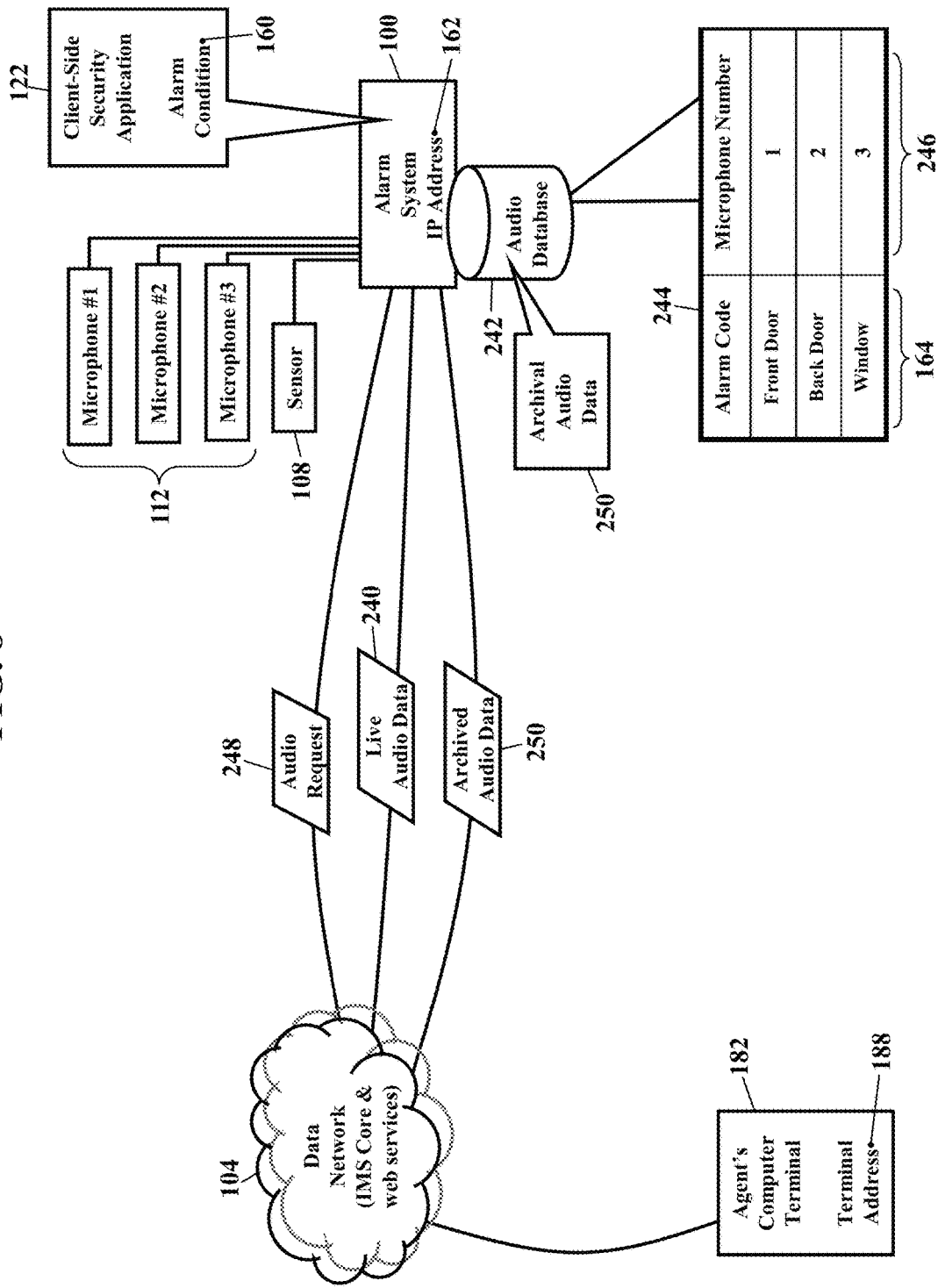
FIG. 8 is a schematic illustrating audio data, according to exemplary embodiments.

FIG. 8 is a schematic illustrating audio data, according to exemplary embodiments. The alarm system 100 may include one or more microphones that capture real-time, live audio data 240. The live audio data 240 may be sent to the agent's computer terminal 182 to help the agent (illustrated as reference numeral 132 in FIG. 1) evaluate the emergency situation. The live audio data 240 may also be stored in an audio server 242 to provide a long-term repository of audio data. The audio server 242 is again illustrated as being locally maintained in the customer's local network to reduce bandwidth consumption. The audio server 242 may store the video data on a FIFO ("first in, first out") or LIFO ("last in, last out") basis, with each microphone 112 having a dedicated memory space or partition. The audio server 242 may also store the live audio data 240 as a loop that is overwritten after a predetermined time, and the audio server 242 may also date and time stamp the audio data 240 to help indexing and retrieval efforts. FIG. 8 also illustrates a microphone table 244 modified to also associate the alarm code 164 to a unique microphone number 246. When the client-side security application 122 receives an audio request 248, the client-side security application 122 may then retrieve only the live audio data 240 associated with the microphone number 246. The client-side security application 122 may also instruct the audio server 242 to retrieve archived audio data 250 associated with the microphone number 246. Both the live audio data 240 and the archived audio data 250 may thus be sent to the terminal IP address 188 associated with the agent's computer terminal 182. The live audio data 240 and the archived audio data 250 allows the agent 132 to hear what events preceded the alarm code 164.

Figure 9:
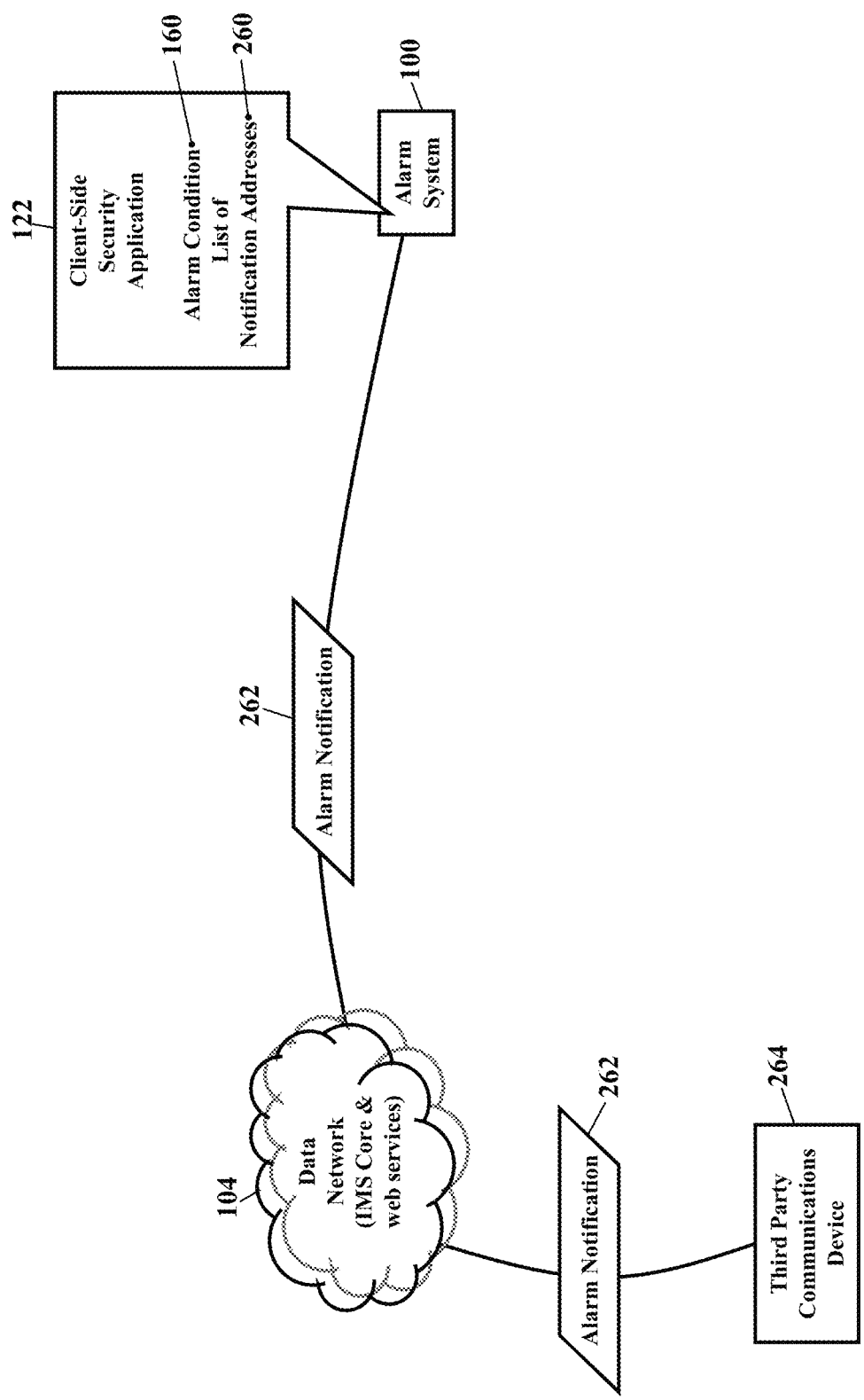
FIGS. 9 and 10 are schematics illustrating remote notification of alarms, according to exemplary embodiments.
Figure 10:
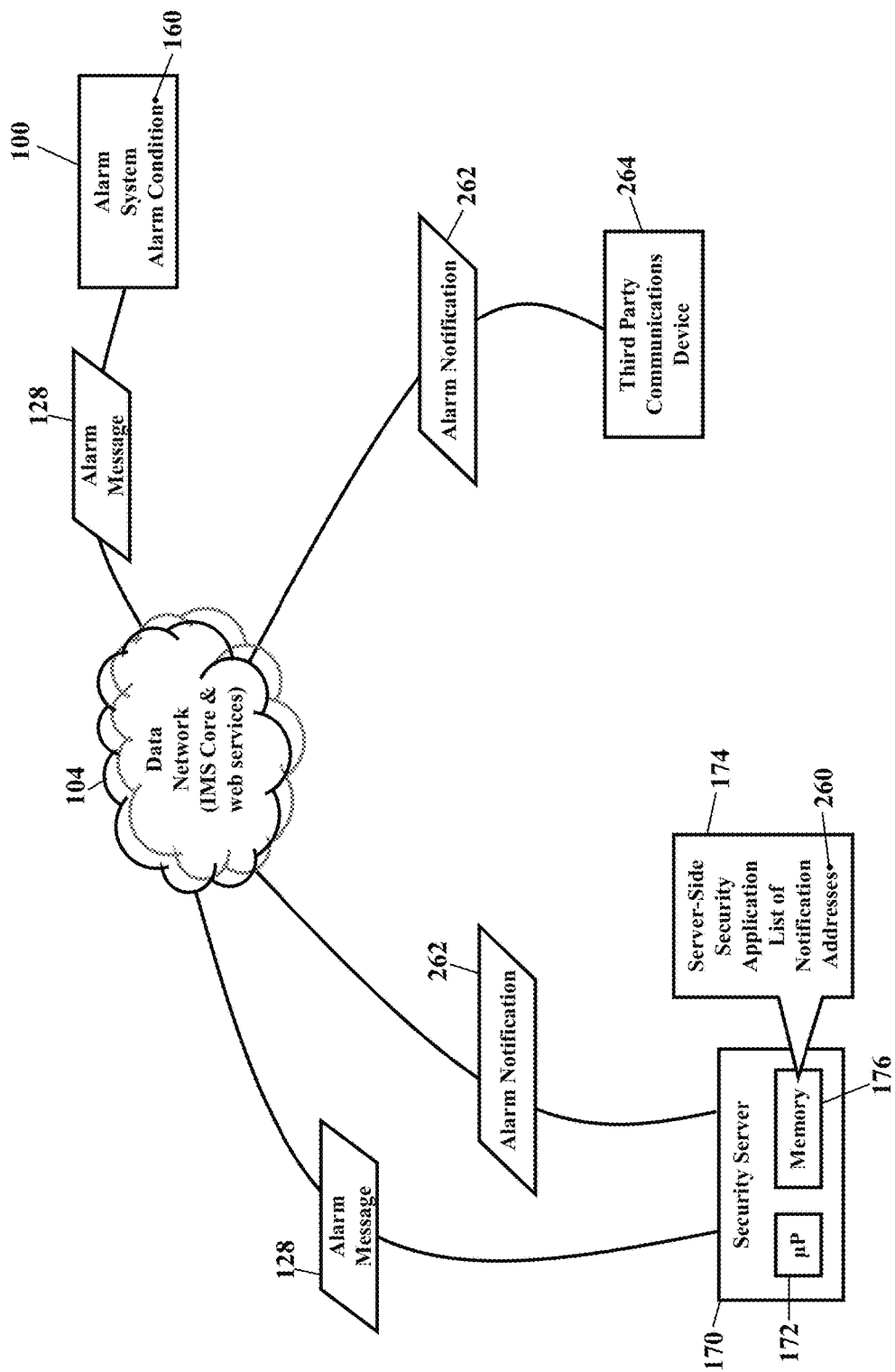

FIGS. 9 and 10 are schematics illustrating remote notification of alarms, according to exemplary embodiments. FIG. 9 illustrates the client-side security application 122 notifying any third party of the alarm condition 160 detected by the security system 100. When the alarm controller 106 detects the alarm condition 160, the client-side security application 122 may access a list 260 of notification addresses. The list 260 of notification addresses is illustrated as being locally stored in the alarm controller 106, but the list 260 of notification addresses may be remotely accessed and retrieved via the packet data network 104. The list 260 of notification addresses stores communications addresses which are notified of the alarm condition 160 detected by the security system 100. Each entry in the list 260 of notification addresses may be a telephone number, I.P. address, email address, pager address, or any other communications address. The client-side security application 122 formats an alarm notification 262, and the alarm notification 262 may include information describing the alarm condition 160 (such as the alarm code 164, a physical street address, and any other information). The client-side security application 122 then sends the alarm notification 262 to each entry in the list 260 of notification addresses. FIG. 9 illustrates the alarm notification 262 communicating via the packet data network 104 to a third party communications device 264 associated with one of the notification addresses. The client-side security application 122 may thus notify friends, neighbors, a spouse, children, and any communications addresses in the list 260 of notification addresses.

FIG. 10 illustrates the server-side security application 174 notifying third parties. When the server-side security application 174 receives the alarm message 128, here the server-side security application 174 accesses the list 260 of notification addresses. The list 260 of notification addresses is illustrated as being locally stored in the security server 170, but the list 260 of notification addresses may be remotely accessed and retrieved via the packet data network 104. The server-side security application 174 formats the alarm notification 262 and sends the alarm notification 262 to each entry in the list 260 of notification addresses. FIG. 10 also illustrates the alarm notification 262 communicating via the packet data network 104 to the third party communications device 264 associated with one of the notification addresses.

Figure 11:
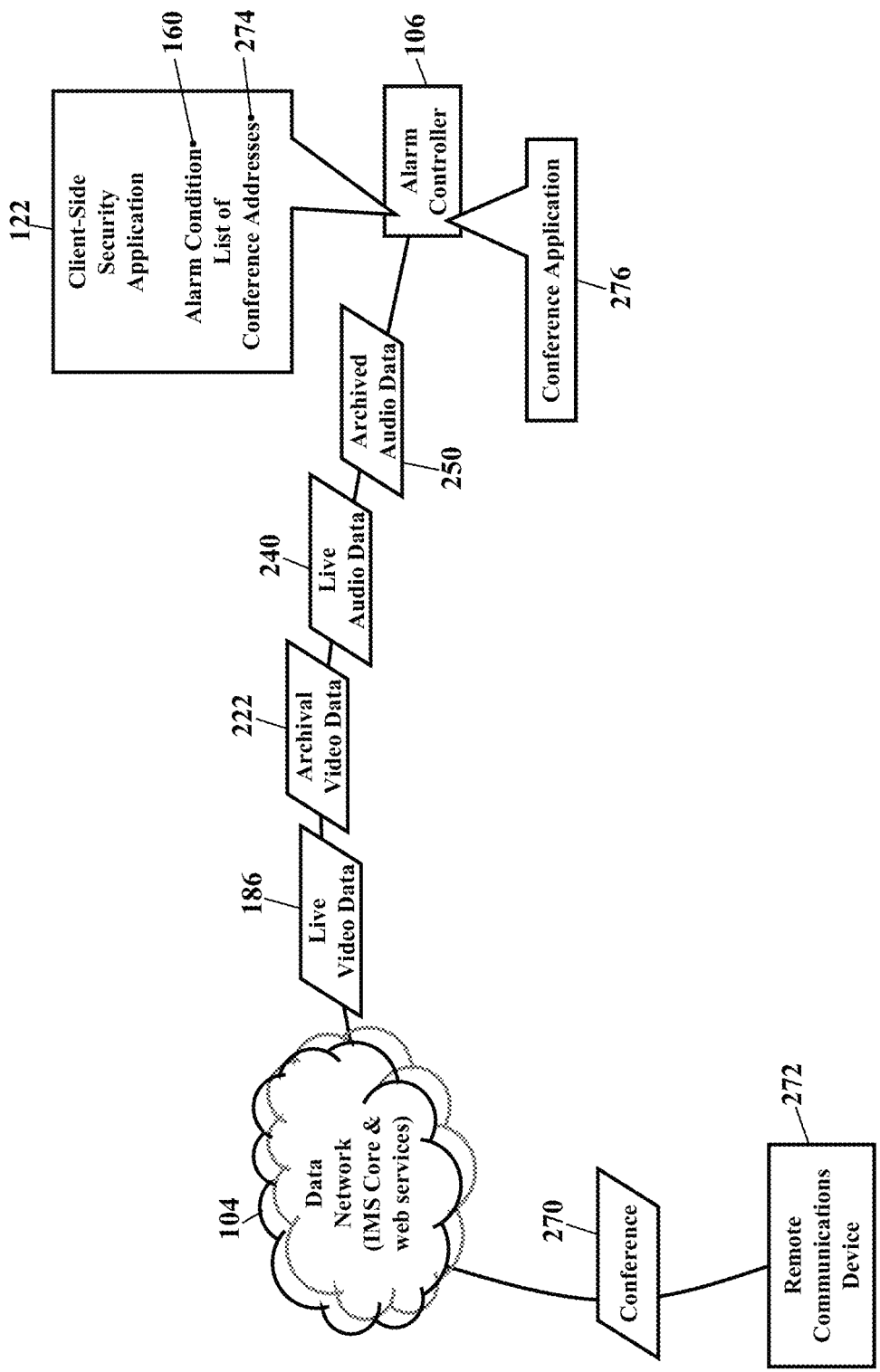
FIGS. 11 and 12 are schematics illustrating alarm conferences, according to exemplary embodiments.
Figure 12:
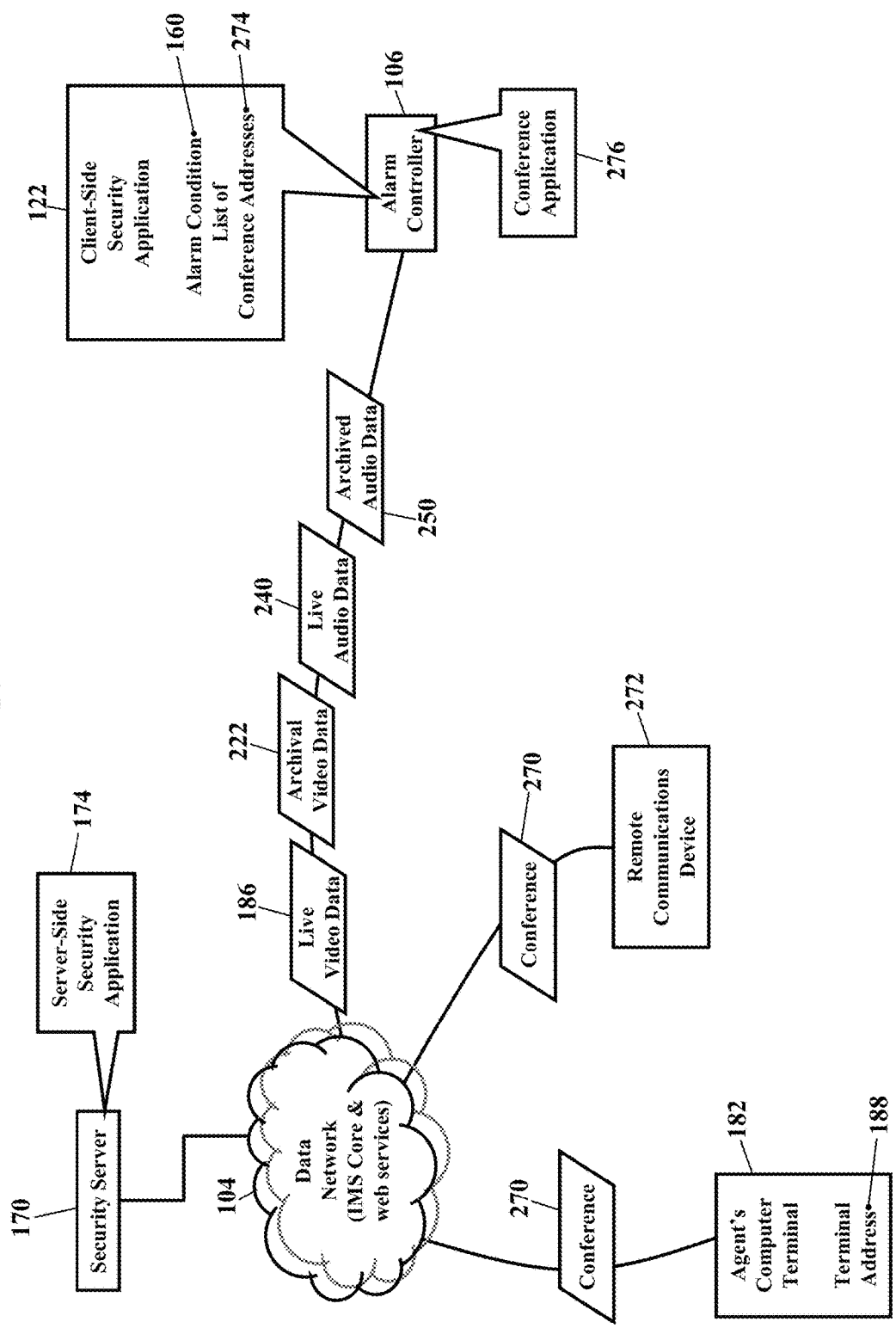

FIGS. 11 and 12 are schematics illustrating alarm conferences, according to exemplary embodiments. When the alarm condition 160 is detected, exemplary embodiments may establish a conference 270 with a remote communications device 272. FIG. 11, for example, illustrates a sessions-based conference that utilizes the packet data network 104. When the alarm controller 106 detects the alarm condition 160, the client-side security application 122 may access a list 274 of conference addresses. The list 274 of conference addresses is illustrated as being locally stored in the alarm controller 106, but the list 274 of conference addresses may be remotely accessed and retrieved via the packet data network 104. The list 274 of conference addresses stores communications addresses which are joined to a shared communications session (such as a Voice-over Internet Protocol conference call, a video conference, or even a text conference). The client-side security application 122 calls or invokes a conference application 276 that establishes the conference 270. The conference application 276 is illustrated as being locally stored in the alarm controller 106, but the conference application 276 may be remotely accessed via the packet data network 104. The conference application 276, for example, may be a service offered by a service provider. Regardless, the conference application 276 establishes a common session with one or more of the communications addresses in the list 274 of conference addresses. Once the conference 270 is established, the client-side security application 122 cooperates with the conference application 276 to send the live video data 186, the archived video data 222, the live audio data 240, and/or the archived audio data 250 to a conference participant associated with the remote communications device 272. The conference participant is thus able to receive real-time and archived audio and video data of the emergency situation.

FIG. 12 is similar but illustrates the agent's computer terminal 182 as a conference participant. Here the server-side security application 174 may cooperate with the conference application 276 and/or the client-side security application 122 to establish the conference 270 between the agent's computer terminal 182 and any of the communications addresses in the list 274 of conference addresses. Once the conference 270 is established, the live video data 186, the archived video data 222, the live audio data 240, and/or the archived audio data 250 may be shared between the agent's computer terminal 182 and the remote communications device 272. The agent (illustrated as reference numeral 132 in FIG. 1) and the conference participant are thus able to receive real-time and archived audio and video data of the emergency situation. The agent 132 and the conference participant may thus jointly view the video and discuss the alarm condition 160 detected by the security system 100.

Figure 13:
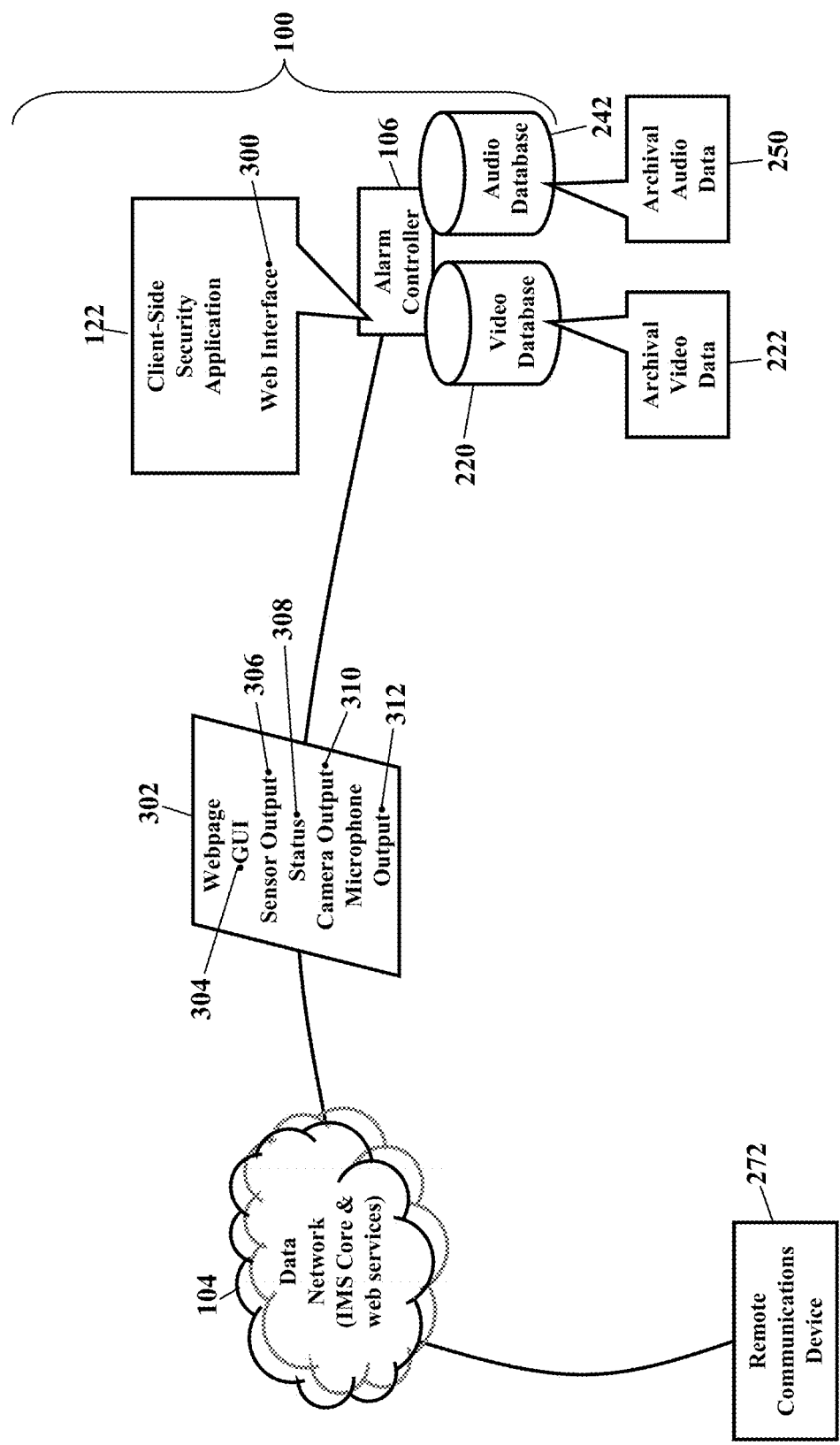
FIGS. 13-18 are schematics illustrating remote monitoring, activation, and cancellation of the security system, according to exemplary embodiments.

FIG. 13 is a schematic illustrating remote monitoring of the security system 100, according to exemplary embodiments. Here the client-side security application 122 may be configured to permit remote access. The client-side security application 122, for example, may include a web interface 300 that permits a remote user to login and download a webpage 302. The webpage 302 may include a graphical user interface ("GUI") 304 that visually presents raw sensor output data 306 from any of the sensors (illustrated as reference numeral 108 in FIGS. 1-2). The graphical user interface 304 may also present a summary status 308 that presents a current or historical status of the security system 100. The graphical user interface 304 may also include data or links to camera output 310 from any of the cameras 110 and/or microphone output 312 from any of the microphones 112. The graphical user interface 304 may thus permit the remote user to download the live video data 186 from any of the cameras 110 and/or the live audio data 240 from any of the microphones 112. The graphical user interface 304 may also provide links or access to the video database 220, thus permitting the remote user to download the archived video data 222. The graphical user interface 304 may also provide links or access to the audio server 242 to download the archived audio data 250.

Figure 14:
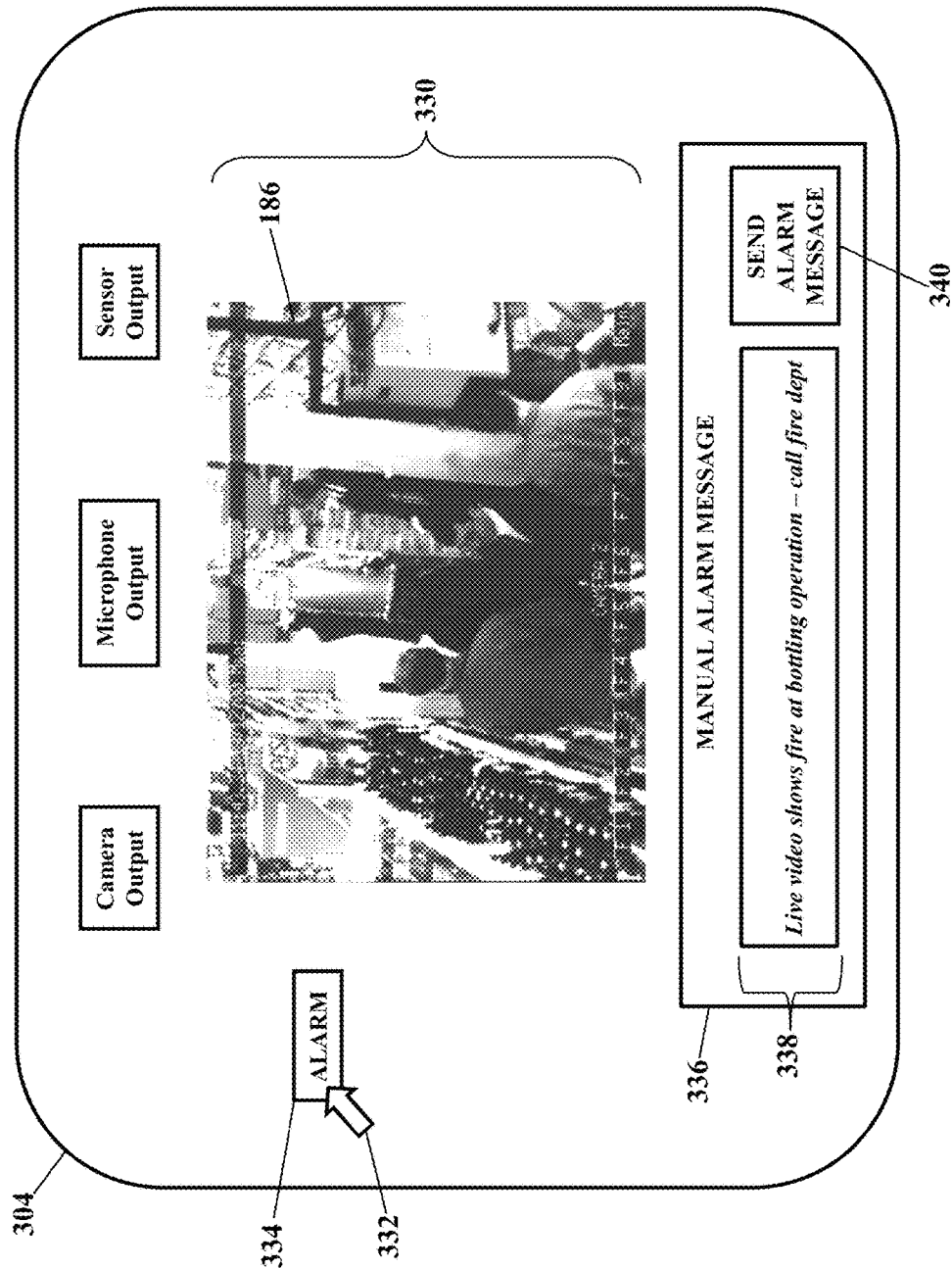
Figure 15:
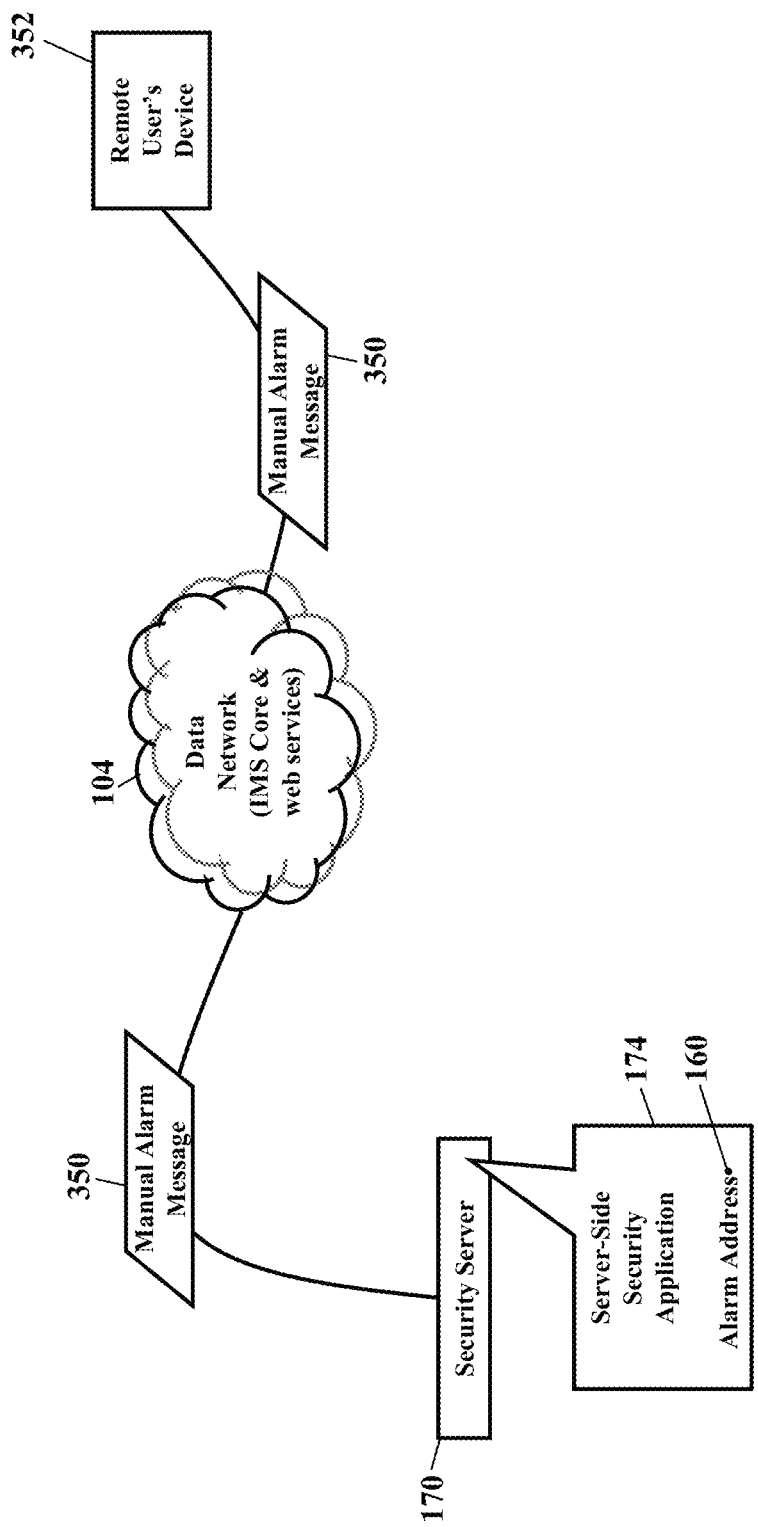

FIGS. 14 and 15 are schematics illustrating remote activation of the security system 100, according to exemplary embodiments. Here the remote user may remotely trigger or activate the security system 100. As the remote user views the live video data 186, for example, the remote user may observe an emergency situation. If no sensor detects the emergency, then the security system 100 may not trigger the alarm condition 106. Here, though, the remote user may instruct the alarm controller 106 to manually trigger the alarm condition 160. FIG. 14, then, illustrates the graphical user interface 304 that presents the live video data 186 from one of the cameras 110. The live video data 186 is downloaded and displayed in a window portion 330 of the graphical user interface 304. If the live video data 186 reveals suspicious activity, the remote user may place a cursor 332 and select an alarm control button 334. When the remote user selects the alarm control button 334, the graphical user interface 304 may display an emergency dialog box 336. The emergency dialog box 336 may include a message field 338 for the remote user to manually enter text explaining the emergency event. Once the text is entered, the remote user selects a SEND ALARM MESSAGE control button 340.

FIG. 15 illustrates a manually created alarm message 350 that is sent to the security server 170. When the remote user selects the SEND ALARM MESSAGE control button 340, the remote user's device 352 sends the manually-created alarm message 350. The manually-created alarm message 350 routes along the packet data network 104 to the IP alarm notification address 130 associated with the security server 170. When the server-side security application 174 receives the manually created alarm message 350, the server-side security application 174 may summon emergency services. The manually created alarm message 350 may include information that describes the security system 100, the physical address associated with the security system 100, and the text entered into the message field 338 of the emergency dialog box 336.

Figure 16:
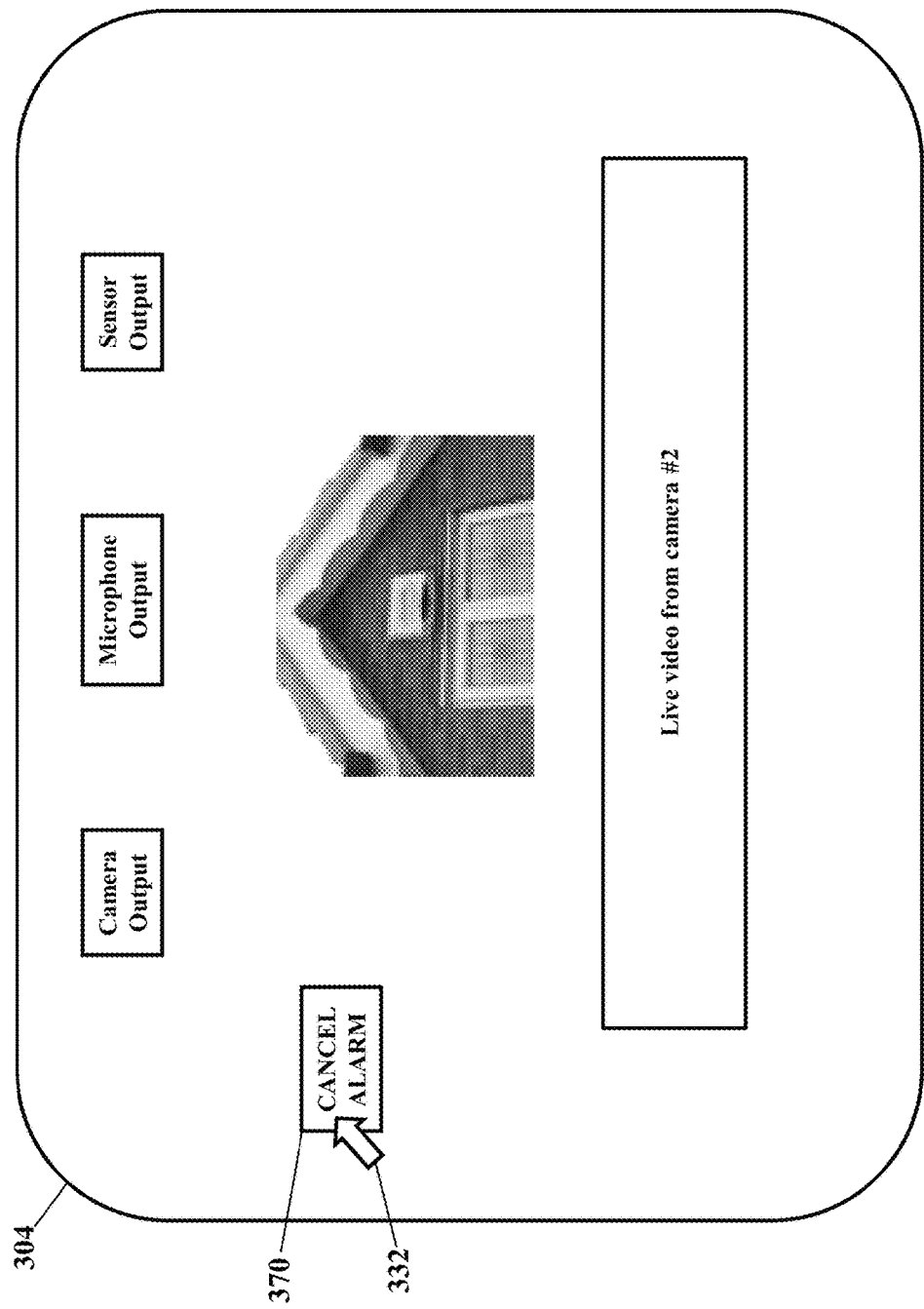
Figure 17:
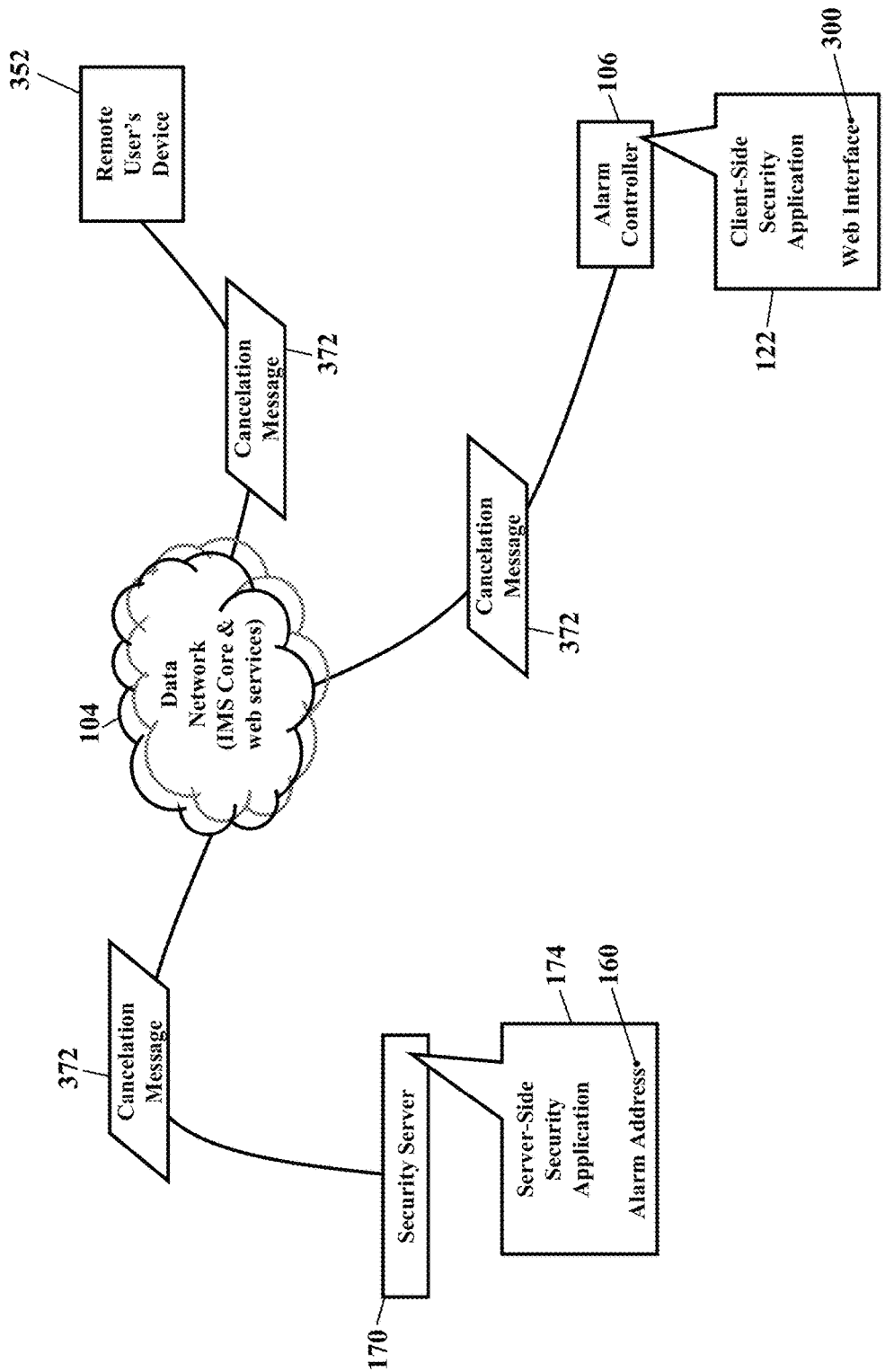

FIGS. 16 and 17 are schematics illustrating remote cancellation of the security system 100, according to exemplary embodiments. Here the third party remote user may cancel, or deactivate, the alarm condition 160 to avoid "false" alarms. When the alarm condition 160 is detected, the client-side security application 122 and/or the server-side security application 174 may provide remote notification of alarms (as FIGS. 9 and 10 illustrated). Suppose, for example, that the remote user is notified of the alarm condition 160. The remote user may immediately login to the client-side security application 122 (via the web interface 300), download the graphical user interface 304, and link to or download real-time and archived audio and/or video data. The remote user may decide, after reviewing the video data, that a "false" alarm has occurred. The graphical user interface 304 may include a CANCEL ALARM control button 370. When the remote user selects the CANCEL ALARM control button 370, FIG. 17 illustrates a cancellation message 372 that is sent to the client-side security application 122 and/or the server-side security application 174 (via the packet data network 104). The cancellation message 372 may cause the client-side security application 122 to cancel the alarm condition 160. The cancellation message 372 may also cause the server-side security application 174 to inform the agent (illustrated as reference numeral 132 in FIG. 1) of the false alarm. The cancellation message 372 may thus help the remote user avoid a governmental fee for an emergency dispatch.

Figure 18:
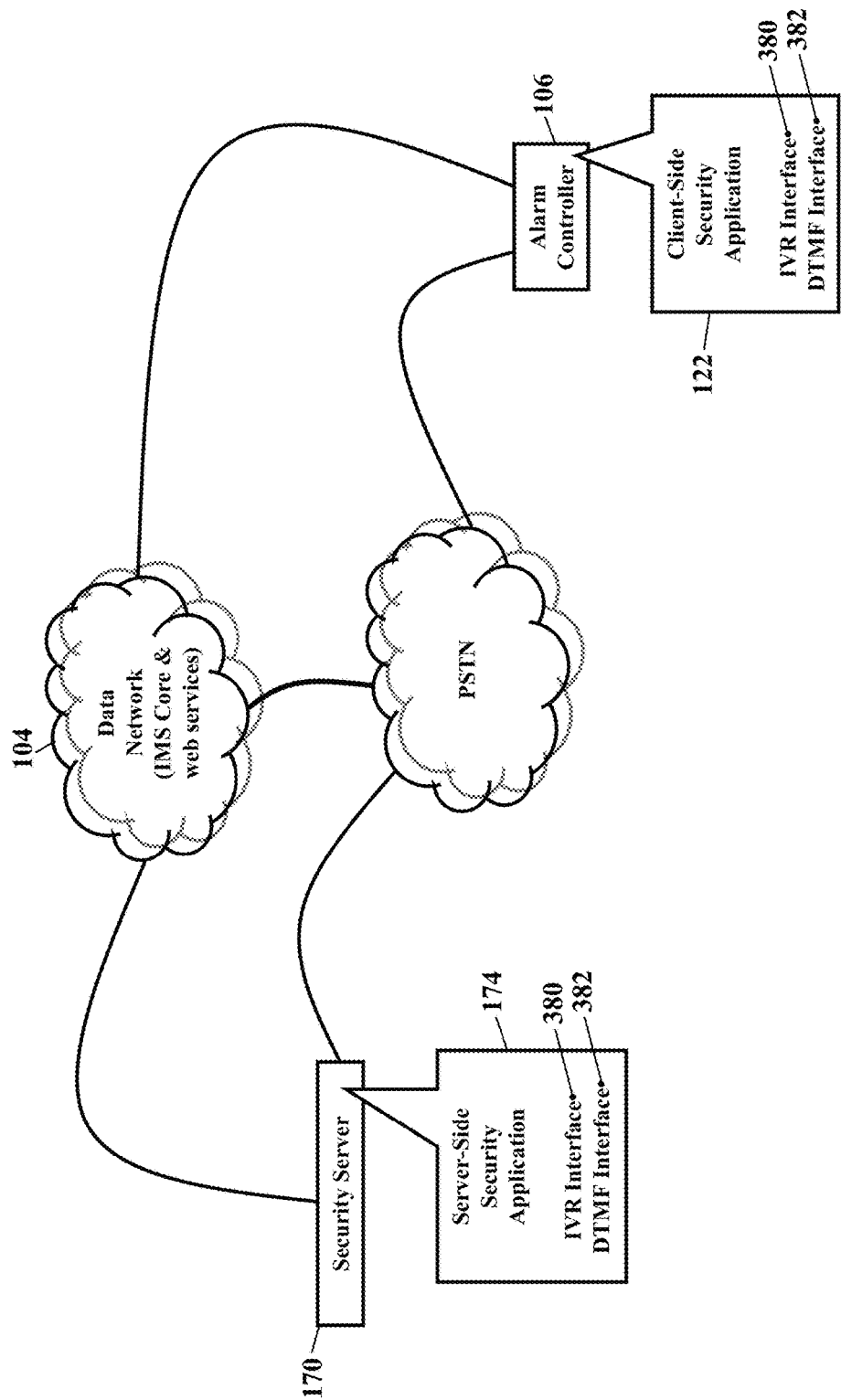

FIG. 18 is another schematic illustrating remote monitoring of the security system 100, according to exemplary embodiments. Here the client-side security application 122, and/or the server-side security application 174, may include other remote access features. The client-side security application 122, for example, may include an IVR interface 380 that receives and interprets voice commands. A remote user may dial a phone number that provides telephony access to the client-side security application 122. The IVR interface 380 interprets spoken commands that permit remote activation and deactivation of alarms. The IVR interface 380 may also respond to audible configuration commands. FIG. 18 also illustrates a DTMF interface 382. The DTMF interface 382 accepts and responds to dual-tone multi-frequency ("DTMF") inputs that permit remote configuration, remote activation, and remote deactivation. As FIG. 18 also illustrates, the server-side security application 174 may also include the IVR interface 380 and/or the DTMF interface 382.

Figure 19:
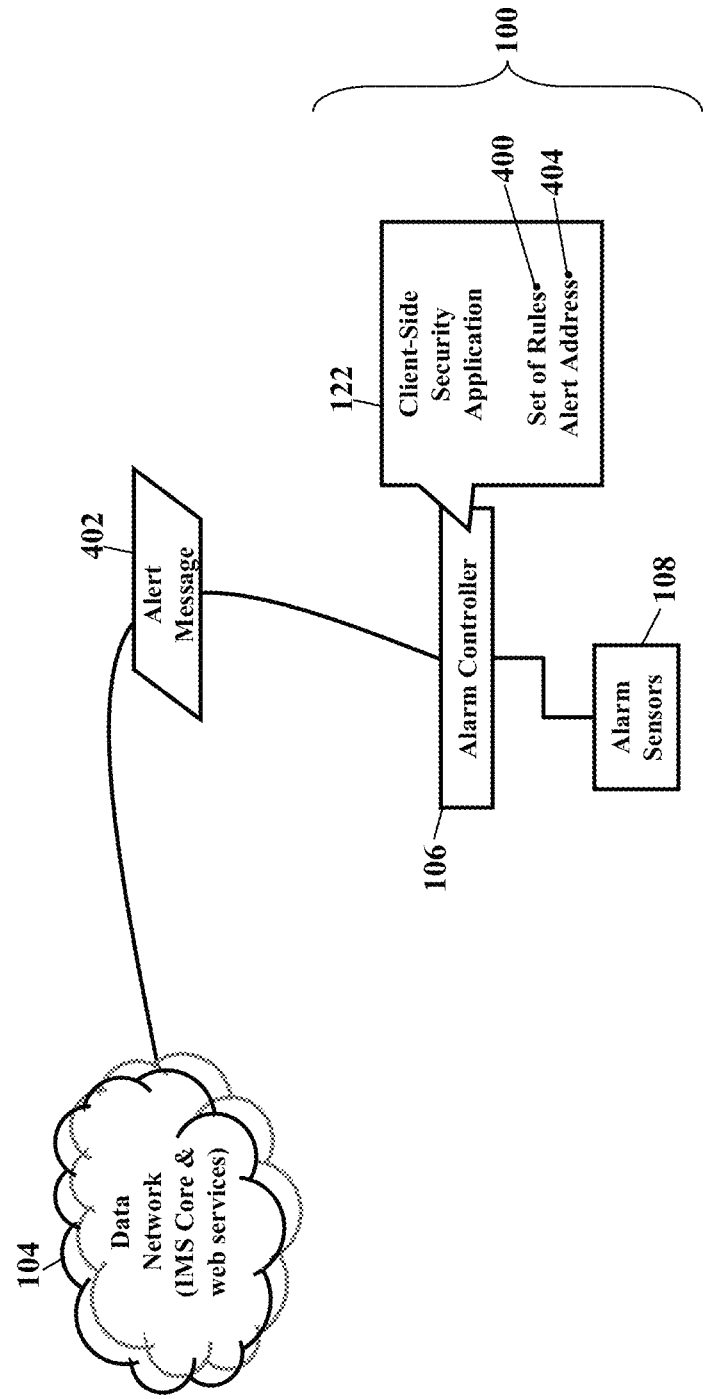
FIG. 19 is a schematic illustrating personalized alerts, according to exemplary embodiments.

FIG. 19 is a schematic illustrating personalized alerts, according to exemplary embodiments. Here the client-side security application 122 may send updates and alerts to keep a user informed of the status of the security system 100. As the alarm controller 106 receives sensor data from the sensors 108, the client-side security application 122 may access a set 400 of rules. The set 400 of rules is illustrated as being locally stored in the alarm controller 106, but the set 400 of rules may be remotely accessed and retrieved via the packet data network 104. The set 400 of rules stores one or more logical rules that determine when an action is taken. Here the logical rules may describe personalized alerts. One such rule, for example, may be a heat rule. When the client-side security application 122 receives information indicating a heat sensor is detecting temperatures above a threshold temperature, then the client-side security application 122 may instruct the alarm controller 106 to send an alert message 402 to an alert address 404. The heat rule may also instruct the client-side security application 122 to download a local weather forecast associated with the physical address of the alarm controller 106. The heat rule would then instruct the client-side security application 122 to include the local weather forecast in the alert message 402. If glass breakage is detected, another rule may instruct the client-side security application 122 to download businesses that repair glass and to include the businesses in the alert message 402. If smoke is detected, yet another rule may instruct the client-side security application 122 to download businesses that repair smoke damage and to include the businesses in the alert message 402. Other rules may be configured to provide any information desired.

Figure 20:
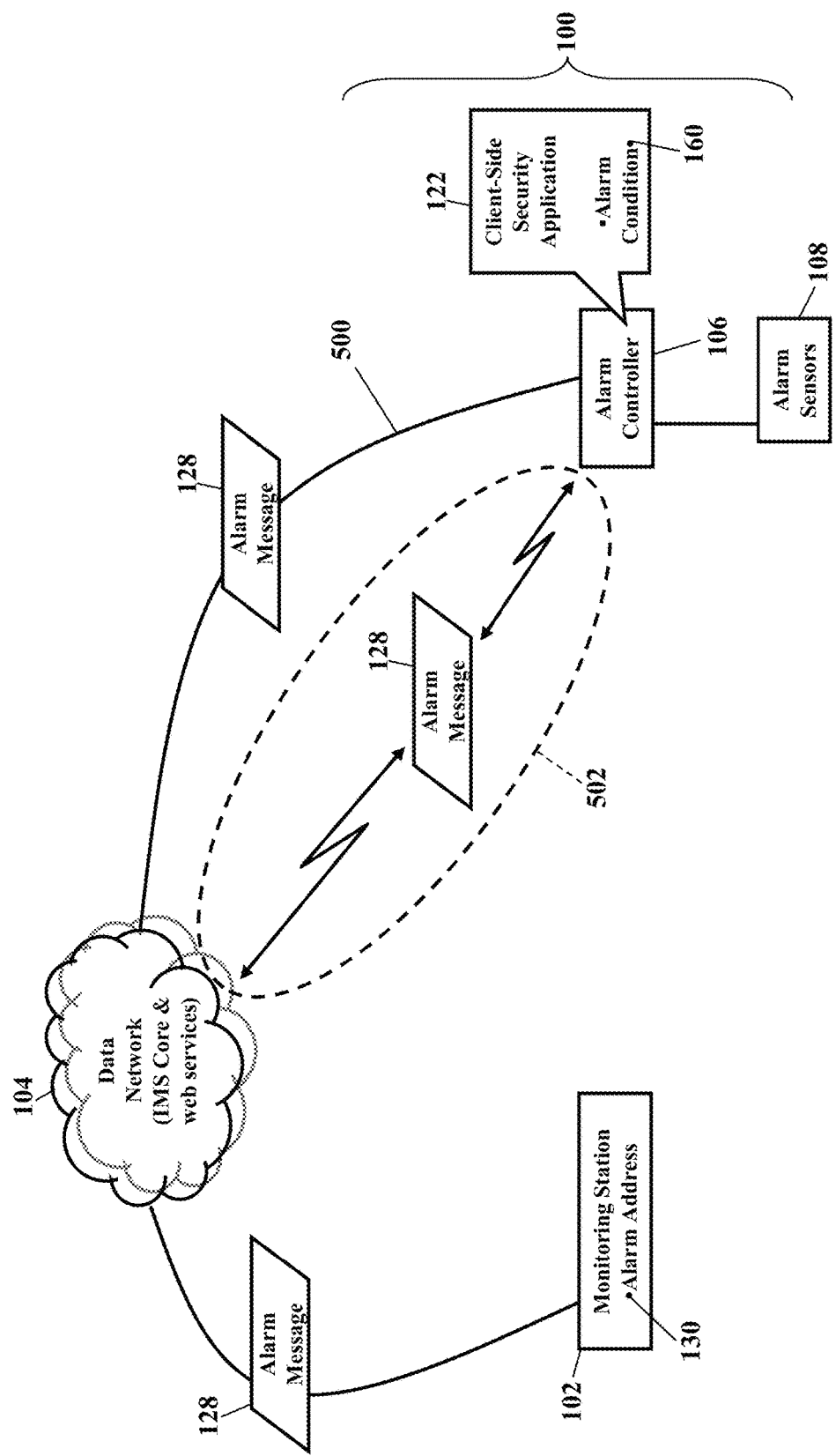
FIGS. 20-26 are detailed schematics illustrating wireline and wireless connections, according to exemplary embodiments.

FIGS. 20-23 are even more detailed schematics illustrating the exemplary embodiments. FIG. 20 illustrates the selection of a network connection to the packet data network 104. When the client-side security application 122 detects the alarm condition 160 from one of the sensors 108, the client-side security application 122 must connect to the packet data network 104 to send the alarm message 128 to the central monitoring station 102. If the client-side security application 122 cannot connect to the packet data network 104, then the client-side security application 122 may utilize other notification architectures (as later paragraphs will explain).

FIG. 20, then, illustrates two (2) different, simultaneous connections to the packet data network 104. The client-side security application 122 may send the alarm message 128 over a wireline broadband network connection 500 to the packet data network 104. The client-side security application 122 may also send the alarm message 128 over a wireless network connection 502 to the packet data network 104. While exemplary embodiments may send the alarm message over both the wireline broadband network connection 500 and the wireless network connection 502, exemplary embodiments may prefer the wireline broadband network connection 500 over the wireless network connection 502. Even though technological advances may continually improve wireless data rates (e.g., bits per second), it is likely that the wireline broadband network connection 500 will be "faster" than the wireless network connection 502. That is, the wireline broadband network connection 500 may usually have a greater data rate than the wireless network connection 502. The client-side security application 122 may thus prefer to send the alarm message 128 over the fastest connection to the packet data network 104 to obtain emergency help as fast as possible. The faster wireline broadband network connection 500 may also provide greater clarity for the Voice-over Internet Protocol call (illustrated as reference numeral 124 in FIG. 1).

The two (2) different connections also provide redundancy. The wireline broadband network connection 500 and the wireless network connection 502 help ensure that the central monitoring station 102 has two-way communications capabilities with the security system 100. Even though the wireline broadband network connection 500 may be preferable, the wireless network connection 502 provides a backup, alternative connection to the packet data network 104.

The client-side security application 122 may thus continually monitor the status of the wireline broadband network connection 500 and the wireless network connection 502. When the alarm condition 160 is detected, the client-side security application 122 may first determine whether the wireline broadband network connection 500 to the packet data network 104 is available. When the wireline broadband network connection 500 is available, the client-side security application 122 routes the alarm message 128 over the wireline broadband network connection 500 to the IP alarm notification address 130 associated with the central monitoring station 102. When, however, the wireline broadband network connection 500 is unavailable, the client-side security application 122 routes the alarm message 128 over the wireless network connection 502 to the IP alarm notification address 130. Regardless, when the central monitoring station 102 receives the alarm message 128, the central monitoring station 102 may summon emergency services, as earlier paragraphs explained.

Figure 21:
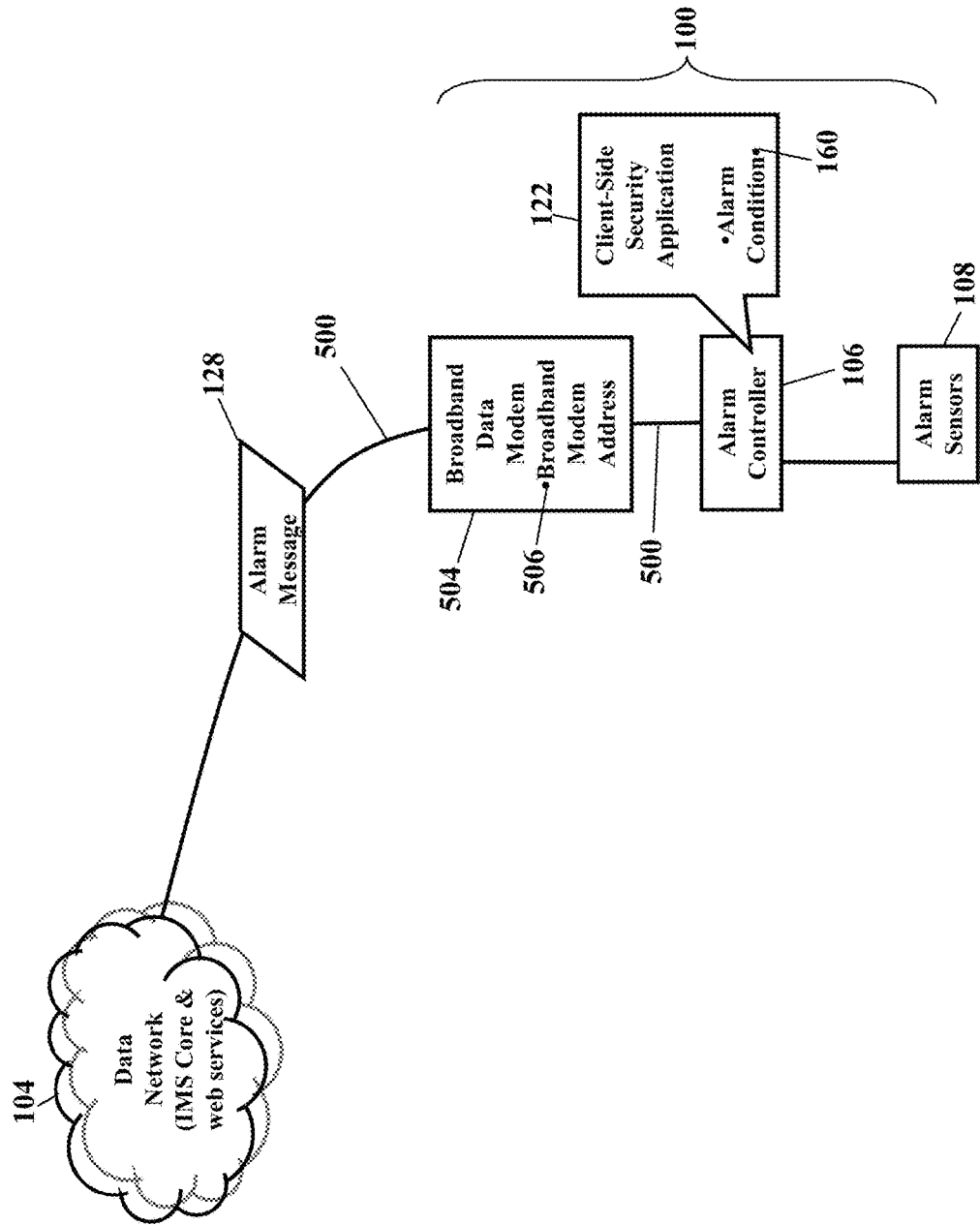

FIG. 21 is a detailed schematic illustrating the wireline broadband network connection 500, according to exemplary embodiments. The alarm controller 106 communicates with a broadband data modem 504. The broadband data modem 504 communicates with the packet data network 104. The broadband data modem 504 modulates and/or demodulates data that is sent to, and received from, the packet data network 104. The broadband data modem 504 is well known to those of ordinary skill in the art, so the architecture and operating principles of the broadband data modem 504 need not be discussed. The broadband data modem 504 may be addressable, so the broadband data modem 504 may have a unique or shared broadband modem address 506. When the alarm condition 160 is detected, and when the wireline broadband network connection 500 is available, the client-side security application 122 may route the alarm message 128 over the wireline broadband network connection 500 to the packet data network 104.

Figure 22:
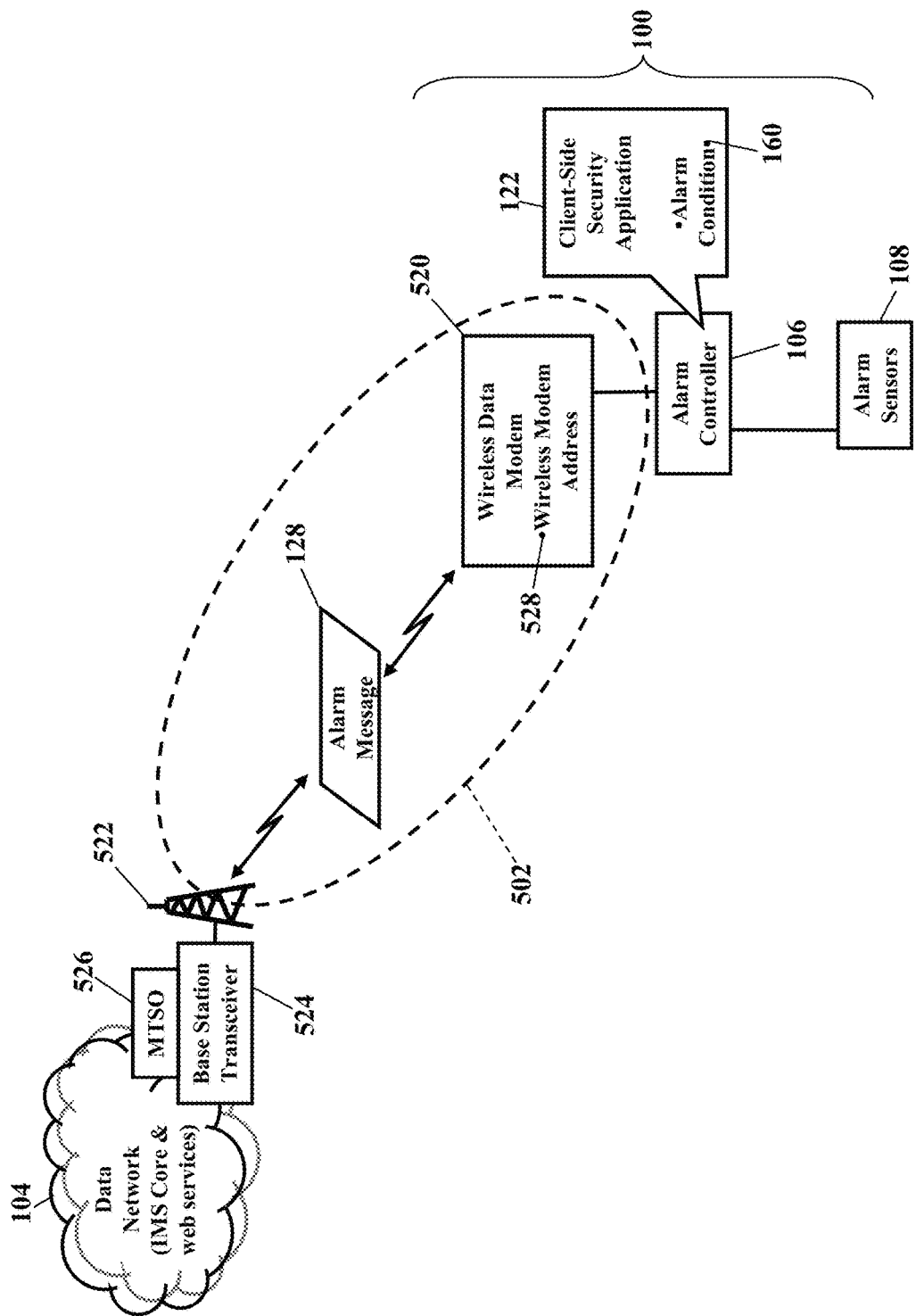

FIG. 22 is a detailed schematic illustrating the wireless network connection 502, according to exemplary embodiments. The alarm controller 106 also communicates with a wireless data modem 520. The wireless data modem 520 also communicates with the packet data network 104. FIG. 22 illustrates a cellular architecture, in which the wireless data modem 520 uses cellular technology to communicate with the packet data network 104. The wireless data modem 520 sends and receives data to an antenna 522 of a base station transceiver 524. The base station transceiver 524 communicates with a mobile telephone switching office ("MTSO") 526, and the mobile telephone switching office 526 has a data link to the packet data network 104. The wireless data modem 520 modulates and/or demodulates the signals that are received and sent via the base station transceiver 524. The wireless data modem 520 is again well known to those of ordinary skill in the art, so the wireless data modem 520 need not be discussed in more detail. The wireless data modem 520 may be addressable, so the wireless data modem 520 may also have a unique or shared wireless modem address 528. When the alarm condition 160 is detected, then the client-side security application 122 may route the alarm message 128 over the wireless network connection 502 to the packet data network 104.

Figure 23:
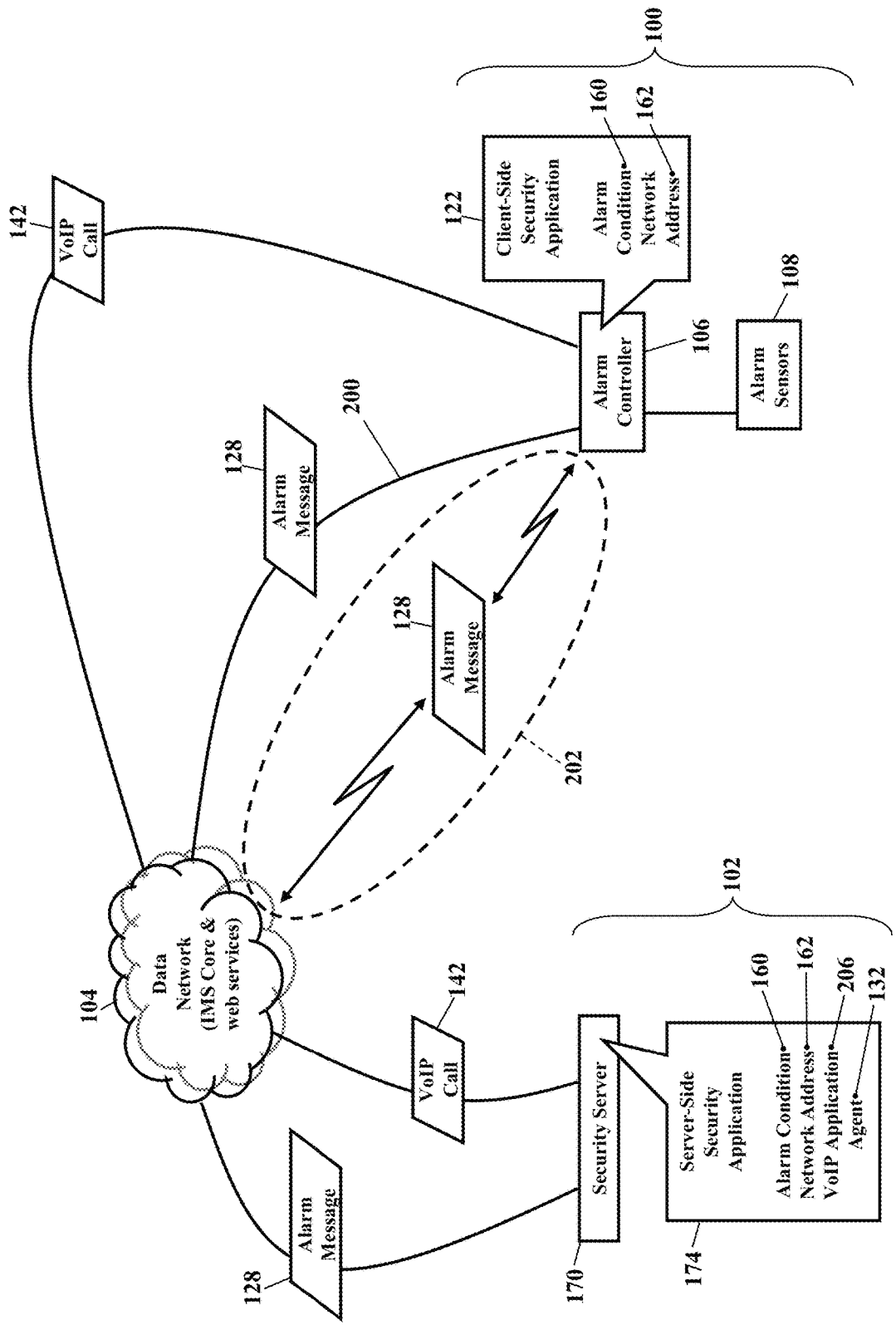

FIG. 23 is a more detailed schematic illustrating receipt of the alarm message 128. The alarm message 128 may route over the wireline broadband network connection 500 to the packet data network 104, or the alarm message 128 may route over the wireless network connection 502 to the packet data network 104. However the alarm message 128 routes, the security server 170 at the central monitoring station 102 receives the alarm message 128. The server-side security application 174 may then established the Voice-over Internet Protocol call 142.

FIG. 23, though, illustrates the Voice-over Internet Protocol call 142 routing back to the alarm controller 106. Because the alarm controller 106 maintains two-way communications capabilities with the central monitoring station 102, the alarm controller 106 may have the capability to conduct the Voice-over Internet Protocol call 142. That is, the alarm controller 106 includes circuitry, componentry, and programming to conduct the Internet Protocol call 142 with the central monitoring station 102. The alarm controller 106, for example, may include a microphone, speaker, and/or other components that function to process the Voice-over Internet Protocol call 142.

The server-side security application 174 may thus initiate the Voice-over Internet Protocol call 142 to the alarm controller 106. When the server-side security application 174 obtains the network IP address 162 from the alarm message 128, the server-side security application 174 may establish the Voice-over Internet Protocol call 142 to the alarm controller 106. The server-side security application 174 calls or invokes the Voice-over Internet Protocol ("VoIP") application 206 to establish the Voice-over Internet Protocol call 142 to the network IP address 162 associated with the alarm controller 106. A user at the alarm controller 106 may then converse with the computerized or human agent (illustrated as reference numeral 132 in FIG. 1).

Figure 24:
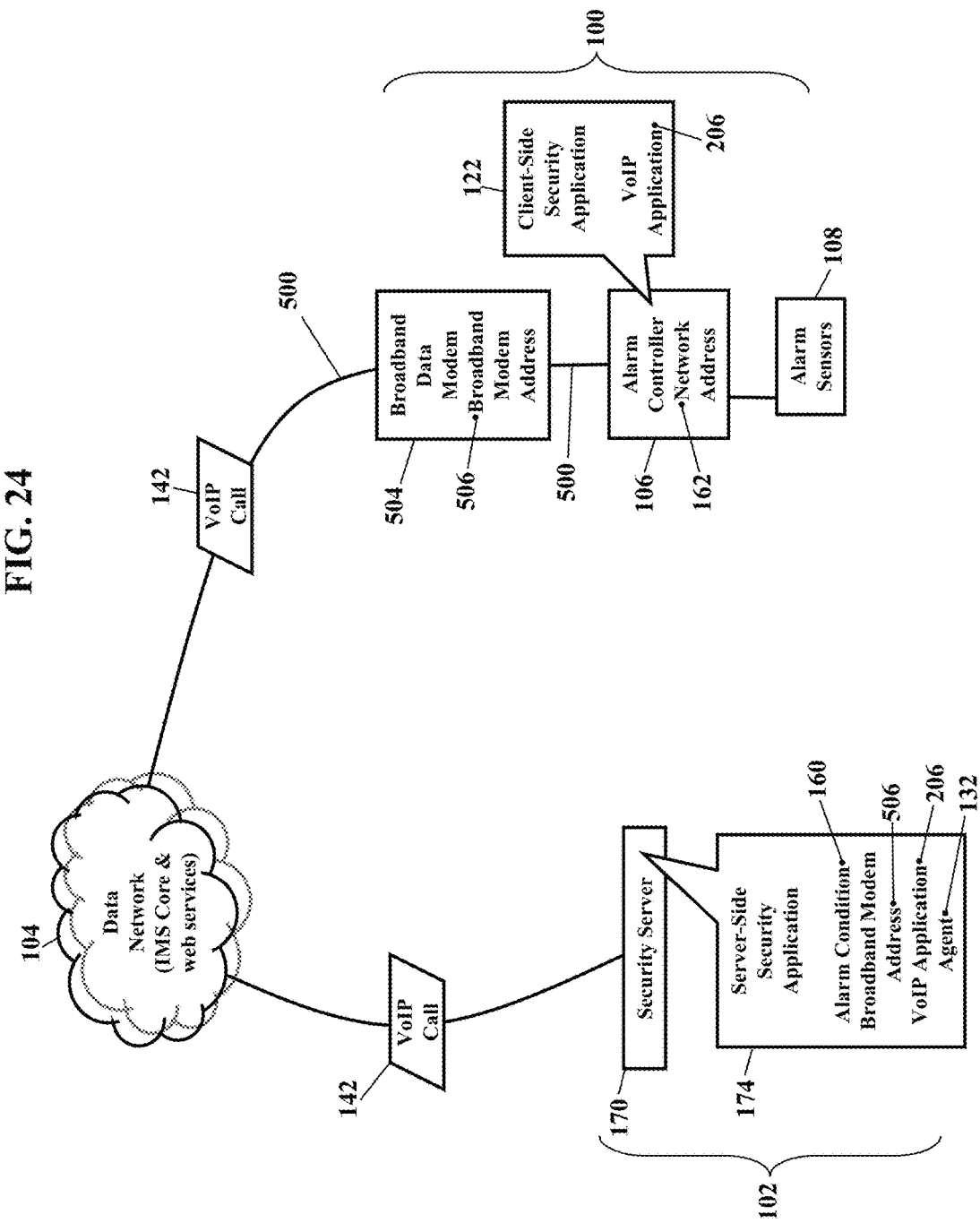

FIG. 24 is a detailed schematic illustrating the Voice-over Internet Protocol call 142 routing over the wireline broadband network connection 500, according to exemplary embodiments. When the server-side security application 174 initiates the Voice-over Internet Protocol call 142 to the alarm controller 106, the server-side security application 174 may prefer the fastest network connection that is available. Because the wireline broadband network connection 500 may usually have a greater data rate, the client-side security application 122 may thus prefer to route the Voice-over Internet Protocol call 142 over the wireline broadband network connection 500 to the broadband modem address 506 associated with the broadband data modem 504. The Voice-over Internet Protocol call 142 then routes from the broadband data modem 504 to the network IP address 162 associated with the alarm controller 106. The client-side security application 122 then calls or invokes the Voice-over Internet Protocol ("VoIP") application 206 to establish the Voice-over Internet Protocol call 142 with the central monitoring station 102. A user at the alarm controller 106 may then converse with the computerized or human agent 132.

Figure 25:
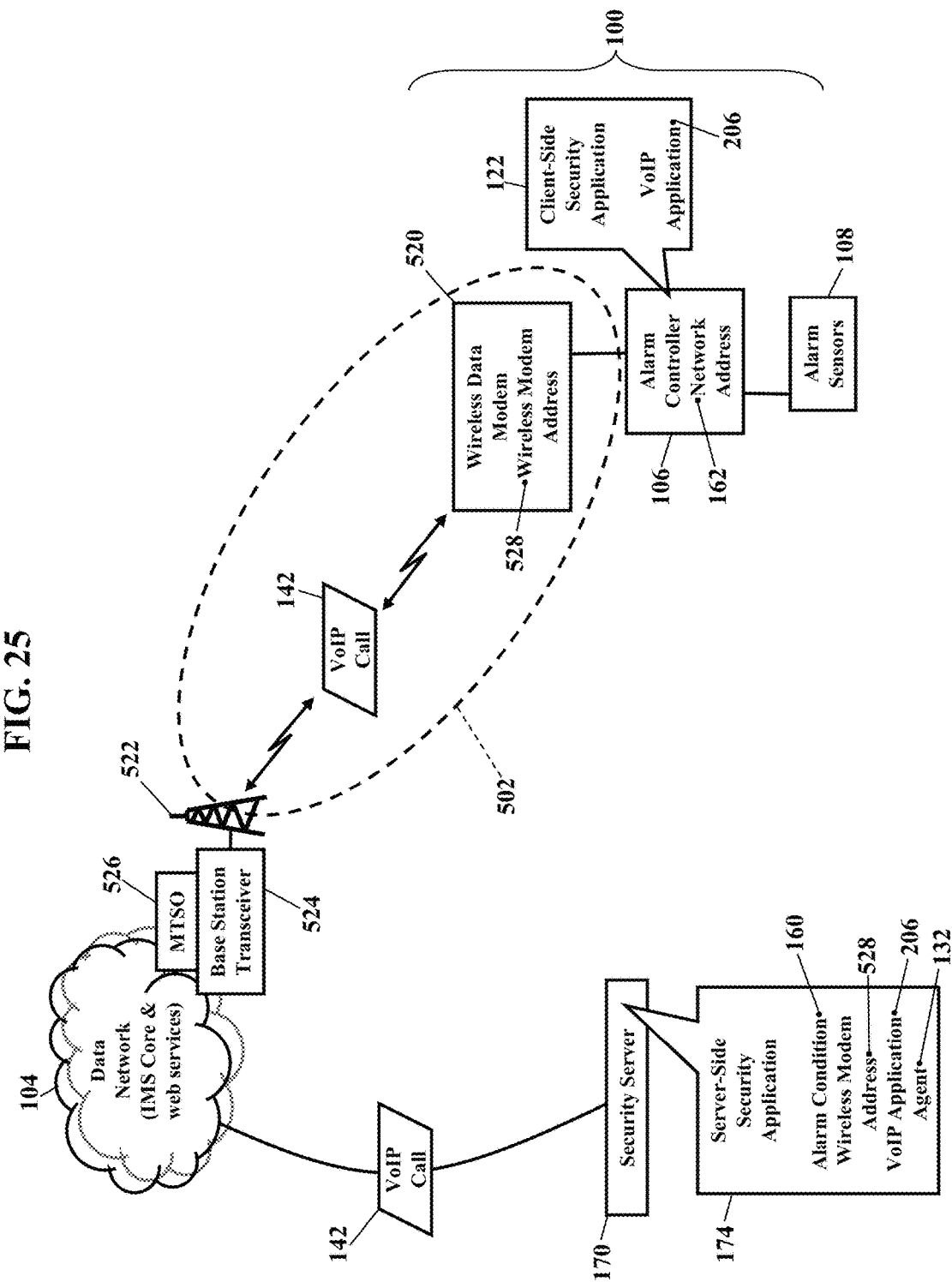

FIG. 25 is a detailed schematic illustrating the Voice-over Internet Protocol call 142 routing over the wireless network connection 502, according to exemplary embodiments. When the server-side security application 174 initiates the Voice-over Internet Protocol call 142 to the alarm controller 106, the server-side security application 174 may prefer the faster wireline broadband network connection (illustrated as reference numeral 500 in FIG. 21). When the wireline broadband network connection 500 is unavailable, though, the server-side security application 174 may utilize the wireless network connection 502. Even though the wireless network connection 502 may be "slower" (e.g., a lesser bit rate), even the available data rates from today's cellular networks are adequate to conduct the Voice-over Internet Protocol call 142. So, when the wireline broadband network connection 500 is unavailable, the server-side security application 174 may route the Voice-over Internet Protocol call 142 to the wireless modem address 528 associated with the wireless data modem 520. The Voice-over Internet Protocol call 142 then routes from the wireless data modem 520 to the network IP address 162 associated with the alarm controller 106. The client-side security application 122 then calls or invokes the Voice-over Internet Protocol ("VoIP") application 206 to establish the Voice-over Internet Protocol call 142 with the central monitoring station 102. The user at the alarm controller 106 may then converse with the computerized or human agent 132.

Figure 26:
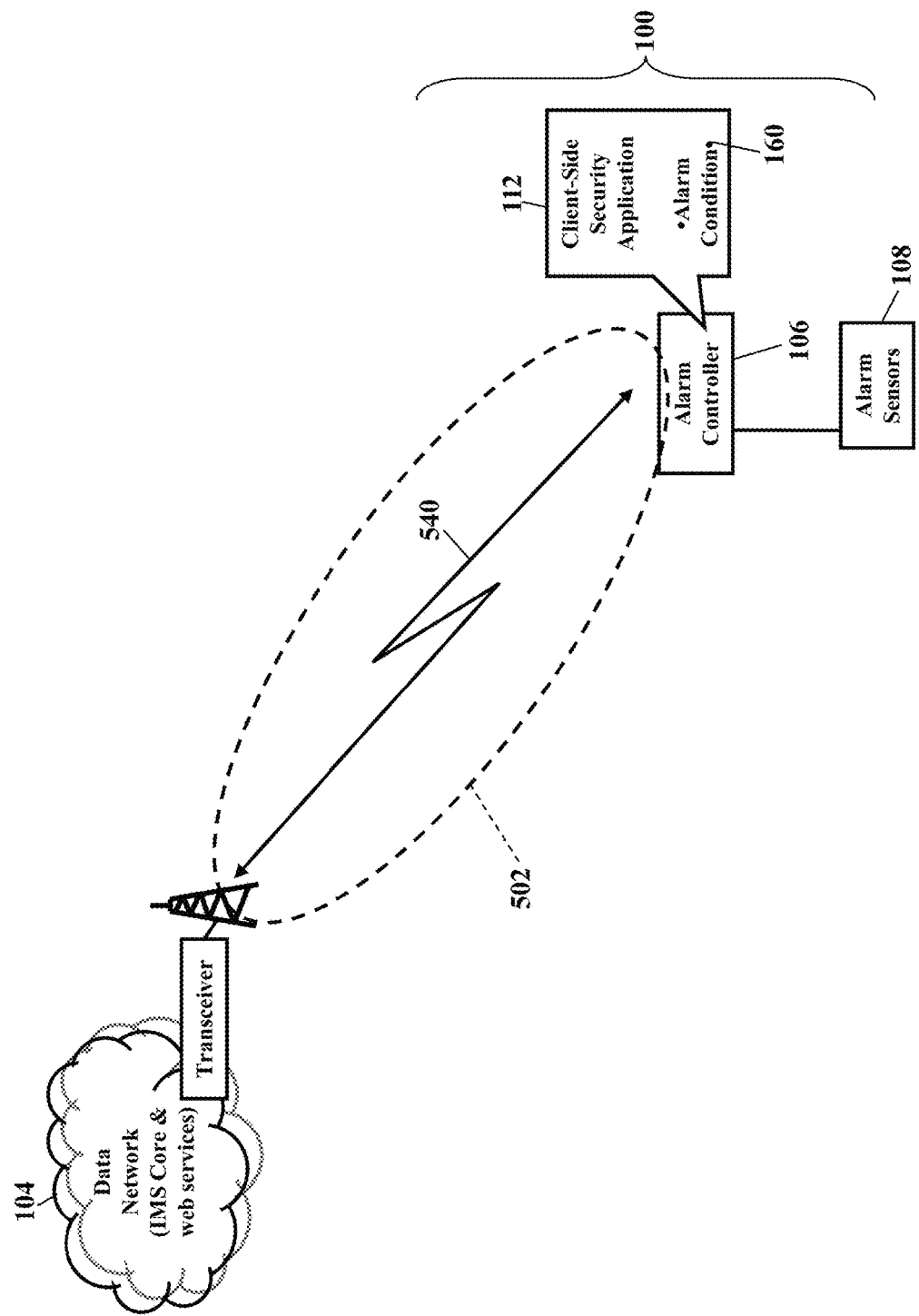

FIG. 26 is a schematic illustrating other architectures for the wireless network connection 502, according to exemplary embodiments. FIG. 22 illustrated a cellular architecture, in which the wireless data modem 520 used cellular technology to communicate with the packet data network 104. FIG. 26 illustrates that any wireless architecture may be used to establish a wireless communications link 540 between the alarm controller 106 and the packet data network 104. The alarm controller 106, for example, may establish a BLUETOOTH®, WI-FI®, or any other wireless connection with the packet data network 104. Any frequency within the electromagnetic spectrum may also be used.

Figure 27:
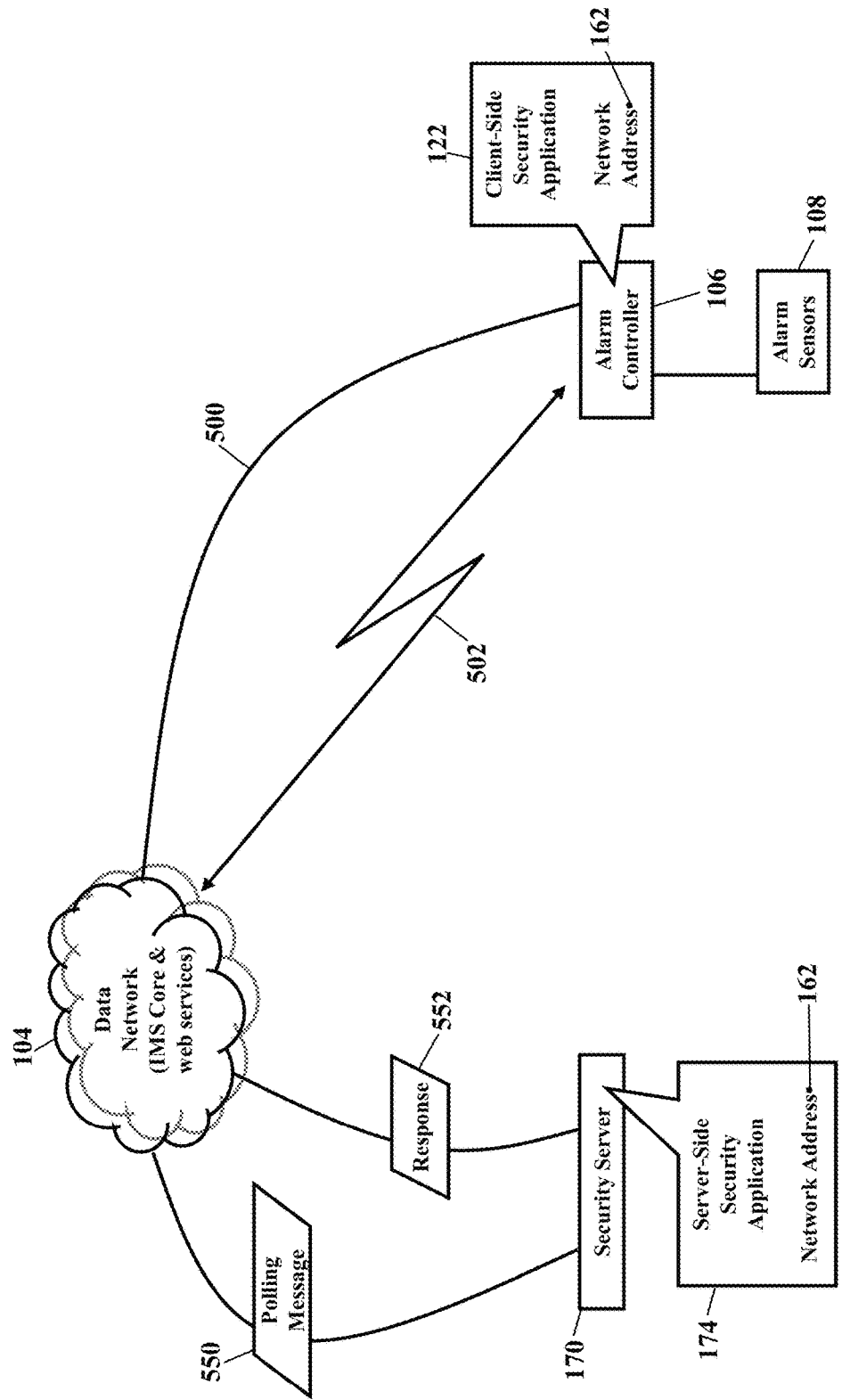
FIGS. 27-29 are detailed schematics illustrating polling schemes, according to exemplary embodiments.
Figure 28:
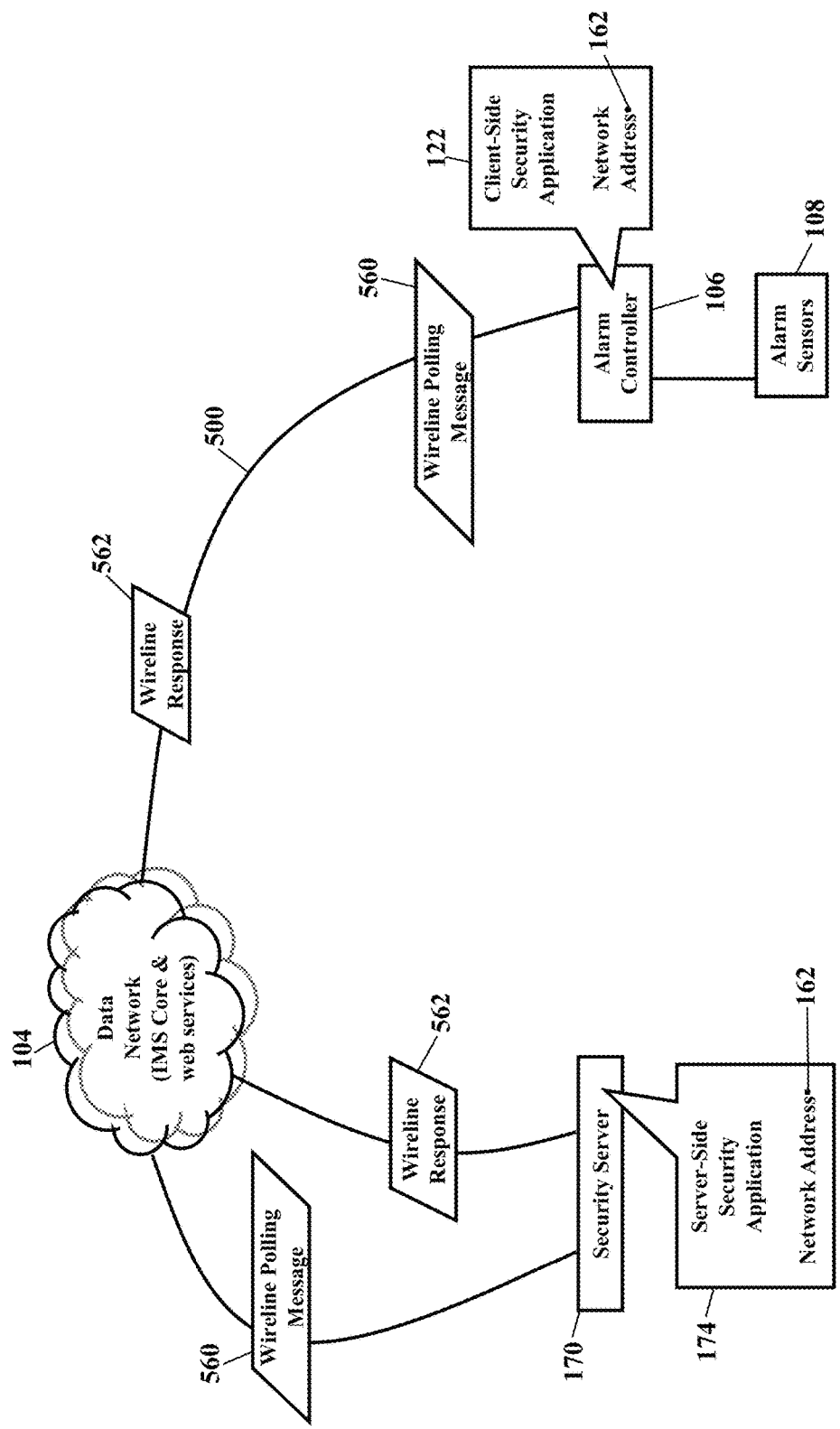
Figure 29:
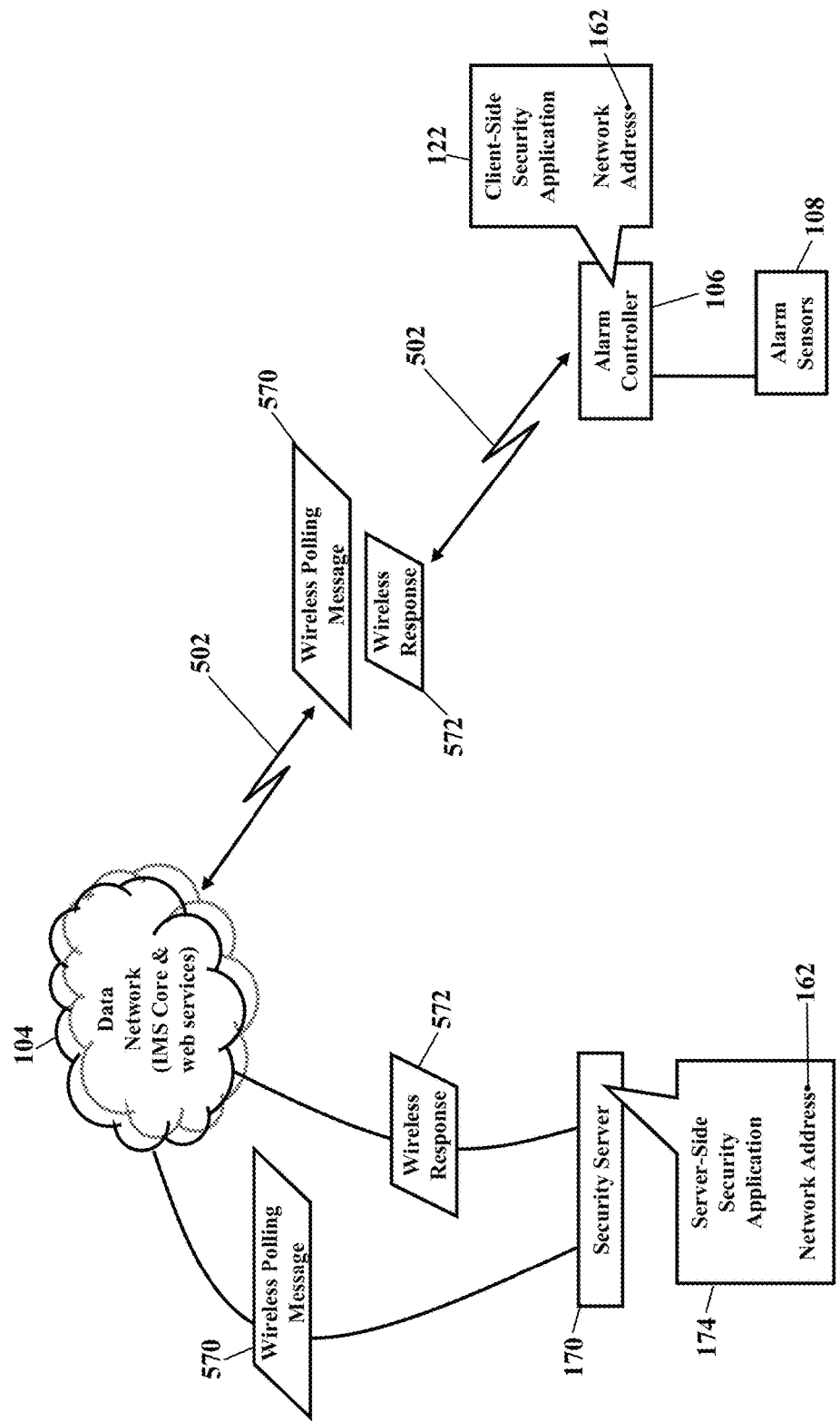

FIGS. 27-29 are more detailed schematics illustrating the exemplary embodiments. FIG. 27 illustrates a polling scheme to determine the status of the wireline broadband network connection 500 and the wireless network connection 502. The server-side security application 174 may periodically send polling messages to the alarm controller 106. Because the alarm controller 106 has the two (2) different network connections (the wireline broadband network connection 500 and the wireless network connection 502), exemplary embodiments may poll for the availability of each network connection.

FIG. 27, for example, illustrates a polling message 550. The polling message 550 routes from the server-side security application 174 into and through the packet data network 104. The polling message 550 routes to the network IP address 162 associated with the alarm controller 106. When the alarm controller 106 receives the polling message 550, the alarm controller 106 sends a response 552. The response 552 communicates through the packet data network 104 to the server-side security application 174 operating in the security server 170. When the response 552 is received, the server-side security application 174 knows or infers that that the alarm controller 106 is online and communicating.

Even though the response 552 is received, the server-side security application 174 does not know which network connection is available. Even though the alarm controller 106 is online and communicating, the server-side security application 174 may not know whether the wireline broadband network connection 500 is available, or whether the back-up wireless network connection 502 was used to route the response 552. Which network connection is available may be important when routing the Voice-over Internet Protocol call (illustrated as reference numeral 142 in FIG. 1) to the alarm controller 106.

FIGS. 28 and 29, then, illustrate two (2) different polling schemes. Here separate polling messages may be sent to the alarm controller 106. FIG. 28 illustrates a wireline polling message 560 routing from the server-side security application 174, through the packet data network 104, and downstream over the wireline broadband network connection 500 to the network IP address 162 associated with the alarm controller 106. When the alarm controller 106 receives the wireline polling message 560, the alarm controller 106 sends a wireline response 562. The wireline response 562 communicates upstream over the wireline broadband network connection 500, through the packet data network 104, and to the server-side security application 174 operating in the security server 170. When the wireline response 562 is received, the server-side security application 174 knows that the wireline broadband network connection 500 is online and available.

FIG. 29 illustrates a wireless polling message 570. The wireless polling message 570 routes from the server-side security application 174, through the packet data network 104, and over the wireless network connection 502 to the network IP address 162 associated with the alarm controller 106. When the alarm controller 106 receives the wireless polling message 570, the alarm controller 106 sends a wireless response 572. The wireless response 572 communicates over the wireless network connection 502 to the packet data network 104 and to the server-side security application 174 operating in the security server 170. When the wireless response 572 is received, the server-side security application 174 knows that the wireless network connection 502 is online and available.

The reliability of the polling schemes illustrated in FIGS. 27-29 depends on fresh information. If the polling scheme is infrequent, then the server-side security application 174 may not know the current availability of the alarm controller 106. Should the server-side security application 174 have to establish the Voice-over Internet Protocol call 142 to the alarm controller 106, outdated or stale information could delay the call 142. Exemplary embodiments may thus periodically perform any of the polling schemes illustrated in FIGS. 27-29. The server-side security application 174, for example, may send the wireline polling message 560 (illustrated in FIG. 28) and then wait for receipt of the wireline response 562. After the wireline polling message 560 is sent, the server-side security application 174 may send the wireless polling message 570 (illustrated in FIG. 29) and then wait for receipt of the wireless response 572. The server-side security application 174 may sequentially send the wireline polling message 560 and then the wireless polling message 570 according to a predetermined or random schedule. A timer may be initiated to countdown from a predetermined amount of time before a sequential polling message is sent. If either response 562 and/or 572 is received, the timer may be reset and the predetermined or random schedule resumed.

Each response indicates status. When the server-side security application 174 tests the availability of the wireline broadband network connection 500, the wireline response 562 indicates an available status of the wireline broadband network connection 500. The wireless response 572 similarly indicates that the wireless network connection 502 is online and available. If a response is not received, though, the server-side security application 174 may resend either the wireline polling message 560 and/or the wireless polling message 570. The server-side security application 174 may wait a predetermined amount of time before resending either the wireline polling message 560 and/or the wireless polling message 570.

Figure 30:
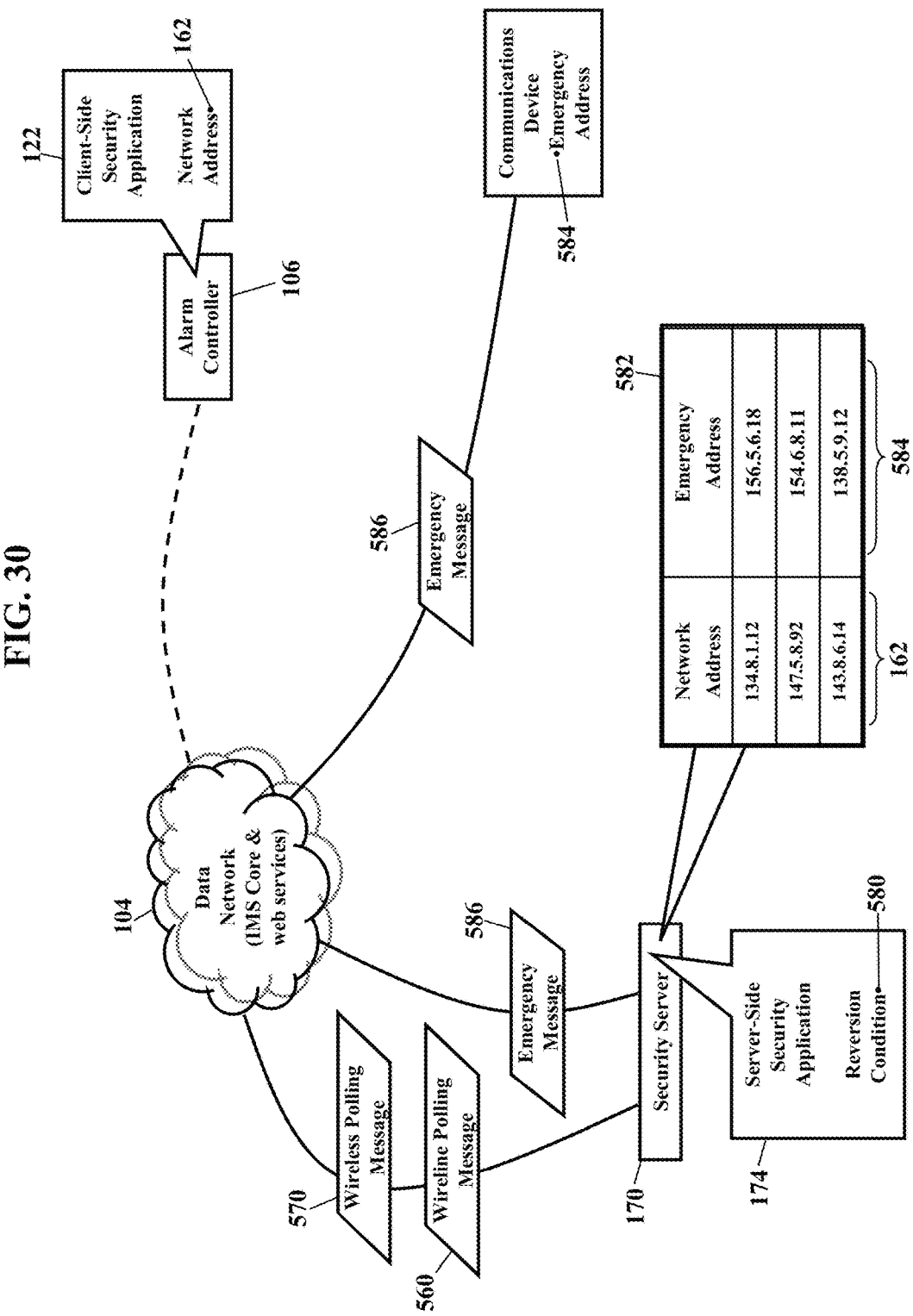
FIGS. 30 and 31 illustrate a reversion condition, according to exemplary embodiments.
Figure 31:
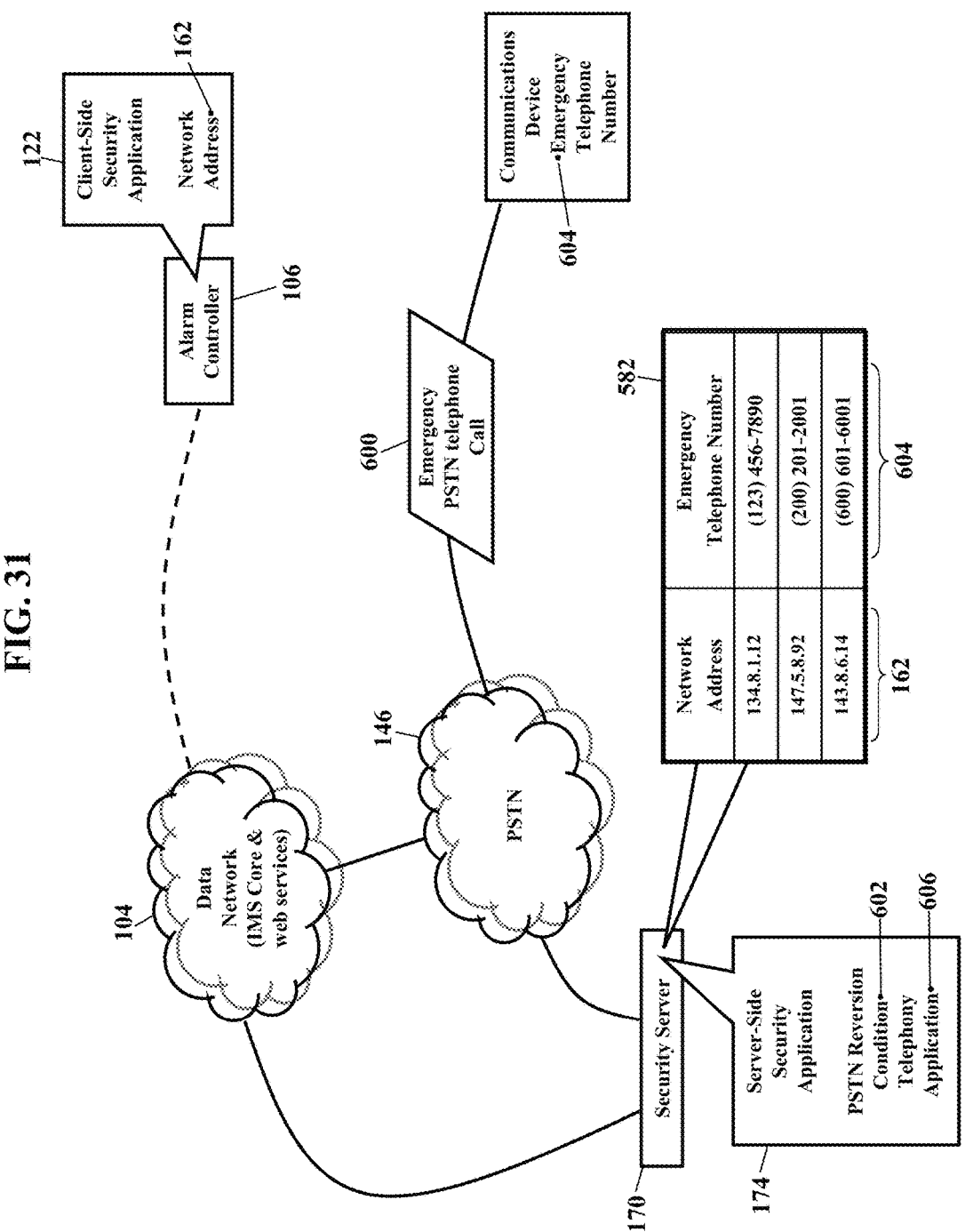

FIGS. 30 and 31 illustrate a reversion condition 580. If responses are not received to the wireline polling message 560 or to the wireless polling message 570 (perhaps after one or multiple attempts), then the server-side security application 174 may flag a communication error. That is, some type of network problem or error is preventing the server-side security application 174 from communicating with the client-side security application 122 operating in the alarm controller 106. Here then the server-side security application 174 enters a reversion condition 580. The server-side security application 174 queries a reversion data table 582. The reversion data table 582 is illustrated as being locally stored in the security server 170, but the reversion data table 582 may be remotely stored and accessed via the packet data network 104. The reversion data table 582 associates the network IP address 162 of the alarm controller 106 to an emergency address 584. The server-side security application 174 retrieves the emergency address 584 and sends an emergency message 586 to the emergency address 584. The emergency message 586 informs a human or computer application that communication has been lost with the alarm controller 106. Diagnostic or troubleshooting procedures may commence.

FIG. 31 illustrates an emergency PSTN telephone call 600. When the server-side security application 174 fails to receive the wireline response 562 and/or the wireless response 572 (illustrated, respectively, in FIGS. 28 and 29), here the server-side security application 174 may enter a PSTN reversion condition 602. The server-side security application 174 again queries the reversion data table 582. The server-side security application 174 retrieves an emergency telephone number 604 that is associated with the network IP address 162 of the alarm controller 106. The server-side security application 174 calls or invokes a telephony application 606 and initiates the call 600 to the emergency telephone number 604. The emergency telephone call 600 is established along the plain old telephone system 146 to the emergency telephone number 604. The emergency telephone call 600 alerts the emergency telephone number 604 of a failed communication attempt to the network IP address 162 of the alarm controller 106.

Figure 32:
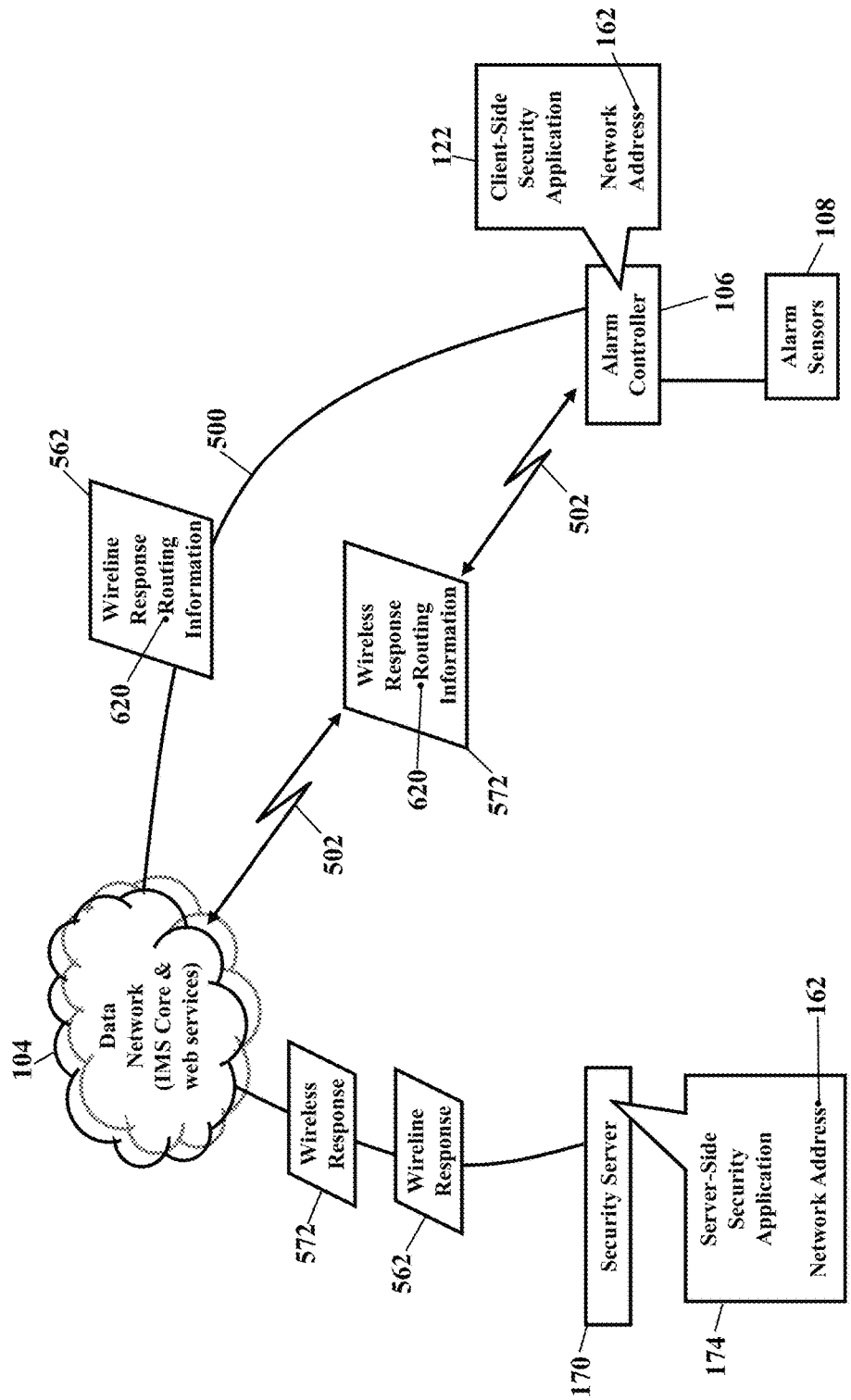
FIG. 32 is another detailed schematic illustrating another polling schemes, according to exemplary embodiments.

FIG. 32 is a schematic further illustrating the polling scheme, according to exemplary embodiments. Here responses to polling messages may indicate a network path that was used to connect to the packet data network 104. When the alarm controller 106 receives the wireline polling message (illustrated as reference numeral 560 in FIG. 28), the alarm controller 106 sends the wireline response 562. Here, though, the wireline response 562 includes data or information that identifies the wireline broadband network connection 500. That is, the wireline response 562 includes routing information 620 that indicates the wireline broadband network connection 500 was used to route the wireline response 562 from the alarm controller 106 to the packet data network 104. When the server-side security application 174 receives the wireline response 562, the server-side security application 174 thus knows that the wireline broadband network connection 500 is online and available.

The wireless response 572 may also include the routing information 620. When the alarm controller 106 sends the wireless response 572, here the routing information 620 indicates that the wireless network connection 502 was used to route the wireless response 572 from the alarm controller 106 to the packet data network 104. When the server-side security application 174 receives the wireless response 572, the routing information 620 informs the server-side security application 174 that the wireless network connection 502 is online and available.

Figure 33:
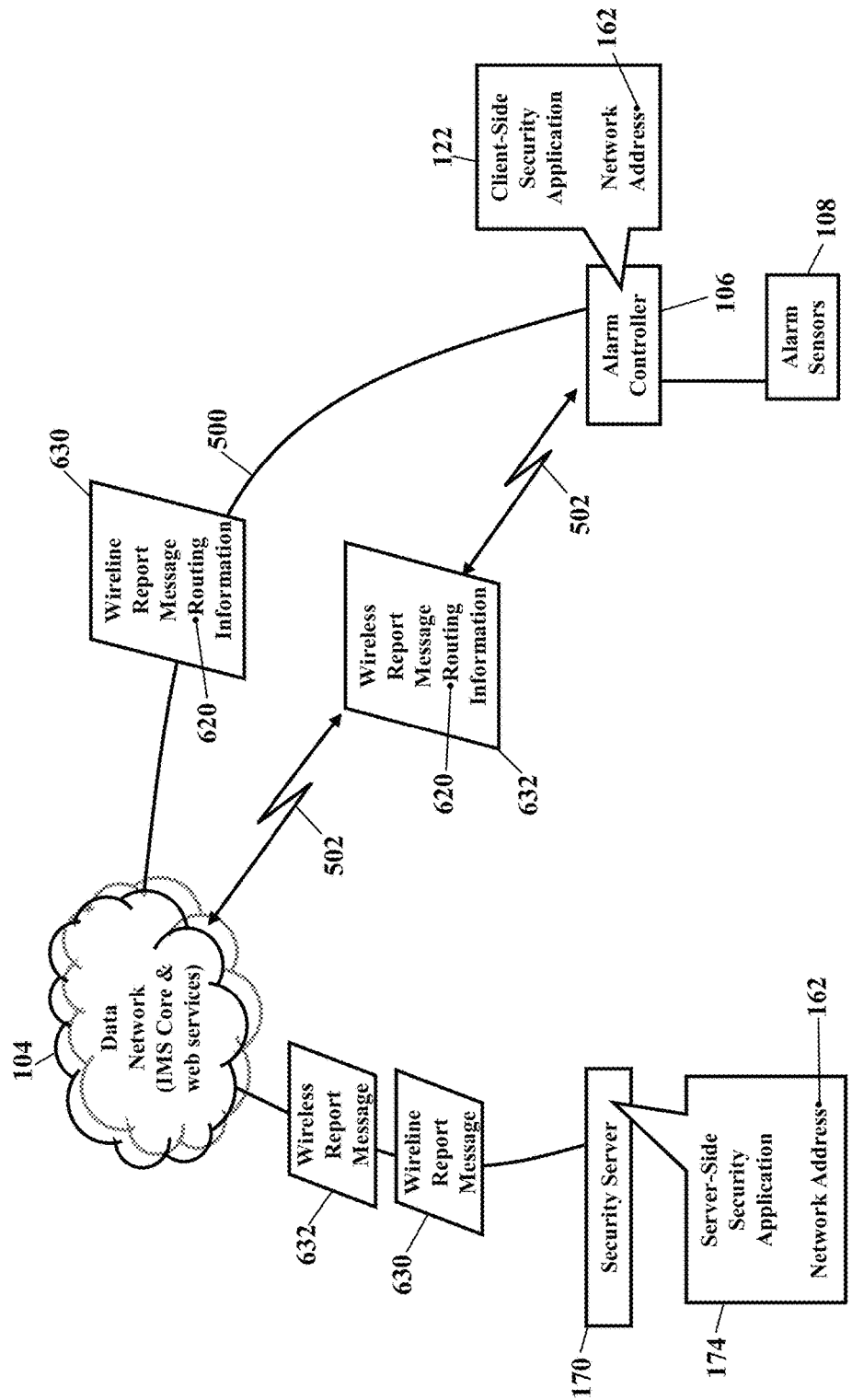
FIG. 33 is a schematic illustrating a self-reporting feature, according to the exemplary embodiments.

FIG. 33 is a schematic illustrating a self-reporting feature, according to the exemplary embodiments. Here the client-side security application 122 may periodically and automatically self-report its online status to the security server 170. The client-side security application 122, for example, may automatically send a wireline report message 630 over the wireline broadband network connection 500 to the packet data network 104. The wireline report message 630 may include the routing information 620 that indicates the wireline broadband network connection 500 is online and available. The client-side security application 122 may periodically and automatically send a wireless report message 632 over the wireless network connection 502 to the packet data network 104. The wireless report message 632 may also include the routing information 620 that indicates that the wireless network connection 502 is online and available. The client-side security application 122 may thus include service logic to simultaneously maintain packetized (e.g., Internet Protocol) communications with the central monitoring station 102 via both the wireline broadband network connection 500 and the wireless network connection 502. Network connectivity to each connection may be periodically confirmed as needed or desired (such as multiple times every hour).

Figure 34:
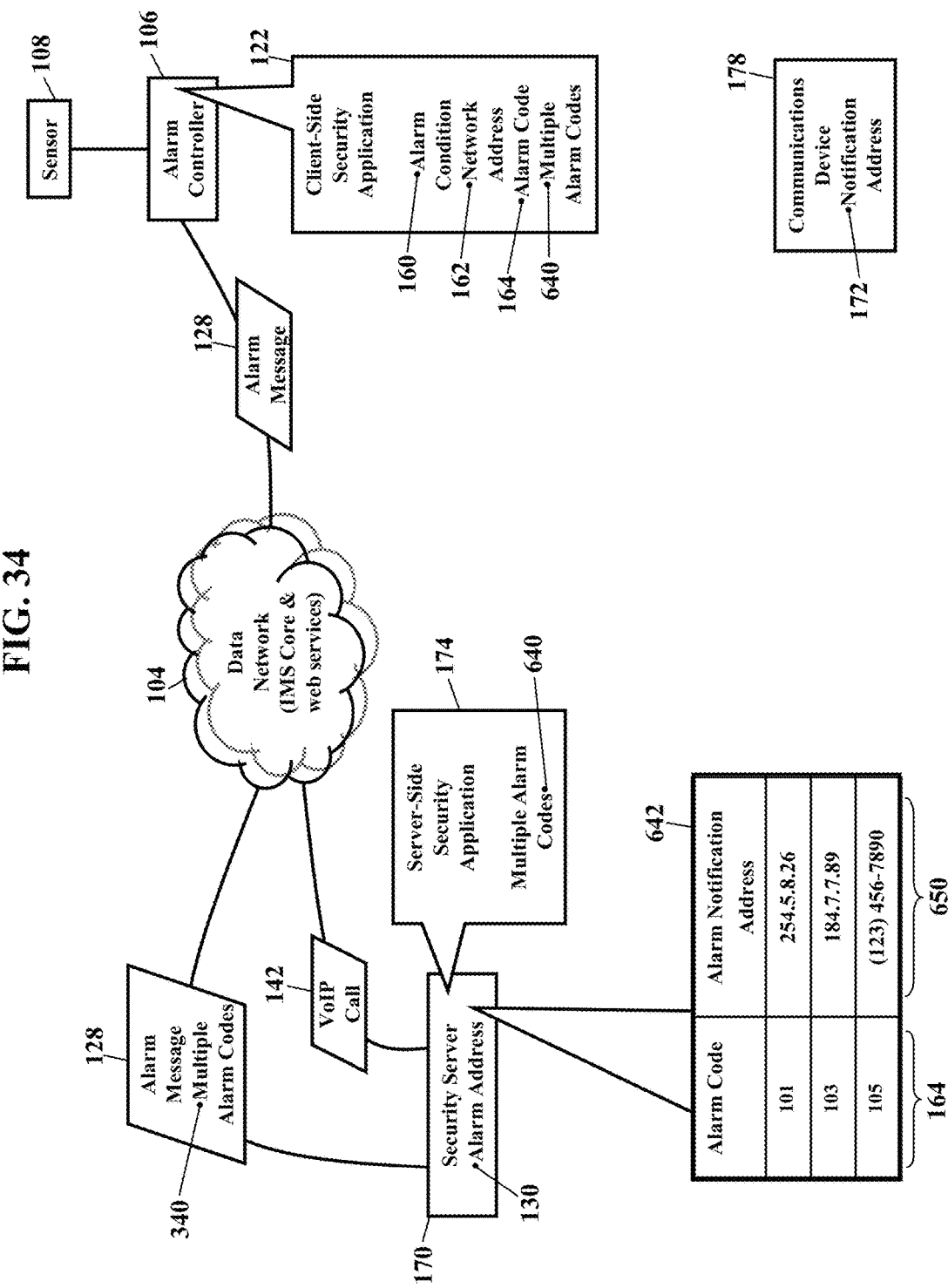
FIGS. 34 and 35 are schematics illustrating multiple alarm codes, according to exemplary embodiments.
Figure 35:
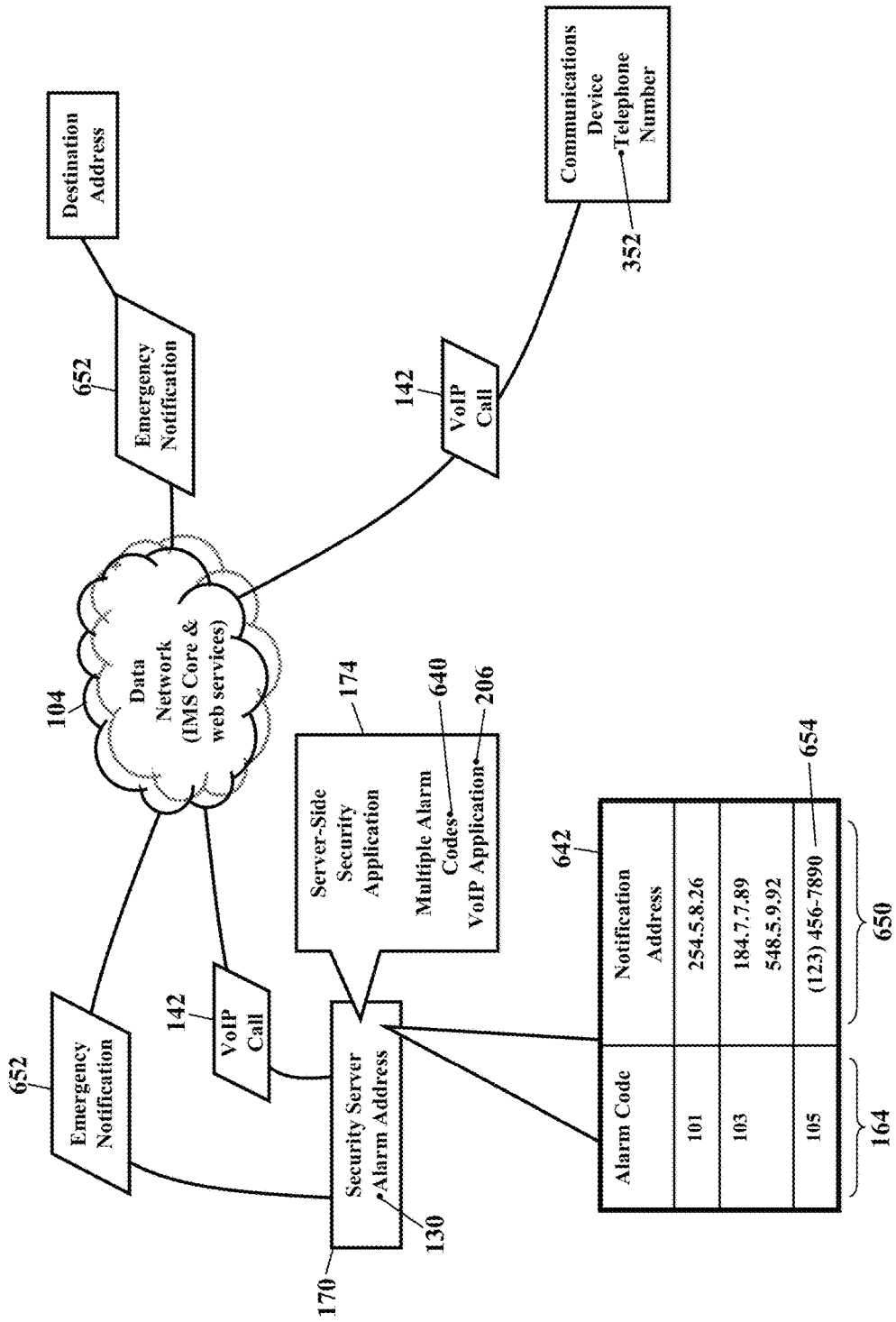

FIGS. 34 and 35 are schematics illustrating multiple alarm codes 640, according to exemplary embodiments. When the client-side security application 122 detects the alarm condition 160, the client-side security application 122 sends the alarm message 128 to the IP alarm notification address 130 associated with the security server 170. The alarm message 128 may also include data that describes the alarm condition 160, such as the alarm code 164 associated with the sensor 108. FIG. 34, though, illustrates multiple alarm codes 640. When a catastrophic, emergency event occurs, multiple sensors may detect multiple alarm conditions. A fire, for example, may be detected by a heat sensor and by a smoke sensor. If a window breaks (perhaps due to the heat or an impact), a sound sensor may detect the sonic frequencies of breaking glass. The alarm message 128, then, may include information that describes the multiple alarm codes 640 (e.g., heat sensor, smoke sensor, and sound/glass sensor). When the security server 170 receives the alarm message 128, the server-side security application 174 receives information describing the multiple alarm codes 640.

The server-side security application 174 may then consult an address notification table 642. The address notification table 642 is illustrated as being locally stored in the security server 170, but the address notification table 642 may be remotely stored from the security server 170. Regardless, the address notification table 642 maps, associates, or otherwise relates each alarm code 164 to the corresponding alarm notification address 650. The address notification table 642 defines associations between a plurality of the alarm codes 144 to a plurality of the alarm notification addresses 650. Each unique alarm code 164 may have a different notification address 650. When the server-side security application 174 receives the alarm message 128, the server-side security application 174 reads each alarm code 164 of the multiple alarm codes 640. The server-side security application 174 queries the address notification table 642 for each individual alarm code 164 obtained from the alarm message 128. The server-side security application 174 retrieves the corresponding alarm notification address 650 associated with each alarm code 164. Each alarm code 164 may thus have a different alarm notification address 650.

As FIG. 35 illustrates, the server-side security application 174 may then alert each alarm notification address 650. The server-side security application 174 may send multiple emergency notifications 652, with each emergency notification 652 destined for the alarm notification address 650 associated with each alarm code 164. Each emergency notification 652 may be of any type of message, such as email, page, text, facsimile, and/or voice. If the alarm code 164 is associated with a heat sensor, for example, the emergency notification 652 may be sent to the alarm notification address 650 associated with a local fire department. If the alarm code 164 is associated with a sound sensor, the emergency notification 652 may be sent to the alarm notification address 650 associated with a local police department. The alarm code 164 may even be associated with multiple notification addresses 650. The alarm code 164 for the sound sensor may be associated with the notification addresses 650 for the local police department and for an emergency medical provider. As FIG. 35 also illustrates, when the notification address 650 is a telephone number 654, the server-side security application 174 may invoke the Voice-over Internet Protocol ("VoIP") application 206 to establish the Voice-over Internet Protocol call 142 to the telephone number 654.

Figure 36:
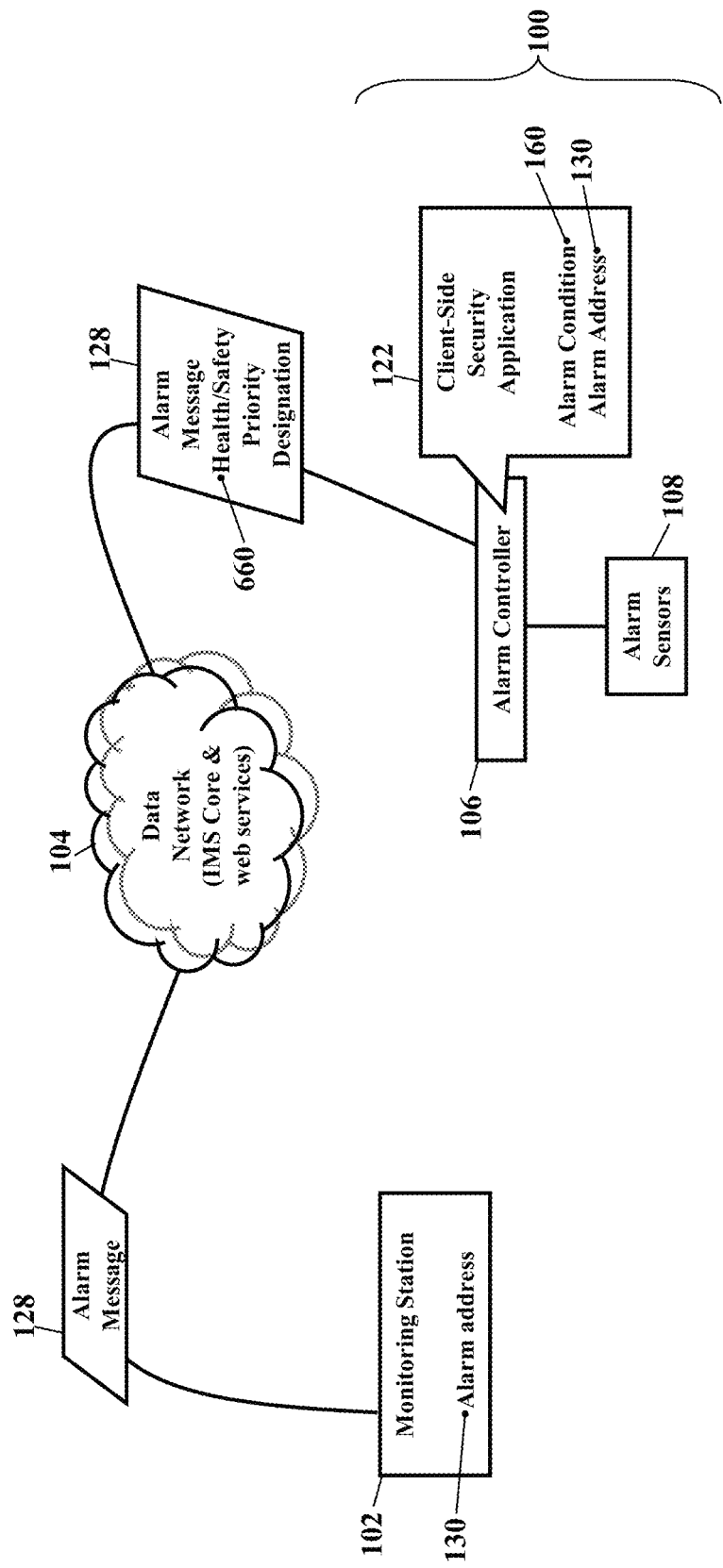
FIG. 36 is a schematic illustrating a priority scheme, according to exemplary embodiments.

FIG. 36 is a schematic illustrating a priority scheme, according to exemplary embodiments. When the alarm condition 160 is detected, the client-side security application 122 sends the alarm message 128 into and through the packet data network 104 to the IP alarm notification address 130 associated with the central monitoring station 102. As the alarm message 128 routes along the packet data network 104, though, the alarm message 128 may encounter congestion. Network processing delays within the packet data network 104 may slow the propagation of the alarm message 128, thus delaying a response time from the central monitoring station 102.

Exemplary embodiments may thus prioritize the alarm message 128. When the client-side security application 122 sends the alarm message 128, the alarm message 128 may contain a health/safety priority designation 660. The health/safety priority designation 660 alerts the packet data network 104 that the packets associated with the alarm message 128 have processing priority over all other packet traffic. When the alarm message 128 encounters a network bottleneck, the health/safety priority designation 660 allows the alarm message 128 to move to a front of a queue (e.g., last in, first out). The health/safety priority designation 660 may have a standardized format that all network service providers, and all network equipment, recognize. The header portion 178 of the alarm message 128, for example, may contain a standardized bit sequence that prioritizes a packet over all other traffic in the packet data network 104. The health/safety priority designation 660 may cause a network server, router, gateway, or other device to stop processing packets and to immediately admit, process, and route the alarm message 128. When multiple messages are encountered, with each message having the health/safety priority designation 660, then rules may be established for processing competing alarm messages 118. An earliest date/time stamp, for example, may prioritize an alarm message over later-sent alarm messages.

Figure 37:
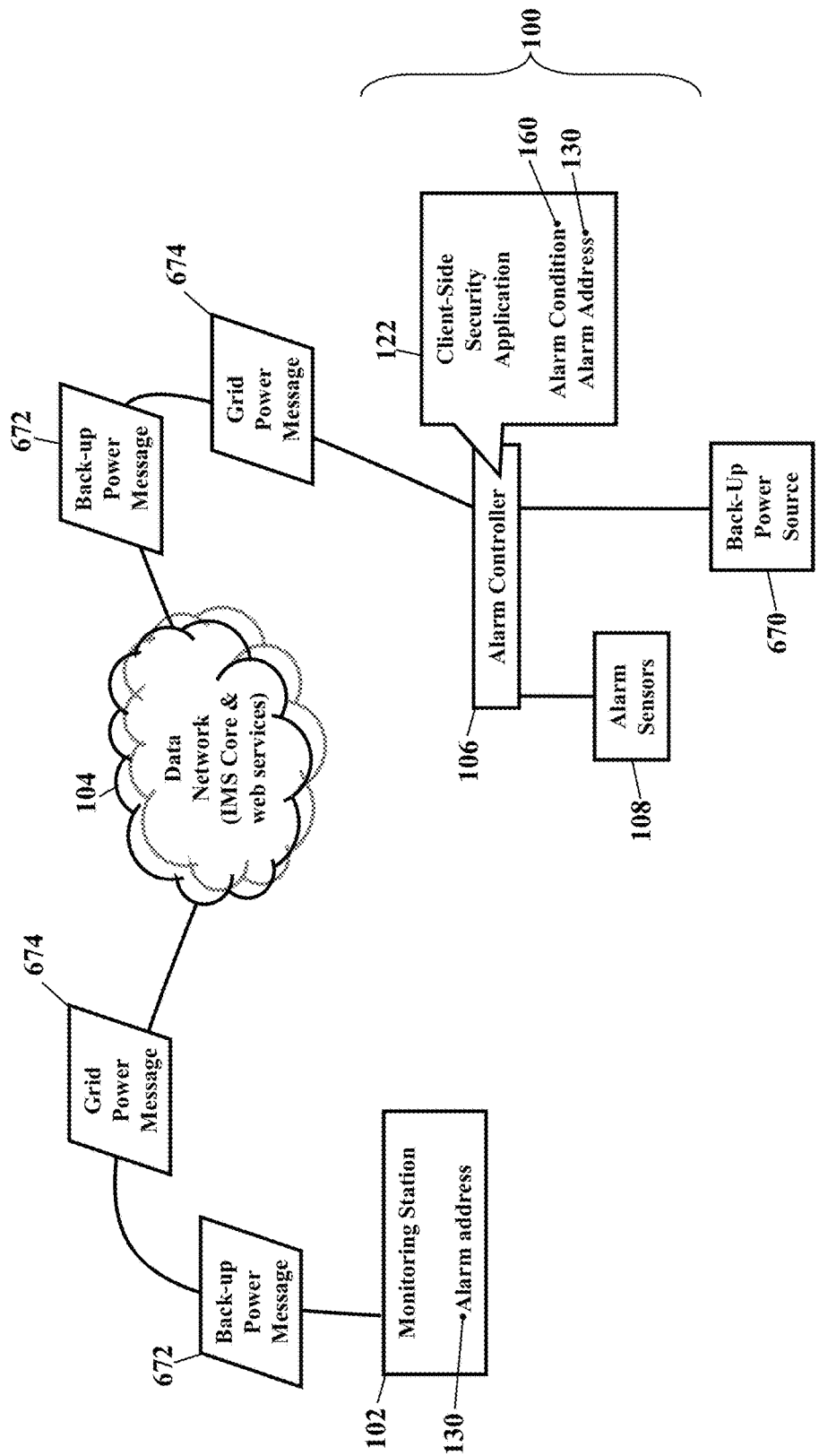
FIG. 37 is a schematic illustrating a back-up power source, according to exemplary embodiments.

FIG. 37 is a schematic illustrating a back-up power source 670, according to exemplary embodiments. The security system 100 and the alarm controller 106 may receive electrical power from a power source (such as the conventional electric grid). An electrical power failure, though, could prevent the alarm controller 106 from detecting the alarm condition 160 and from sending the alarm message 128 to obtain help. The alarm controller 106, then, may switch to the back-up power source 670. The back-up power source 670 may be a solar panel, a battery, a fuel cell, a generator, and/or any means for providing electrical current and voltage to the alarm controller 106. When a local power failure occurs, the client-side security application 122 may thus utilize packetized communications over the packet data network 104 to inform the central monitoring station 102 of the local power failure. When electrical power is provided by the back-up power source 670, the client-side security application 122 may send a back-up power message 672 over the packet data network 104 to inform the central monitoring station 102. When electrical power from the electric grid has been restored, the client-side security application 122 may send a grid power message 674 over the packet data network 104 to inform the central monitoring station 102.

Figure 38:
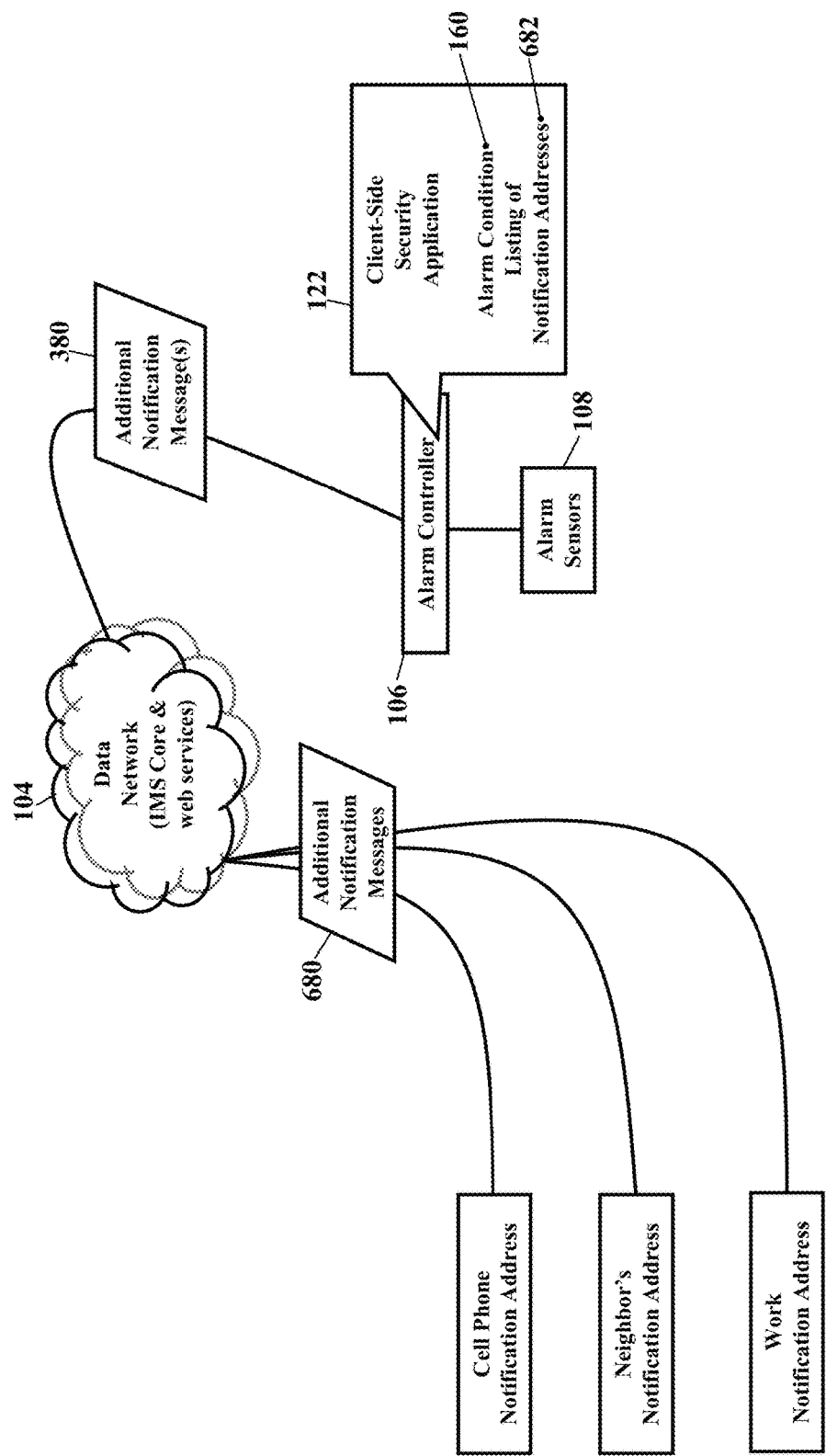
FIG. 38 is a schematic illustrating additional notification messages, according to exemplary embodiments.

FIG. 38 is a schematic illustrating additional notification messages 680, according to exemplary embodiments. When the alarm controller 106 detects the alarm condition 160, FIG. 38 illustrates how the client-side security application 122 may send one or more additional notification messages 680. These additional notification messages 680 may be sent to any desired destination, such as a cell phone, a neighbor, a parent or child, or a work address. The client-side security application 122 may access a listing 682 of notification addresses, and the additional notification messages 680 may be sent to one or more of the entries in the listing 682 of notification address. Here, then, exemplary embodiments allow the client-side security application 122 to be configured to automatically send any type of message (SMS, MMS, email, page, text) or call when the alarm condition 160 occurs. The client-side security application 122 may additionally or alternatively be configured to automatically send any type of message when any other event occurs, such as motion detection, water sensing, or momentary threshold detection. The additional notification messages 680 may additionally or alternatively be sent from the server-side security application operating in the security server (illustrated, respectively, as reference numerals 174 and 170 in FIG. 3). When the server-side security application 174 receives the alarm message 128, the server-side security application 174 may retrieve the listing 682 of notification addresses from local or remote memory. The server-side security application 174 may then send the additional notification messages 680 to each entry in the listing 682 of notification addresses.

Figure 39:
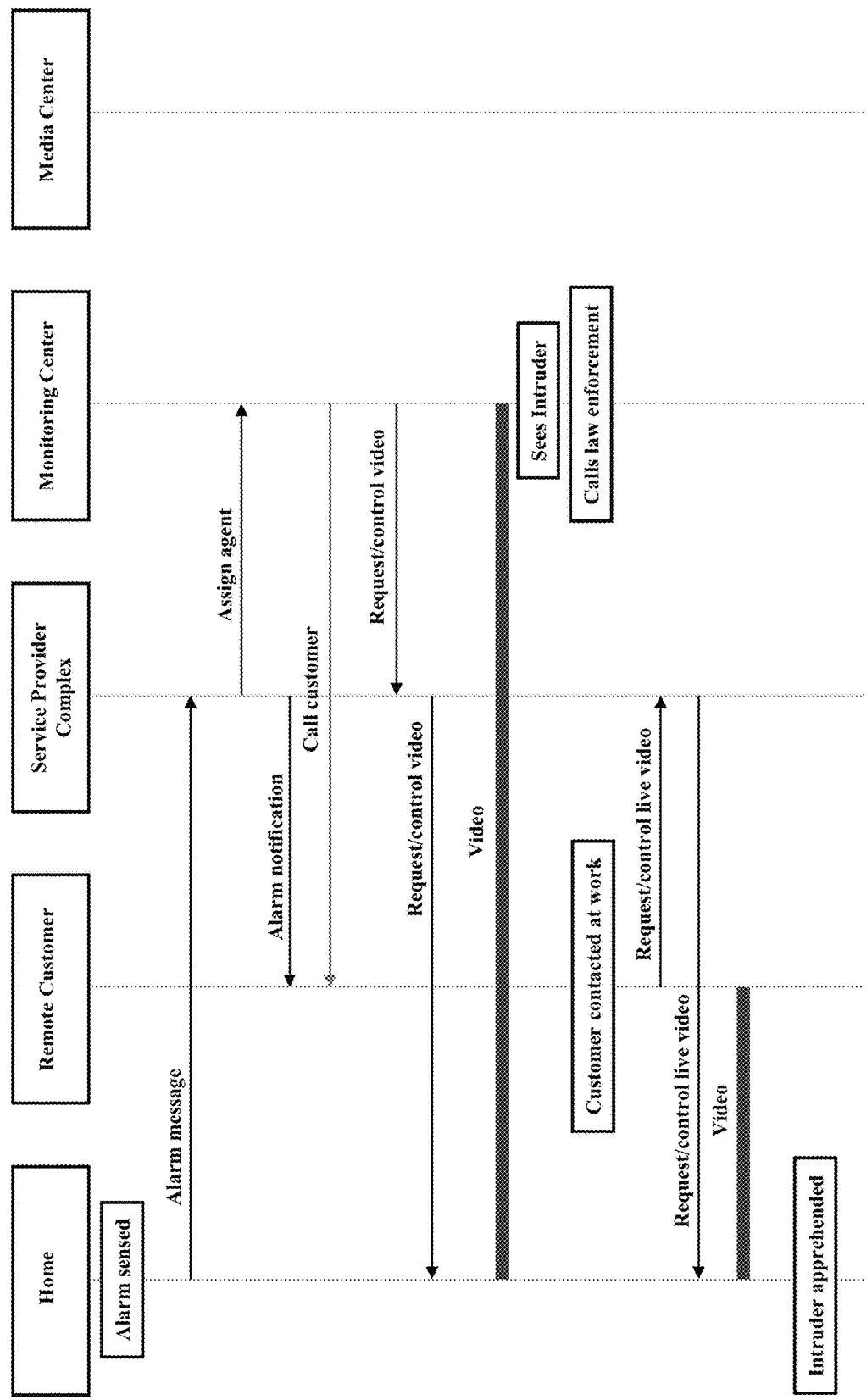
FIG. 39 is a flowchart illustrating a method of providing security services, according to exemplary embodiments.

FIG. 39 is a flowchart illustrating a method of providing security services, according to exemplary embodiments. All communications shown in FIG. 39 take place across the data network (illustrated reference numeral 104) as indicated earlier. When an intruder breaks a window glass, an alarm is sensed and the alarm message 128 is sent to a service provider's server. The agent 132 at the monitoring center 102 is assigned, and the monitoring center 102 sends a notification to the remote customer (such as the customer's PDA). The agent 132 may also call the remote customer and request live video. When the agent sees the intruder on the live video data 186, the agent calls the police. The remote customer may even be reached at a work computer and conference to the live video data 186. The remote customer may thus watch the police apprehend the intruder.

FIGS. 40-47 are schematics illustrating the IP data network 104 architecture, according to exemplary embodiments. The data network 104 is based on a combination of 3GPP IP Multimedia Subsystem (IMS) core and Web Services. As earlier paragraphs explained, IMS utilizes Session Internet Protocol (SIP) technology and supports session management. During an alarm condition, when a central monitoring station agent is attempting to contact a customer to verify that a legitimate alarm condition exists prior to contacting the police, fire or EMS, the agent could utilize IMS in the core network to establish an IMS session with the customer which supports more than two participants on the call and the ability for the participants to jointly access either live or stored video/audio from the alarm site. IMS supports point-to-point or multi-point multimedia conferencing. IMS can operate in a mixed mode wherein every participant does not have to have full multimedia capabilities, e.g., some participants may be on a mobile device or an analog phone.

The data network may include both a SIP Core and Web Services. Communications may take place using either part, or even both the SIP Core and the Web Services (e.g., in the case of different communications needed for IPTV). The IMS Core uses SIP and related protocols to control real time media flows between end-points carried by RTP. Media end-points may be user devices, gateways, or network media servers. The IMS Core may be used when sessions require a sustained connection for real-time "calls" between media endpoints. The Web Services use web protocols to control a session between a user and an application. The Web Services may be used when individual "transactions" are needed. Applications in this case are network service logic that is unique to the security service, and are distinct from supporting functions, e.g., Media Servers, and Service Enablers.

Figure 40:
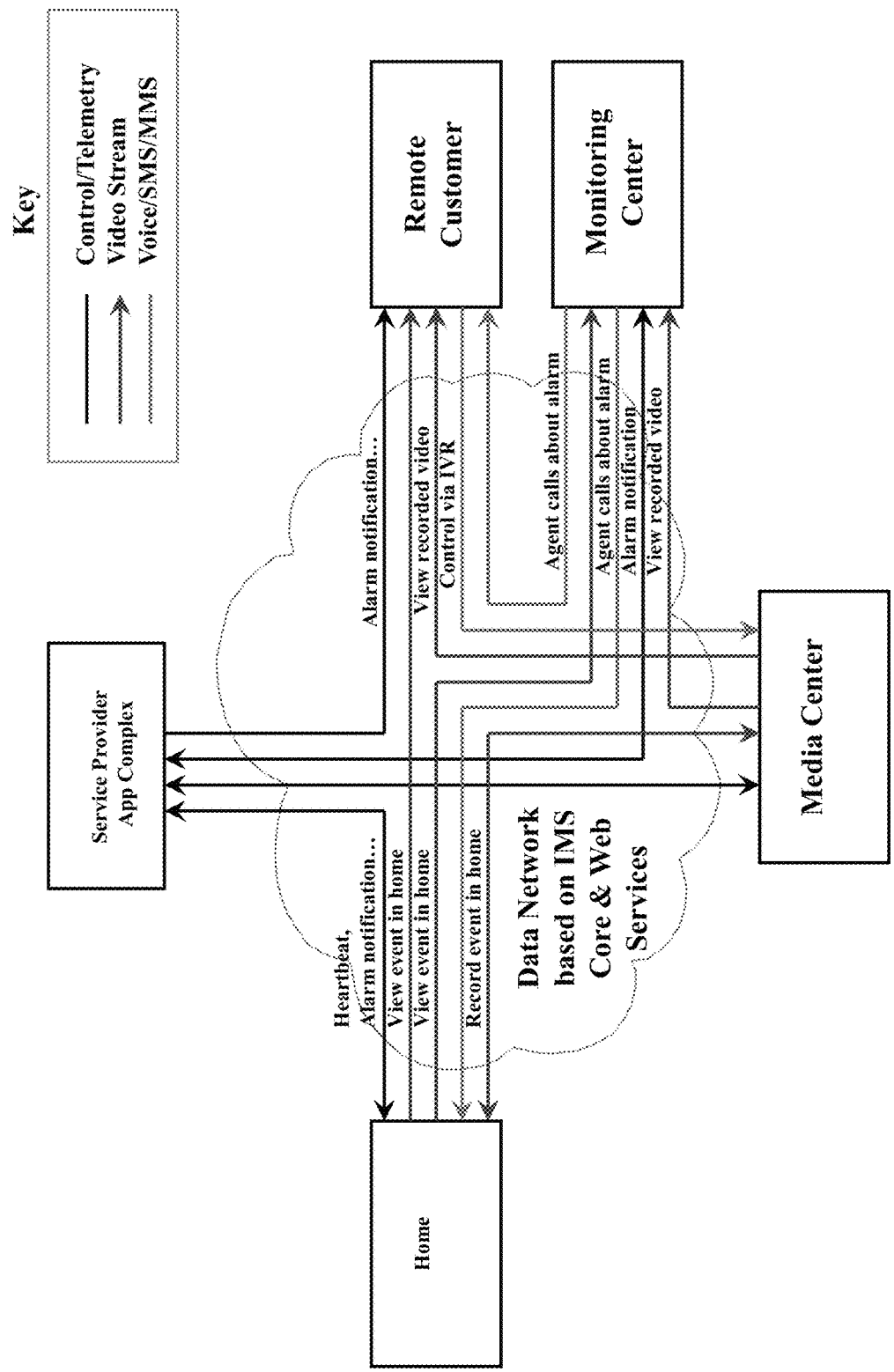
Figure 42:
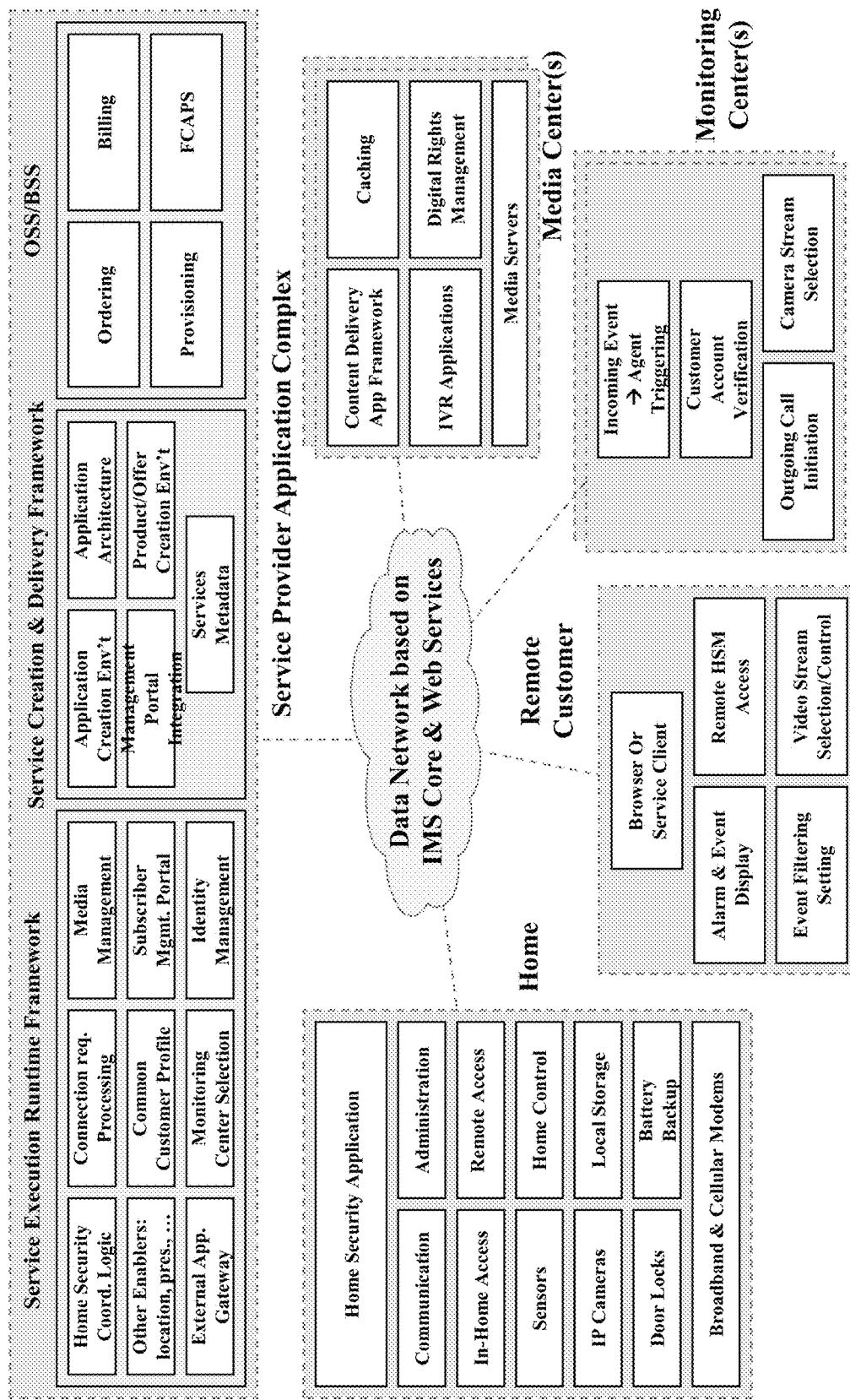
Figure 43:
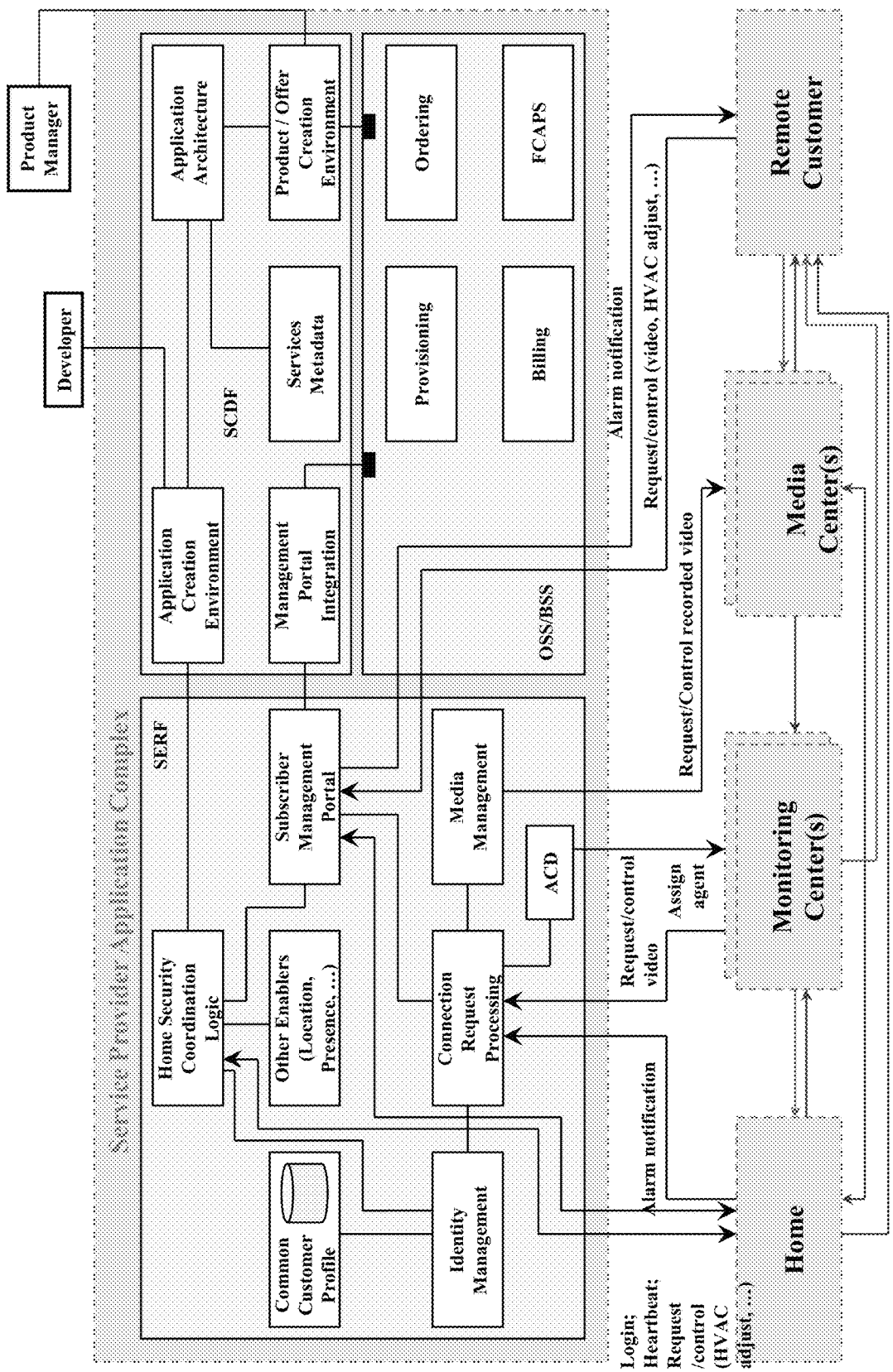
Figure 44:
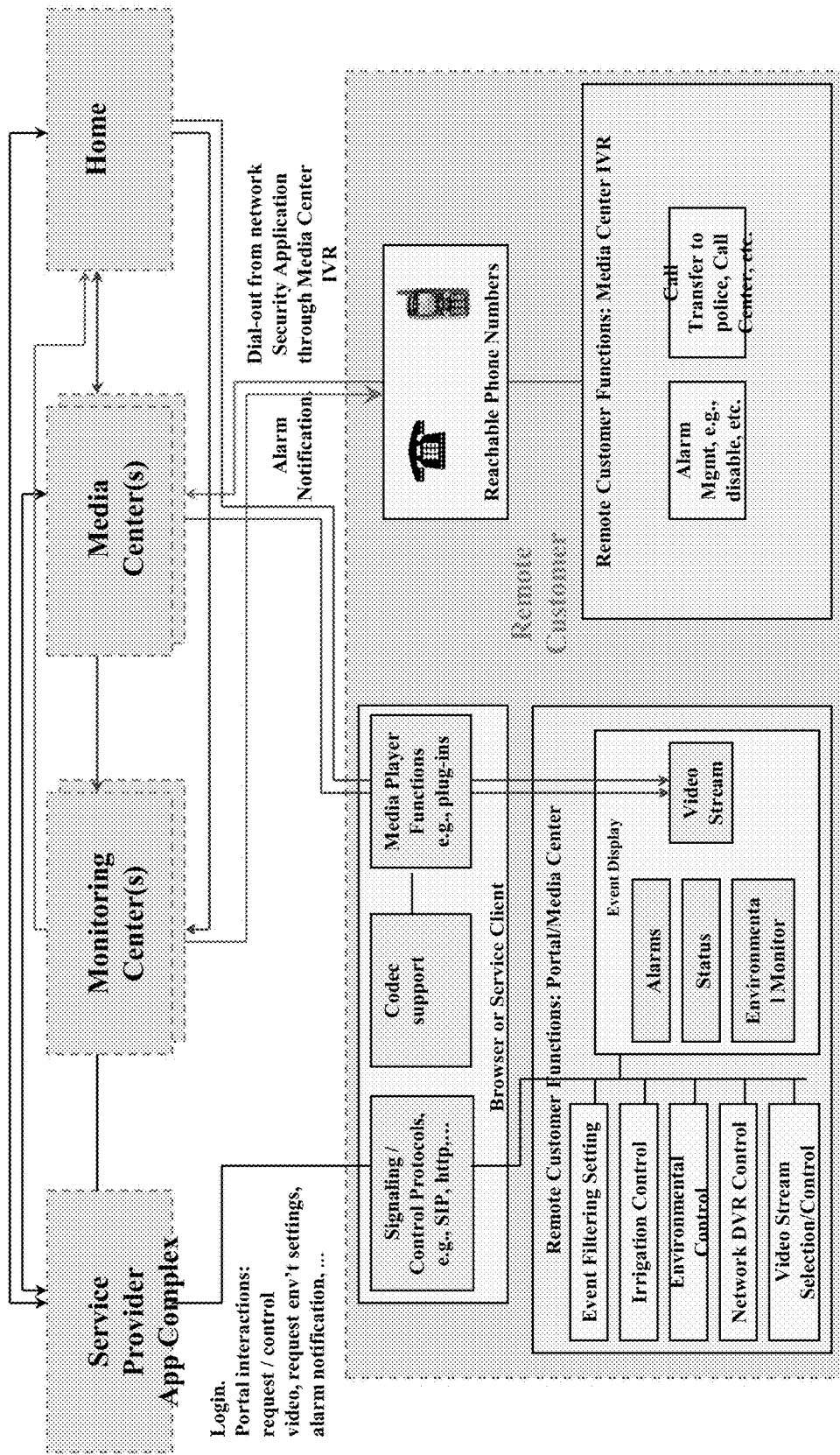
Figure 45:
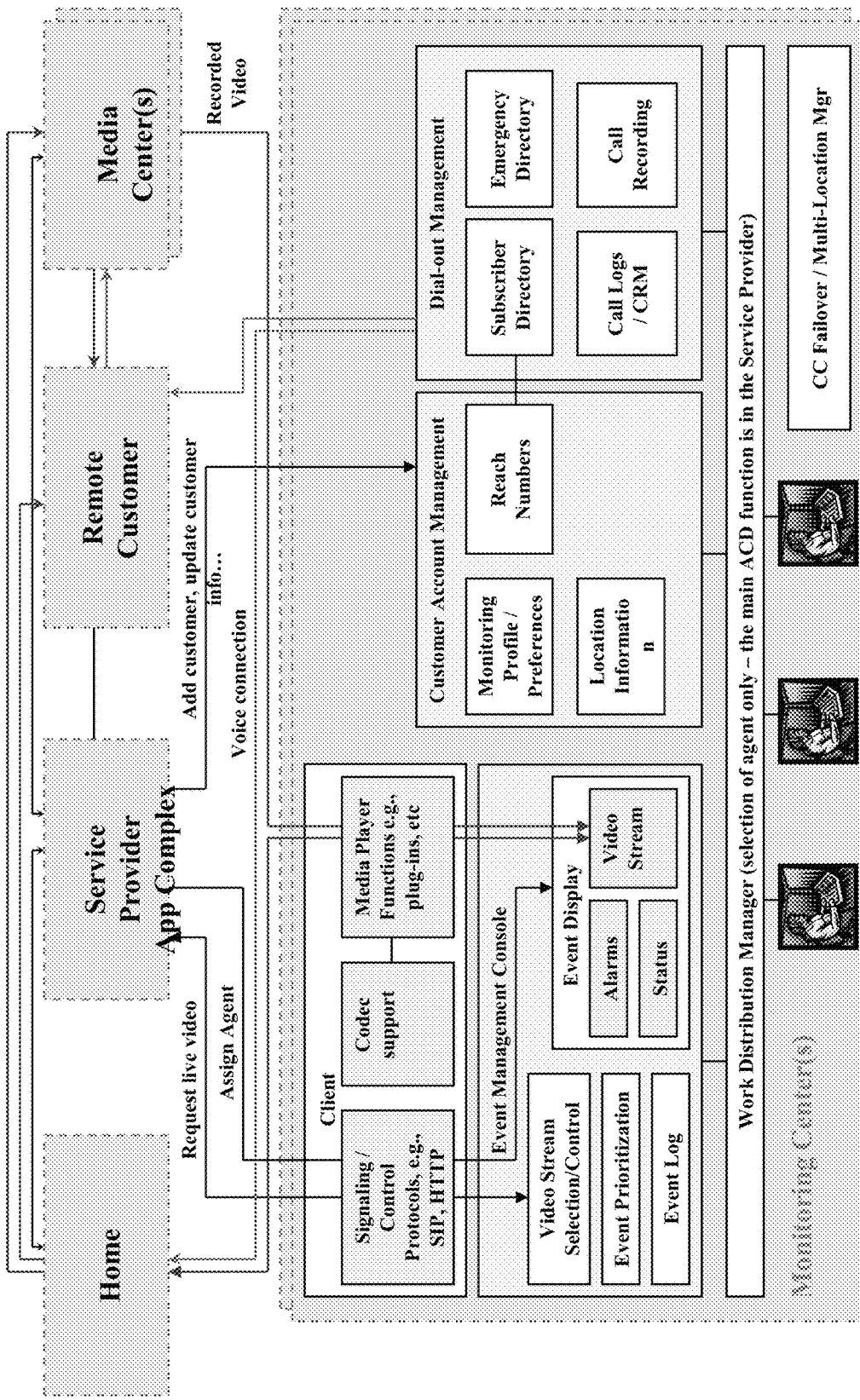
Figure 46:
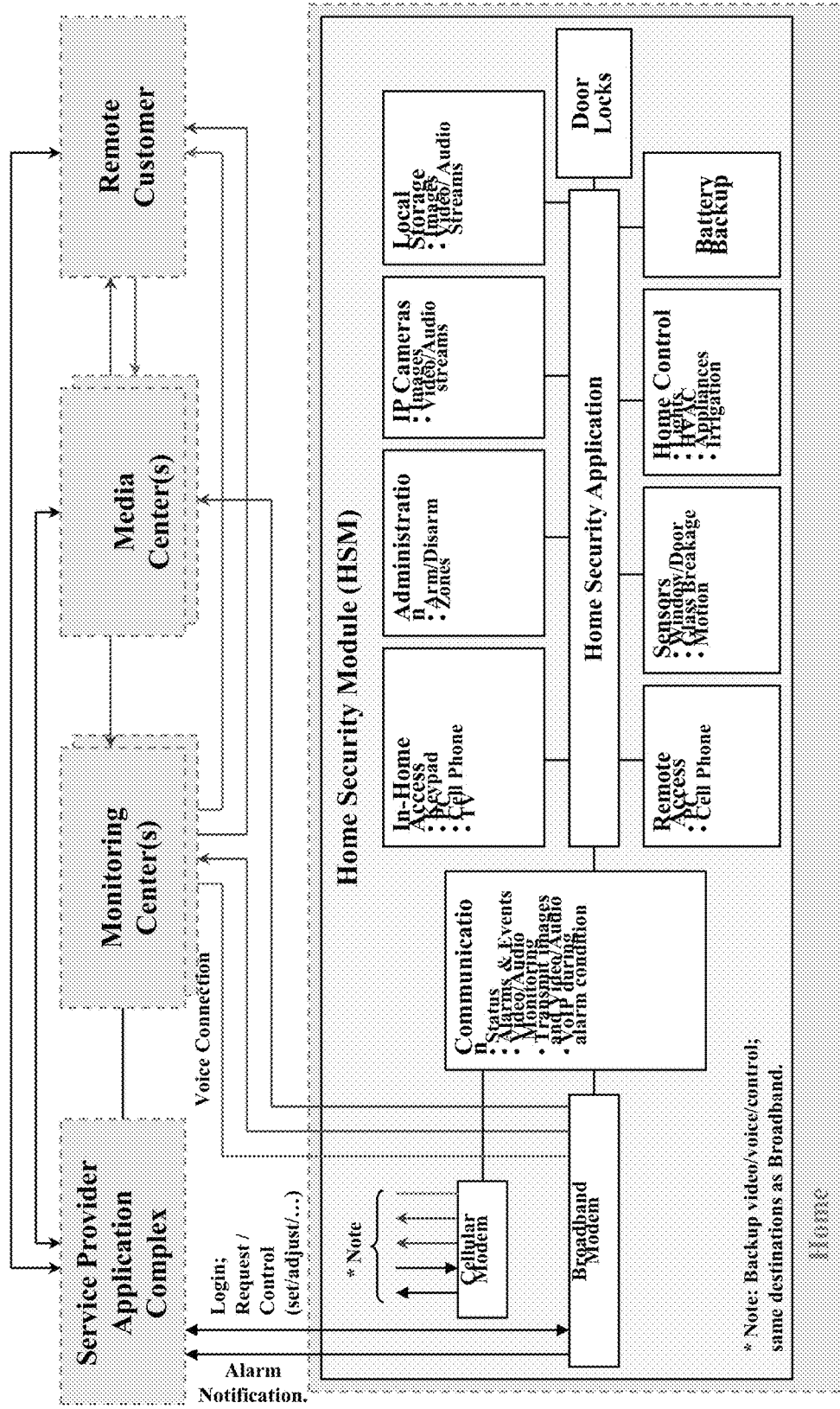
Figure 47:
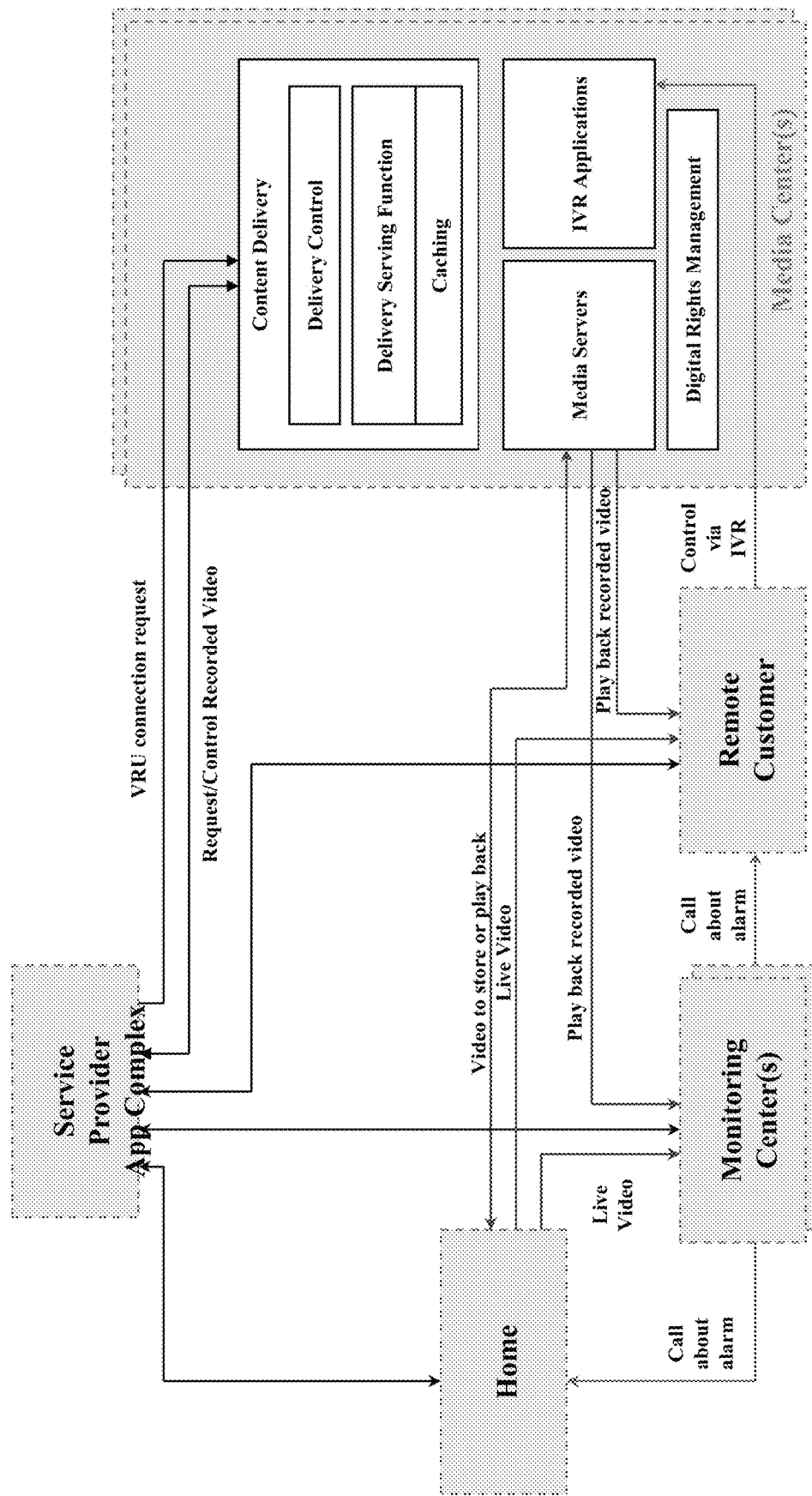

FIG. 40 illustrates data flows between five main locations involved in the security service. according to exemplary embodiments. FIG. 41 breaks out the various types of flows (voice, video, telemetry, and control) from FIG. 40 and explains their purpose, including the choice of the IMS Core vs. Web Services, and the elements that are involved in each flow. FIG. 42 provides a more detailed view of the entities within each of the five main locations in the architecture, according to exemplary embodiments. FIG. 43 illustrates a more detailed view of the architecture of the Service Provider Application Complex. FIG. 44 illustrates a more detailed view of the architecture of the remote user's communications device, according to exemplary embodiments. FIG. 45 illustrates a more detailed view of the architecture of the monitoring center 102, according to exemplary embodiments. FIG. 46 illustrates a more detailed view of the architecture of the alarm controller 102, according to exemplary embodiments. FIG. 47 illustrates a more detailed view of the architecture of the media center, according to exemplary embodiments. Although the combined IMS Core/Web Services data network is not shown in FIGS. 43-47, all communications traverse it.

Figure 48:
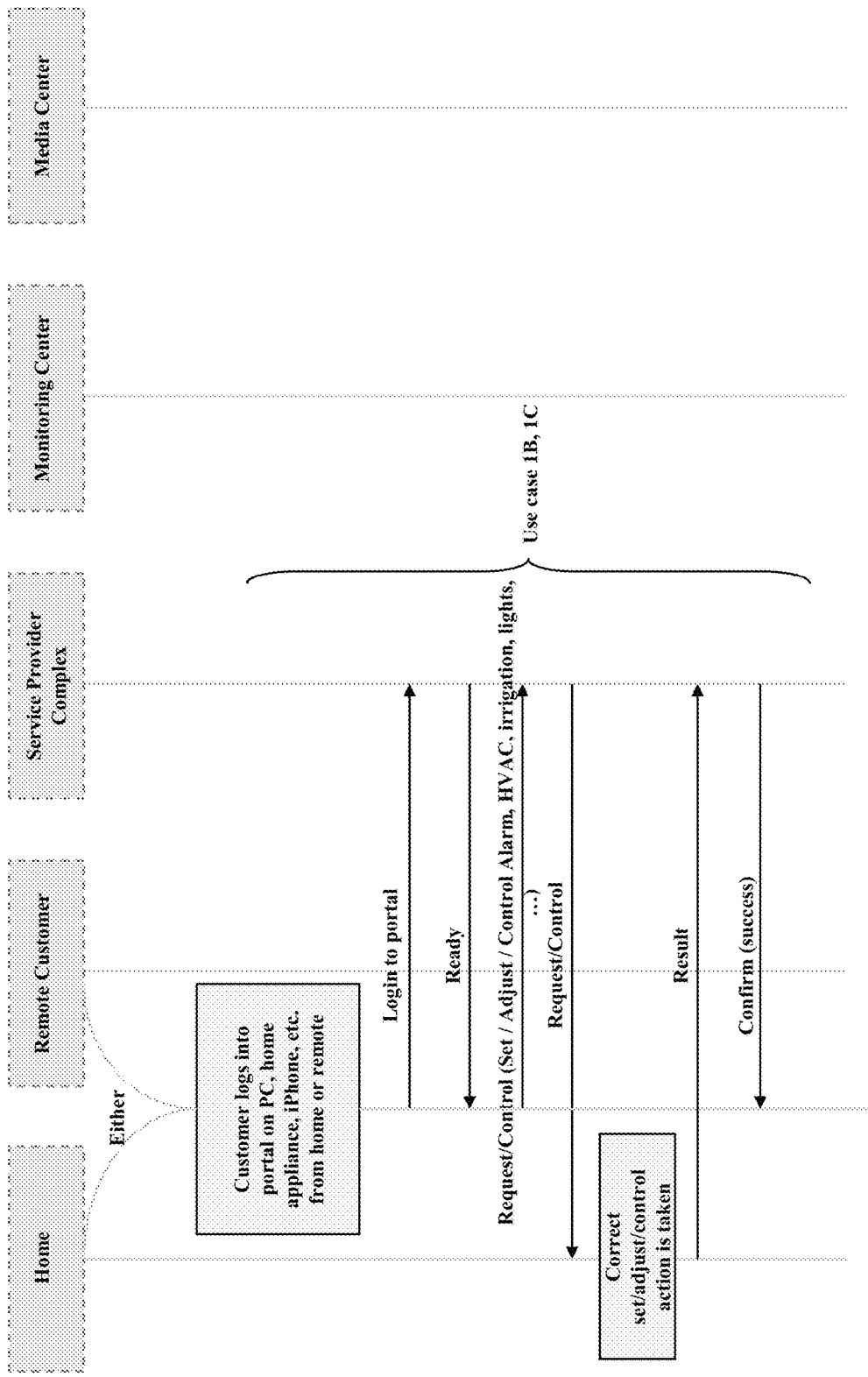
FIG. 48 is a schematic illustrating local and remote configuration of the security system, according to exemplary embodiments.

FIG. 48 is a schematic illustrating local and remote configuration of the security system 100, according to exemplary embodiments. Here a customer may locally and/or remotely configure the security system 100. The client-side security application 122 and/or the server-side security application 174 permits the customer to arm the security system 100, arm any peripheral devices, or disarm the security system 100. The customer may also locally and/or remotely adjust an HVAC system settings, lighting, irrigation, water heater, water softener, or any other appliances. In usage case 1A, the customer is in the home and uses the security system's control panel to configure the security system 100. In usage case 1B, the customer is in the home and logs into the security system 100 (such as by downloading a portal website, as earlier described). In usage case 1C, the customer is remote and logs into the portal website (again, as earlier described). All communications shown in this diagram use the combined IMS Core/Web Services data network 104.

Figure 49:
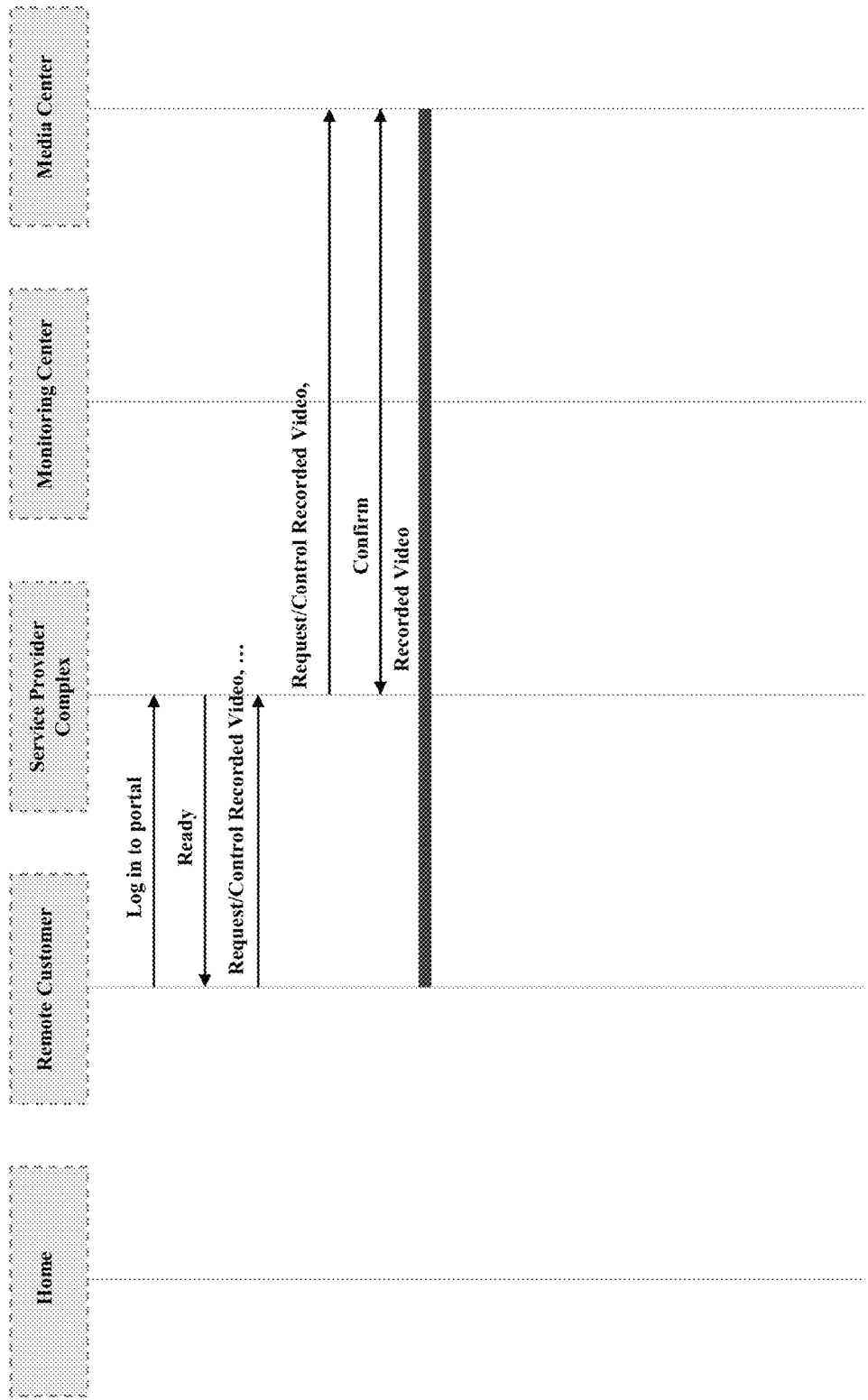
FIG. 49 is a schematic illustrating remote viewing of video data, according to exemplary embodiments.

FIG. 49 is a schematic illustrating remote viewing of video data, according to exemplary embodiments. The customer downloads the website and logs in to the security system 100. When the customer requests video data, the media center is notified and sends the requested video data to the customer's device. All communications shown in this diagram use the combined IMS Core/Web Services data network 104.

Figure 50:
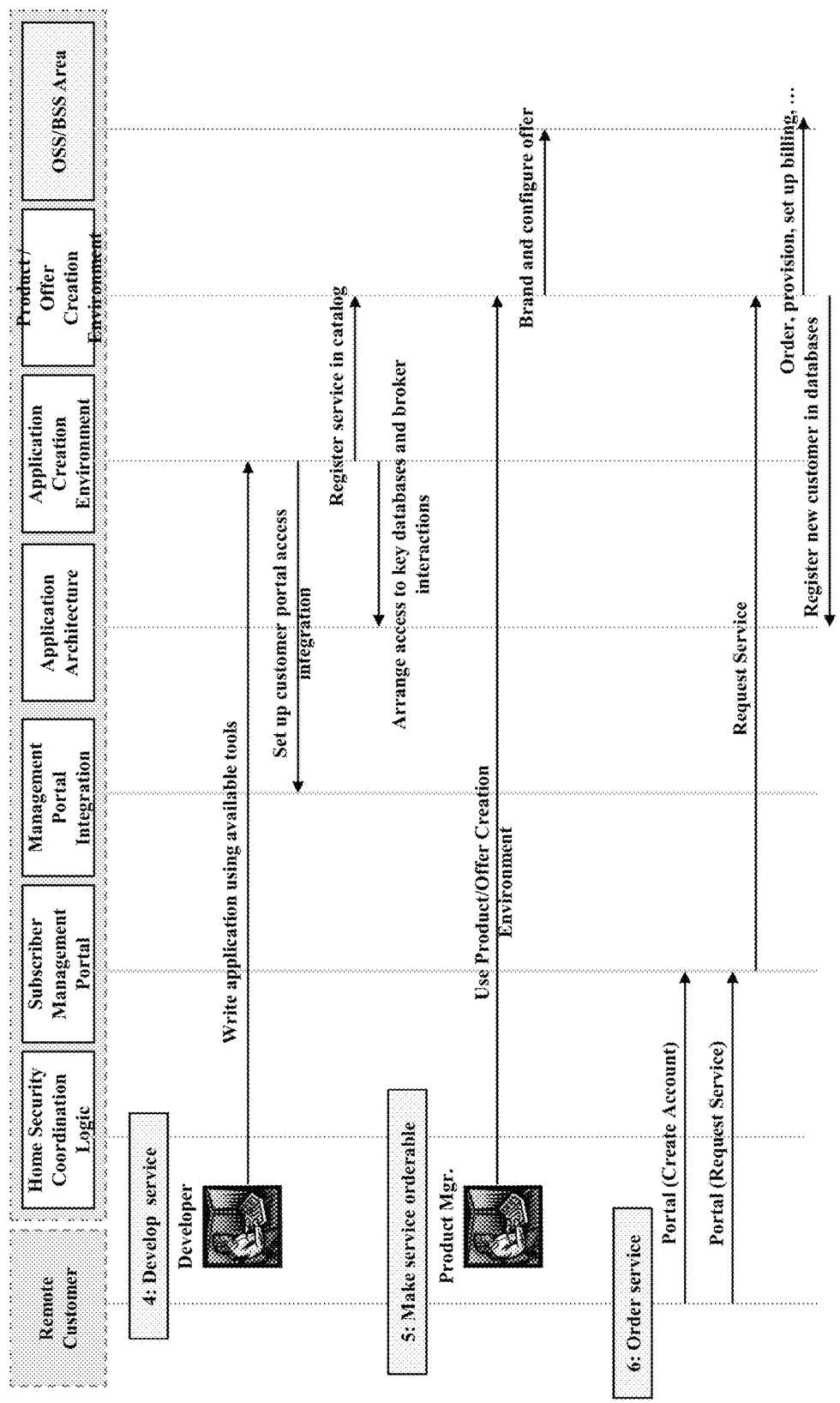
FIG. 50 is a schematic illustrating service administration, according to exemplary embodiments.

FIG. 50 is a schematic illustrating service administration, according to exemplary embodiments. Usage case 4 illustrates development of the security service. Usage case 5 illustrates creation and branding of the security service. Usage case 6 illustrates registration and billing. A Subscriber Management Portal authenticates access and allows customer access to settings, billing, alarm summary, and other features. The Home Security Coordination Logic is the functional "glue" for all SP applications. Media Management calls a Media enabler in response to requests from the client-side security application 122 and/or the server-side security application 174. Connection Request Processing sets up connections to Monitoring Center for video streams, alarm notification, and other functions. CCP, IdM, and Other Enablers provide access to key enablers. ACD selects an active monitoring center with an available agent. An External Application Gateway may be used if required for hosting model. Application Architecture provides service delivery framework, service marketplace (including product catalog and other key databases access; brokering between application stakeholders). Application Creation Environment includes enablers, event types, application binding, test/certification facilities, SDKs and libraries. Product/Offer Creation Environment enables product managers to brand and configure products/offers from CARTS app components. Management Portal Integration facilitates the integration of new offers (e.g., home security) with customer self-service portals. Service Metadata supports the capture of third party service metadata to facilitate targeted advertising and the loose coupling of applications across three screens. The client-side security application 122 and/or the server-side security application 174 includes logic that supports alarms, sensors (smoke/fire, door/window, glass breakage and motion). Administration provides the technician/customer an ability to locally and remotely administer the client-side security application 122 and/or the server-side security application 174 (set security codes, define zones, define armed & disarmed states, specify camera access, etc.). Communication provides status, alarms and events, video/audio monitoring, transmit images and video/audio and VoIP during an alarm condition (Monitoring Center and Remote Customer). The cameras 110 connect to video/audio streams and local storage of images and video/audio streams. In-Home Access allows the customer an ability to administer and control via wall mounted keypads, PC, Cell phone or TV. Remote access provides the ability to remotely administer and control via PC or cell phone to control lights, HVAC, appliances, irrigation system, door locks. Battery backup provides backup power, including Broadband and Cellular modems. All communications shown in this diagram use the combined IMS Core/Web Services data network 104.

Exemplary embodiments may be applied regardless of networking environment. The packet data network 104 may be the combined IMS Core/Web Services data network as discussed, or the packet data network 104 may just use one of those two technologies. The packet data network 104 may additionally or alternatively include a cable network operating in the radio-frequency domain and/or the Internet Protocol (IP) domain. The packet data network 104, however, may also include a distributed computing network, such as the Internet (sometimes alternatively known as the "World Wide Web"), an intranet, a local-area network (LAN), and/or a wide-area network (WAN). The packet data network 104 may include coaxial cables, copper wires, fiber optic lines, and/or hybrid-coaxial lines. The packet data network 104 may even include wireless portions utilizing any portion of the electromagnetic spectrum and any signaling standard (such as the I.E.E.E. 802 family of standards, GSM/CDMA/TDMA or any cellular standard, and/or the ISM band). The packet data network 104 may even include powerline portions, in which signals are communicated via electrical wiring. The concepts described herein may be applied to any wireless/wireline communications network, regardless of physical componentry, physical configuration, or communications standard(s).

Figure 51:
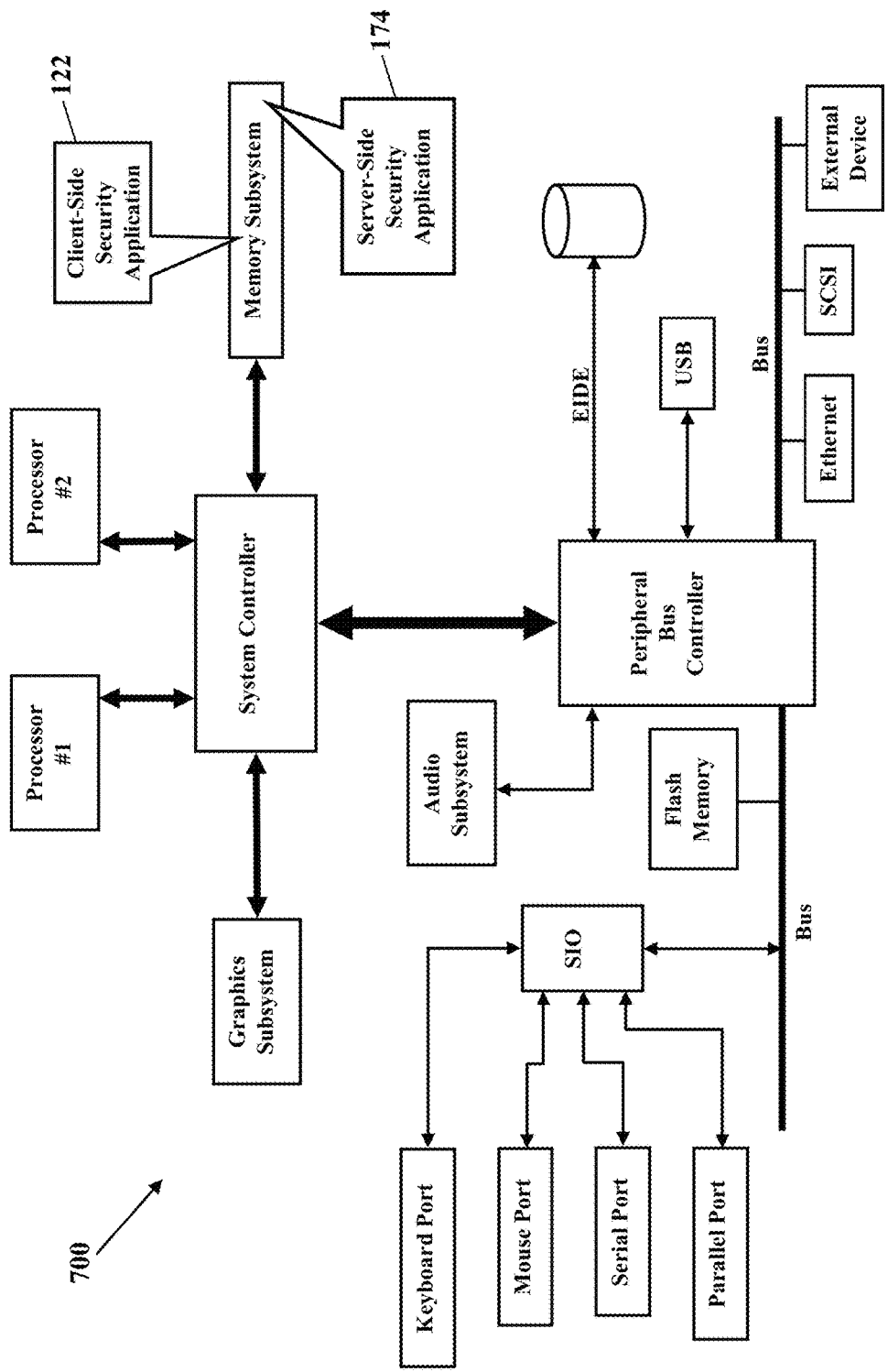
FIG. 51 is a schematic illustrating a generic block diagram of a processor-controlled device, according to exemplary embodiments.

FIG. 51 is a schematic illustrating still more exemplary embodiments. FIG. 51 is a generic block diagram illustrating the client-side security application 122 and/or the server-side security application 174 may operate within a processor-controlled device 700. The client-side security application 122 and/or the server-side security application 174 may be stored in a memory subsystem of the processor-controlled device 700. One or more processors communicate with the memory subsystem and execute the client-side security application 122 and/or the server-side security application 174. Because the processor-controlled device 700 illustrated in FIG. 52 is well-known to those of ordinary skill in the art, no detailed explanation is needed.

Exemplary embodiments may be physically embodied on or in a computer-readable storage medium. This computer-readable medium may include CD-ROM, DVD, tape, cassette, floppy disk, memory card, and large-capacity disks. This computer-readable medium, or media, could be distributed to end-subscribers, licensees, and assignees. These types of computer-readable media, and other types not mention here but considered within the scope of the exemplary embodiments. A computer program product comprises processor-executable instructions for alerting of alarms from security systems.

While the exemplary embodiments have been described with respect to various features, aspects, and embodiments, those skilled and unskilled in the art will recognize the exemplary embodiments are not so limited. Other variations, modifications, and alternative embodiments may be made without departing from the spirit and scope of the exemplary embodiments.

The invention claimed is:

1. A method, comprising:
   determining, by a controller associated with a security system, an alarm code associated with an alarm;
   receiving, by the controller associated with the security system, a request for a remote access to a video data generated by a camera;
   querying, by the controller associated with the security system, an electronic table that electronically associates cameras to alarm codes including the alarm code associated with the alarm;
   identifying, by the controller associated with the security system, the camera of the cameras that is electronically associated with the alarm code;

determining, by the controller associated with the security system, that the camera is permitted for the remote access to the video data according to camera permissions associated with the security system;
determining, by the controller associated with the security system, a geographical location associated with a device sending the request for the remote access to the video data;
determining, by the controller associated with the security system, that the geographical location associated with the device satisfies a permissible geographical location defined by the camera permissions for the remote access to the video data; and
sending, by the controller, the video data to the device in response to the camera and the geographical location satisfying the camera permissions for the remote access.

2. The method of claim 1, further comprising sending the video data to a destination specified in the request.

3. The method of claim 1, further comprising retrieving a notification address associated with the security system.

4. The method of claim 3, further comprising sending the video data to the notification address.

5. The method of claim 1, further comprising receiving global positioning system information describing the geographical location.

6. The method of claim 5, further comprising comparing the global positioning system information to the permissible geographical location.

7. The method of claim 6, further comprising determining the global positioning system information is acceptable to the permissible geographical location.

8. A system, comprising:
a hardware processor; and
a memory device, the memory device storing code, the code when executed causing the hardware processor to perform operations, the operations comprising:
determining an alarm code associated with an alarm detected by a security system;
sending an alarm notification to a monitoring service, the alarm notification specifying the alarm code and an Internet protocol address associated with the security system;
receiving a video request sent from the monitoring service, the video request requesting a remote access to a video data generated by the security system;
in response to the receiving of the video request sent from the monitoring service, querying an electronic table to identify a camera, the electronic table electronically associating cameras to alarm codes including the alarm code associated with the alarm;
in response to identifying the camera associated by the electronic table to the alarm code, retrieving camera permissions associated with the Internet protocol address of the security system, the camera permissions defining policies for the remote access to the video data generated by the security system;
determining that the camera associated by the electronic table to the alarm code is permitted by the camera permissions for the remote access to the video data generated by the security system;
receiving global positioning system information associated with the video request sent from the monitoring service;
determining that the global positioning system information associated with the video request satisfies the camera permissions for the remote access to the video data generated by the security system;
in response to the global positioning system information associated with the video request satisfying the camera permissions, retrieving the video data generated by the camera associated by the electronic table to the alarm code; and
sending the video data generated by the camera in response to the receiving of the video request sent from the monitoring service.

9. The system of claim 8, wherein the operations further comprise sending the video data to a destination specified by the video request.

10. The system of claim 8, wherein the operations further comprise retrieving a notification address associated with the security system.

11. The system of claim 10, wherein the operations further comprise sending the video data to the notification address.

12. The system of claim 8, wherein the operations further comprise comparing the global positioning system information to permissible locations defined by the camera permissions.

13. The system of claim 12, wherein the operations further comprise matching the global positioning system information to one of the permissible locations.

14. A non-transitory memory device storing instructions that when executed cause a hardware processor to perform operations, the operations comprising:
generating an alarm message in response to an alarm detected by a controller associated with a security system;
determining simultaneous dual connectivities between the controller and two different communications paths for sending the alarm message;
selecting a communications path of the two different communications paths having the simultaneous dual connectivities;
sending the alarm message from the controller via the communications path to a monitoring service, the alarm message specifying an alarm code detected by the controller and specifying an Internet protocol address associated with the controller;
receiving a video request from the monitoring service to the Internet protocol address associated with the controller, the video request requesting the video data generated in response to the alarm detected by the controller;
in response to the receiving of the video request, querying an electronic table to identify a camera, the electronic table electronically associating cameras to alarm codes including the alarm code associated with the alarm;
in response to identifying the camera associated by the electronic table to the alarm code, retrieving camera permissions associated with the Internet protocol address associated with the security system, the camera permissions defining policies for a remote access to a video data generated by the camera;
determining that the camera associated by the electronic table to the alarm code is permitted by the camera permissions for the remote access to the video data;
receiving a location associated with the monitoring service sending the video request;
determining that the location associated with the monitoring service satisfies permissible locations defined by the camera permissions;
in response to the location associated with the monitoring service satisfying the camera permissions, retrieving the video data generated by the camera associated by the electronic table to the alarm code; and sending the video data from the controller to the monitoring service via the communications path of the two different communications paths having the simultaneous dual connectivities.

15. The non-transitory memory device of claim 14, wherein the operations further comprise sending the video data to a destination.

16. The non-transitory memory device of claim 14, wherein the operations further comprise retrieving a notification address associated with the security system.

17. The non-transitory memory device of claim 16, wherein the operations further comprise sending the video data to the notification address.

18. The non-transitory memory device of claim 14, wherein the operations further comprise receiving a global positioning system information.

19. The non-transitory memory device of claim 18, wherein the operations further comprise matching the global positioning system information to one of the permissible locations.

* * * * *